(12) United States Patent
Yang

(10) Patent No.: US 11,448,425 B2
(45) Date of Patent: Sep. 20, 2022

(54) OPEN-LOOP NATURAL THERMAL ENERGY RELEASING SYSTEM WITH PARTIAL REFLUX

(71) Applicant: Tai-Her Yang, Taipei (TW)

(72) Inventor: Tai-Her Yang, Taipei (TW)

(*) Notice: Subject to any disclaimer, the term of this patent is extended or adjusted under 35 U.S.C. 154(b) by 0 days.

(21) Appl. No.: 16/352,073

(22) Filed: Mar. 13, 2019

(65) Prior Publication Data
US 2019/0212036 A1 Jul. 11, 2019

Related U.S. Application Data

(60) Division of application No. 15/092,286, filed on Apr. 6, 2016, now abandoned, which is a division of application No. 13/216,462, filed on Aug. 24, 2011, now abandoned, which is a continuation-in-part of application No. 13/209,571, filed on Aug. 15, 2011, now abandoned.

(51) Int. Cl.
| | |
|---|---|
| *F24V 50/00* | (2018.01) |
| *F24T 10/10* | (2018.01) |
| *F28D 20/00* | (2006.01) |
| *F24T 10/30* | (2018.01) |

(52) U.S. Cl.
CPC .............. *F24V 50/00* (2018.05); *F24T 10/10* (2018.05); *F24T 10/30* (2018.05); *F28D 20/0052* (2013.01); *Y02E 10/10* (2013.01); *Y02E 60/14* (2013.01)

(58) Field of Classification Search
CPC ....... F28D 20/0052; F24T 10/30; F24T 10/10; F24V 50/00; Y02E 10/10; Y02E 60/14
See application file for complete search history.

(56) References Cited

U.S. PATENT DOCUMENTS

| | | | |
|---|---|---|---|
| 3,590,761 A * | 7/1971 | Parkes | B63G 8/22 60/39.462 |
| 3,648,767 A | 3/1972 | Balch | |
| 3,768,547 A | 10/1973 | Best | |
| 3,788,389 A | 1/1974 | Waters | |
| 3,823,769 A | 7/1974 | Anderson et al. | |
| 3,828,845 A | 8/1974 | Waters | |
| 3,840,068 A | 10/1974 | Waters | |
| 3,857,244 A | 12/1974 | Faucette | |
| 3,898,851 A | 8/1975 | Wyant | |

(Continued)

FOREIGN PATENT DOCUMENTS

| | | |
|---|---|---|
| JP | 2005283014 A | 10/2005 |
| JP | 2011043294 A | 3/2011 |

*Primary Examiner* — Ljiljana V. Ciric
(74) *Attorney, Agent, or Firm* — Bacon & Thomas, PLLC

(57) ABSTRACT

An open-loop type heat equalization device utilizes a heat exchange fluid as the carrier to transmit the thermal energy of a natural thermal energy storage body to an temperature differentiation body. The system includes an inclined or vertical heat gaining device that exchanges thermal energy with the natural thermal energy storage body, and first and second pipeline structures through which the fluid flows by convection or auxiliary pumping to the temperature differentiation body. The first pipeline system includes an outwardly-expanded arc-shaped fluid chamber and has a relatively larger volume than the second pipeline system to provide differential resistance to fluid flow at opposite ends of the heating gaining device.

19 Claims, 30 Drawing Sheets

(56) References Cited

U.S. PATENT DOCUMENTS

| | | |
|---|---|---|
| 3,935,900 A | 2/1976 | Waters |
| 3,948,313 A | 4/1976 | Best |
| 3,990,502 A | 11/1976 | Best |
| 4,036,285 A | 7/1977 | Best |
| 4,040,480 A | 8/1977 | Richards |
| 4,042,012 A | 8/1977 | Perry et al. |
| 4,050,509 A | 9/1977 | Bienert et al. |
| 4,091,863 A | 5/1978 | Schroder |
| 4,099,556 A | 7/1978 | Roberts, Jr. |
| 4,142,576 A | 3/1979 | Perry et al. |
| 4,162,394 A | 7/1979 | Faccini |
| 4,194,856 A | 3/1980 | Jahns |
| 4,240,268 A | 12/1980 | Yuan |
| 4,258,780 A | 3/1981 | Suo |
| 4,269,539 A | 5/1981 | Hopke |
| 4,271,681 A | 6/1981 | Schertz |
| 4,279,294 A | 7/1981 | Fitzpatrick et al. |
| 4,339,929 A | 7/1982 | Fitzpatrick et al. |
| 4,346,569 A | 8/1982 | Yuan |
| 4,355,522 A | 10/1982 | Gorski et al. |
| 4,375,157 A | 3/1983 | Boesen |
| 4,408,657 A | 10/1983 | Pugh |
| 4,412,426 A | 11/1983 | Yuan |
| 4,444,249 A | 4/1984 | Cady |
| 4,448,237 A | 5/1984 | Riley |
| 4,505,326 A | 3/1985 | Hazen |
| 4,566,527 A | 1/1986 | Pell et al. |
| 4,577,679 A | 3/1986 | Hibshman |
| 4,644,750 A | 2/1987 | Lockett et al. |
| 4,693,301 A | 9/1987 | Baehrle et al. |
| 4,793,146 A | 12/1988 | Ryokai |
| 4,798,239 A | 1/1989 | Persohn et al. |
| 4,836,275 A | 6/1989 | Sakaya et al. |
| 4,930,572 A | 6/1990 | Doshier |
| 4,995,450 A | 2/1991 | Geppelt et al. |
| 5,029,633 A | 7/1991 | Mann |
| 5,054,297 A | 10/1991 | Furuhama |
| 5,069,199 A | 12/1991 | Messner |
| 5,477,703 A | 12/1995 | Hanchar et al. |
| 5,803,161 A | 9/1998 | Wahle et al. |
| 6,129,141 A | 10/2000 | Yang |
| 6,769,487 B2 | 8/2004 | Hache |
| 6,802,360 B1 | 10/2004 | Schmitt |
| 7,004,231 B2 * | 2/2006 | Yang ................ F24V 50/00 165/11.1 |
| 7,062,911 B2 * | 6/2006 | Yang ................ F24T 10/10 60/641.6 |
| 7,370,488 B2 | 5/2008 | Kidwell et al. |
| 7,373,785 B2 | 5/2008 | Kidwell et al. |
| 7,377,122 B2 | 5/2008 | Kidwell et al. |
| 8,100,172 B2 | 1/2012 | Yang |
| 9,038,408 B2 | 5/2015 | Sabo |
| 9,103,603 B2 | 8/2015 | Yang |
| 9,127,858 B2 | 9/2015 | Mckeown |
| 9,200,850 B2 * | 12/2015 | Yang ................ F24S 10/55 |
| 9,291,372 B2 * | 3/2016 | Yang ................ F28D 20/0052 |
| 9,777,969 B2 * | 10/2017 | Yang ................ F28D 20/0052 |
| 9,970,687 B2 * | 5/2018 | Yang ................ F28D 15/0266 |
| 10,420,288 B2 * | 9/2019 | LaBounty ............ A01G 25/00 |
| 11,137,169 B2 * | 10/2021 | Buscheck ............ F01K 27/00 |
| 11,242,726 B2 * | 2/2022 | Toews ................ F24T 10/10 |
| 2004/0194909 A1 * | 10/2004 | Yang ................ F24F 12/006 165/11.1 |
| 2004/0206084 A1 * | 10/2004 | Yang ................ F24F 5/005 60/641.1 |
| 2009/0277602 A1 | 11/2009 | Yang |
| 2009/0277603 A1 | 11/2009 | Yang |
| 2012/0099277 A1 * | 4/2012 | Yang ................ F28D 15/00 361/695 |
| 2013/0025819 A1 * | 1/2013 | Yang ................ F28D 15/00 165/45 |
| 2013/0025820 A1 * | 1/2013 | Yang ................ F28D 15/00 165/45 |
| 2013/0025821 A1 * | 1/2013 | Yang ................ F28D 15/00 165/45 |
| 2013/0025832 A1 * | 1/2013 | Yang ................ F24S 10/504 165/104.34 |
| 2013/0042997 A1 * | 2/2013 | Yang ................ F24T 10/10 165/45 |
| 2014/0202655 A1 | 7/2014 | Yang |
| 2015/0000875 A1 * | 1/2015 | Yang ................ F28D 20/0052 165/104.31 |
| 2021/0372668 A1 * | 12/2021 | Buscheck ............ F24T 10/20 |
| 2021/0381725 A1 * | 12/2021 | Lakic ................ F24T 10/30 |

* cited by examiner

OPEN-LOOP NATURAL THERMAL ENERGY RELEASING SYSTEM WITH PARTIAL REFLUX

CROSS-REFERENCE TO RELATED APPLICATION

This application is a Divisional of U.S. patent application Ser. No. 15/092,286, filed Apr. 6, 2016, which is a Divisional of U.S. patent application Ser. No. 13/216,462, filed Aug. 24, 2011, which is a Continuation-In-Part of my patent application Ser. No. 13/209,571, filed on Aug. 15, 2011.

BACKGROUND OF THE INVENTION

(a) Field of the Invention

The present invention is to utilize the thermal energy of a natural thermal energy storage body (100) by transmitting the thermal energy to a heat exchange fluid (104) in a heat gaining device (101) installed at the bottom of an open-loop natural thermal energy releasing system with partial fluid return, the heat exchange fluid (104) rising when heated and descending when cooled. Fluid flow is achieved by generating a temperature differential across the heat gaining device using an outwardly expanded arc-shaped fluid chamber (108) on one side of the heat gaining device (101) and by orienting the heat gaining device (101) in an upwardly inclined or vertical direction. The fluid flow may be augmented by the pumping of an auxiliary fluid pump. Upon rising through a pipeline structure (401) to a temperature differentiation body (103) above the thermal energy storage body (100), the heat exchange fluid (104) in the heat gaining device (101) is enabled to release the thermal energy carried by the heat exchange fluid (104) in multiple directions or in a set direction from a fluid inlet/outlet port (4011) of the pipeline structure (401) to the interior of a space limiting and flow direction guiding structure, a part of the heat exchange fluid (104) being returned through the fluid inlet/outlet port (3012) of the pipeline structure (301) for flowing back to the outwardly expanded arc-shaped fluid chamber (108) and heat gaining device (101) outwardly expanded arc-shaped fluid chamber (108) being located in one or more than one turning location of the open-loop flowpath for temporarily storing a part of the heat exchange fluid (104) and moderating the flow speed of the heat exchange fluid (104) to reduce flow damping of the flowpath to the heat exchange fluid (104) as well as to generate a temperature differential across the heat gaining device (101). The open loop flow path may also optionally include an auxiliary heating/cooling device (115), an auxiliary fluid pump (107), a heat exchange fluid temperature sensing device (TS201), an environment temperature sensing device (TS202), and an electric power control unit (ECU200).

(b) Description of the Prior Art

A conventional open-loop temperature equalization device utilizes the thermal energy of a natural thermal energy storage body to transmit thermal energy to an external temperature differentiation body by adopting a heat exchange fluid as a carrier. An open state often exists between the fluid inlet/outlet port (4011) of one pipeline structure (401) and the fluid inlet/outlet port (3012) of another pipeline structure (301). In the absence of a space limiting and flow direction guiding structure for the heat exchange fluid (104), effective fluid flow is difficult to achieve and thermal energy from the heat gaining device (101) may be dispersed rather than effectively transmitted to the external temperature differentiation body.

SUMMARY OF THE INVENTION

The present invention is an open-loop natural thermal energy releasing system with partial reflux installed in a natural thermal energy storage body (100) which is constituted by a solid or liquid heat storage body having a high but stable heat storage capacity, such as a stratum, ground, lake, pool, river, desert, berg for ocean. Thermal energy stored in the natural heat storage body is transmitted to a heat exchange fluid (104) in a heat gaining device (101) installed at the bottom of the open-loop natural thermal energy releasing system with partial reflux, and the cold descending/hot ascending effect provided by the heat exchange fluid (104), after being processed with temperature equalization or the pumping of an auxiliary fluid pump, is employed to transport the heat exchange fluid (104) through piping (301) and (401) to respective fluid inlet/outlet ports (3012) and (4012) outside the natural thermal energy storage body (100) so as to release the thermal energy in all directions or in a set direction, for example to the interior of a space limiting and flow direction guiding structure that guides the heat exchange fluid (104) with thermal energy from the fluid inlet/outlet port (4011) of the pipeline structure (401) and returns a part of the heat exchange fluid (104) to the fluid inlet/outlet port (3012) of the pipeline structure (301) for flowing back to the heat gaining device (101). An outward-expanding arc-shaped fluid chamber (108) is installed at one or more than one of the turning locations of the open-loop flowpath configured by the heat gaining device (101), the pipeline structure (301), the space limiting and flow direction guiding structure, and the pipeline structure (401) for temporarily storing a part of the heat exchange fluid (104) and moderating the flow speed of the heat exchange fluid (104) with thermal energy for reducing the flow damping of the flowpath to the heat exchange fluid (104). Optionally, an auxiliary heating/cooling device (115), an auxiliary fluid pump (107), a heat exchange fluid temperature sensing device (TS201), an environment temperature sensing device (TS202), and an electric power control unit (ECU200) may also be installed in the flowpath.

DESCRIPTION OF MAIN COMPONENT SYMBOLS

Figure 1:
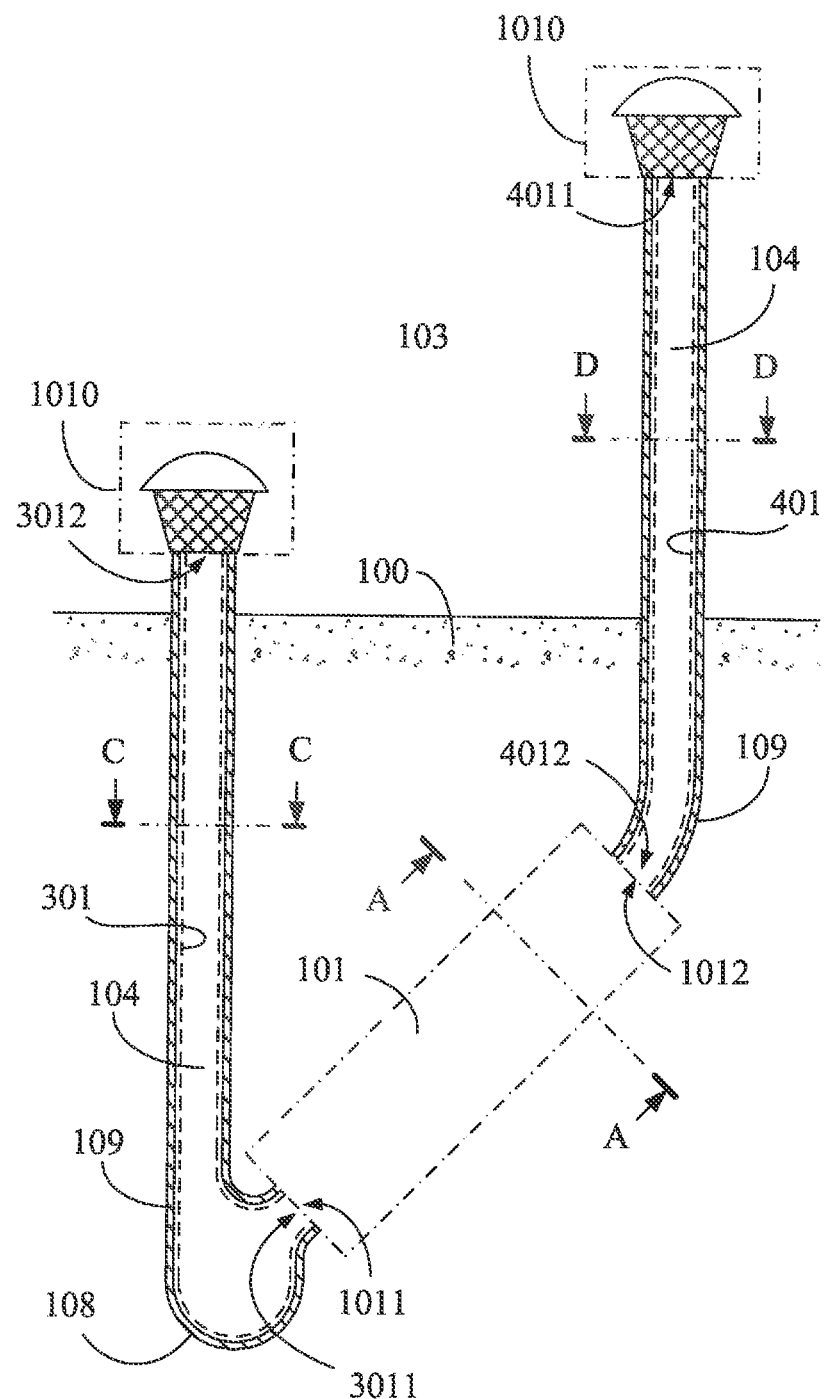
FIG. 1 is a schematic structural view of an embodiment of the present invention in which an outward-expanding arc-shaped fluid chamber (108) is installed between a linear section of a first pipeline structure (301) and an upwardly-inclined heat gaining device (101) and second pipeline structure (401).

100: Natural thermal energy storage body
101: Heat gaining device
103: Temperature differentiation body
104: Heat exchange fluid
107: Auxiliary fluid pump
108: Outward-expanding arc-shaped fluid chamber
109: Heat insulation member
115: Auxiliary heating/cooling device
116, 118: Power wire
120: Signal transmission wire
1010: Protection net and protection cover device for fluid inlet/outlet port
1011, 1012, 3011, 3012, 4011, 4012: Fluid inlet/outlet port
ECU200: Electric power control unit
TS201: Heat exchange fluid temperature sensing device
TS202: Environment temperature sensing device
201: Space limiting and flow direction guiding structure
211: Closed-type space limiting and flow direction guiding structure
212: Semi-closed type space limiting and flow direction guiding structure
213: Space limiting and flow direction guiding structure (213) capable of controlling door opening or closing
250: Maintenance entrance
251: Maintenance stair passage
301, 401: Pipeline structure

DETAILED DESCRIPTION OF THE PREFERRED EMBODIMENTS

A conventional open-loop temperature equalization device utilizes the thermal energy of a natural thermal energy storage body to transmit thermal energy to an external temperature differentiation body by adopting a heat exchange fluid flowing through first and second pipeline structures (301) and (401) as a carrier. In situations where a space limiting and flow direction guiding structure of the heat exchange fluid (104) is not provided, an open state is often formed between the fluid inlet/outlet port (4011) of one of the pipeline structures (401) and the fluid inlet/outlet port (3012) of another of the pipeline structures (301), as a result of which thermal energy from the heat gaining device (101) is dispersed.

The present invention utilizes the thermal energy of the natural thermal energy storage body (100), which is transmitted to a heat exchange fluid (104) in a heat gaining device (101) installed at the bottom of the open-loop natural thermal energy releasing system. The heat exchange fluid (104) is caused to flow by the cold descending/hot ascending effect after processing of the fluid by temperature equalization or pumping by an auxiliary fluid pump, the heat exchange fluid (104) in the heat gaining device (101) releasing the thermal energy in multiple directions or in a set direction from a fluid inlet/outlet port (4011) of the pipeline structure (401), for example to the interior of a space limiting and flow direction guiding structure that guides the heat exchange fluid (104) between the fluid inlet/outlet port (4011) of the pipeline structure (401) and a fluid inlet/outlet port (3012) of a pipeline structure (301) for allowing the heat exchange fluid (104) with thermal energy to be released from the fluid inlet/outlet port (4011) of the pipeline structure (401), and to return a part of the heat exchange fluid (104) to the fluid inlet/outlet port (3012) of the pipeline structure (301) for flowing back to the heat gaining device (101). An outward-expanding arc-shaped fluid chamber (108) is installed at one or more turning locations of the open-loop flowpath configured by the heat gaining device (101), the pipeline structure (301), the space limiting and flow direction guiding structure and the pipeline structure (401) for temporarily storing a part of the heat exchange fluid (104) and thereby moderating the flow speed of the heat exchange fluid (104) to reduce flow damping. An auxiliary heating/cooling device (115); auxiliary fluid pump (107); heat exchange fluid temperature sensing device (TS201); environment temperature sensing device (TS202); and electric power control unit (ECU200) may also be installed.

The structural features and functions of the present invention are illustrated through embodiments illustrated in the accompanying drawings, as follows:

FIG. 1 is a schematic structural view showing an outward-expanding arc-shaped fluid chamber (108) installed between a linear pipeline structure (301) and an upward-inclined heat gaining device (101) and pipeline structure (401), according to one embodiment of the present invention.

As shown in FIG. 1, the heat gaining device (101) is installed in a natural thermal energy storage body (100) which is constituted by a solid or liquid thermal energy storage body with a large and stable thermal energy storage capacity, such as a stratum, ground, lake, pool, river, desert, berg and ocean.

The fluid inlet/outlet port (1011) of the heat gaining device (101) leads to the fluid inlet/outlet port (3012) and a protection net and protection cover device (1010) through the pipeline structure (301). Another fluid inlet/outlet port (1012) of the heat gaining device (101) leads to the temperature differentiation body (103) through the fluid inlet/outlet port (4011) of the pipeline structure (401) and another protection net and protection cover device (1010), such that the heat exchange fluid (104) passing through the heat gaining device (101) follows an open-loop flowpath with partial return (reflux) through the pipeline structures (301), (401) and the temperature differentiation body (103) for releasing the thermal energy to the temperature differentiation body (103)j. The heat exchange fluid (104) is made of a gaseous or liquid fluid having heat storage and conduction properties. The temperature differentiation body (103) is a space or structure having certain functions and configured by a gas or solid or liquid, for receiving the thermal energy released by the heat exchange fluid during system operation.

Features and main components of the embodiment of FIG. 1 are as follows:

Heat gaining device (101) is made of a material having good heat conductivity, and provided with a flowpath structure jointly configured by one or more than one flowpath; or structured by a conduit structure jointly configured by one or more than one flowpath. The flowpath is a pipe-like structure having a cross section A-A formed in a round shape or other geometric shapes, the interior or exterior thereof being optionally installed with thermal conductive fin sheets having no negative influence on the flowing fluid and installed in the natural thermal energy storage body (100) with an upward inclination; two ends of the flowpath of the heat gaining device (101) respectively having a respective fluid inlet/outlet port (1011), (1012) for being respectively connected to one end of the pipeline structure (301) and one end of the pipeline structure (401) so as to lead to the temperature differentiation body (103) for forming the open-loop flowpath. The flowpath inside the heat gaining device (101) is upward inclined with respect to horizontal, such that the fluid inlet/outlet port (1011) at a lower position allows heat exchange fluid (104) having relatively low temperature to flow in, and the fluid inlet/outlet port (1012) at a higher position allows the heat exchange fluid (104) having relatively high temperature to flow out, so as to cooperate with the heat exchange fluid (104) to generate a hot ascending/cold descending effect.

Pipeline structure (301) is constituted by a fluid pipeline structure having one or more than one flowpath. The cross section C-C of pipeline structure (301) has a round or other geometric shape, the pipeline structure (301) being configured by one or more than one of the following means: 1) a material having good heat conductivity; 2) a material having good heat conductivity, and the exterior of the whole or a part of the pipeline segment being covered by a heat insulation member (109); 3) a pipe-like structure or building structural body having good thermal insulation properties; one end of the pipeline structure (301) being formed with one or more than one fluid inlet/outlet ports (3011) for communicating with the fluid inlet/outlet port (1011) of the heat gaining device (101) having one or more than one flowpath; and the other end of the pipeline structure (301) being formed with one or more than one fluid inlet/outlet ports (3012) which are jointly configured to lead to a protection net and protection cover device (1010) of the fluid inlet/outlet port (1010) for transporting the heat exchange fluid (104).

Pipeline structure (401) is constituted by a fluid pipeline structure having a cross section D-D with a round or other geometric shape, the pipeline structure (401) being configured by one or more than one of the following means: 1) a material having good heat conductivity; 2) a material having good heat conductivity, and the exterior of the whole or a part of the pipeline segment being covered by a heat insulation member (109); 3) a pipe-like structure or building structural body having good thermal insulation properties; one end of the pipeline structure (401) being formed with one or more than one fluid inlet/outlet ports (4012) for communicating with the fluid inlet/outlet port (1012) of the heat gaining device (101) having one or more than one flowpath. The other end of the pipeline structure (401) is formed with one or more than one fluid inlet/outlet ports (4011) leading to the protection net and protection cover device (1010) for the fluid inlet/outlet ports for transporting the heat exchange fluid (104).

Outward-expanding arc-shaped fluid chamber (108) is constituted by an outward-expanding arc-shaped flowpath structure formed at one or more than one of the turning locations of the open-loop type flowpath configured by the heat gaining device (101), the pipeline structure (301), the temperature differentiation body (103) and the pipeline structure (401), for temporarily storing a part of the heat exchange fluid (104) and moderating the flow speed of the heat exchange fluid (104) with thermal energy, thereby reducing the flow damping of the open-loop type flowpath to the heat exchange fluid (104).

The volume of the fluid stored in the outward-expanding arc-shaped fluid chamber (108) installed close to the fluid inlet/outlet port of the heat gaining device (101) is relatively larger, therefore the total heat capacity is larger, when the heat gaining device (101) introduces thermal energy from the temperature differentiation body which is disposed at the exterior and in contact with the heat gaining device. Although the thermal energy is transmitted towards two sides through the fluid, the fluid at the side where the outward-expanding arc-shaped fluid chamber (108) is installed on the heat gaining device (101) generates a smaller temperature difference, the other side where the outward-expanding arc-shaped fluid chamber (108) is not installed generates a greater temperature difference, thereby forming temperature differentiation at two sides of the inlet/outlet ports of the heat gaining device (101).

The illustrated open-loop natural thermal energy releasing system with therefore includes at least a heat gaining device (101), at least a pipeline structure (301) and at least a pipeline structure (401); wherein the heat gaining device (101), the pipeline structure (301) and the pipeline structure (401) can be integrally formed or assembled by plural components, and the dimensions and shape at each connection location for the assembly is in a gradually-altered shape for forming a smooth transition, which can reduce damping while the fluid is flowing, thereby facilitating flow circulation of the fluid.

Figure 2:
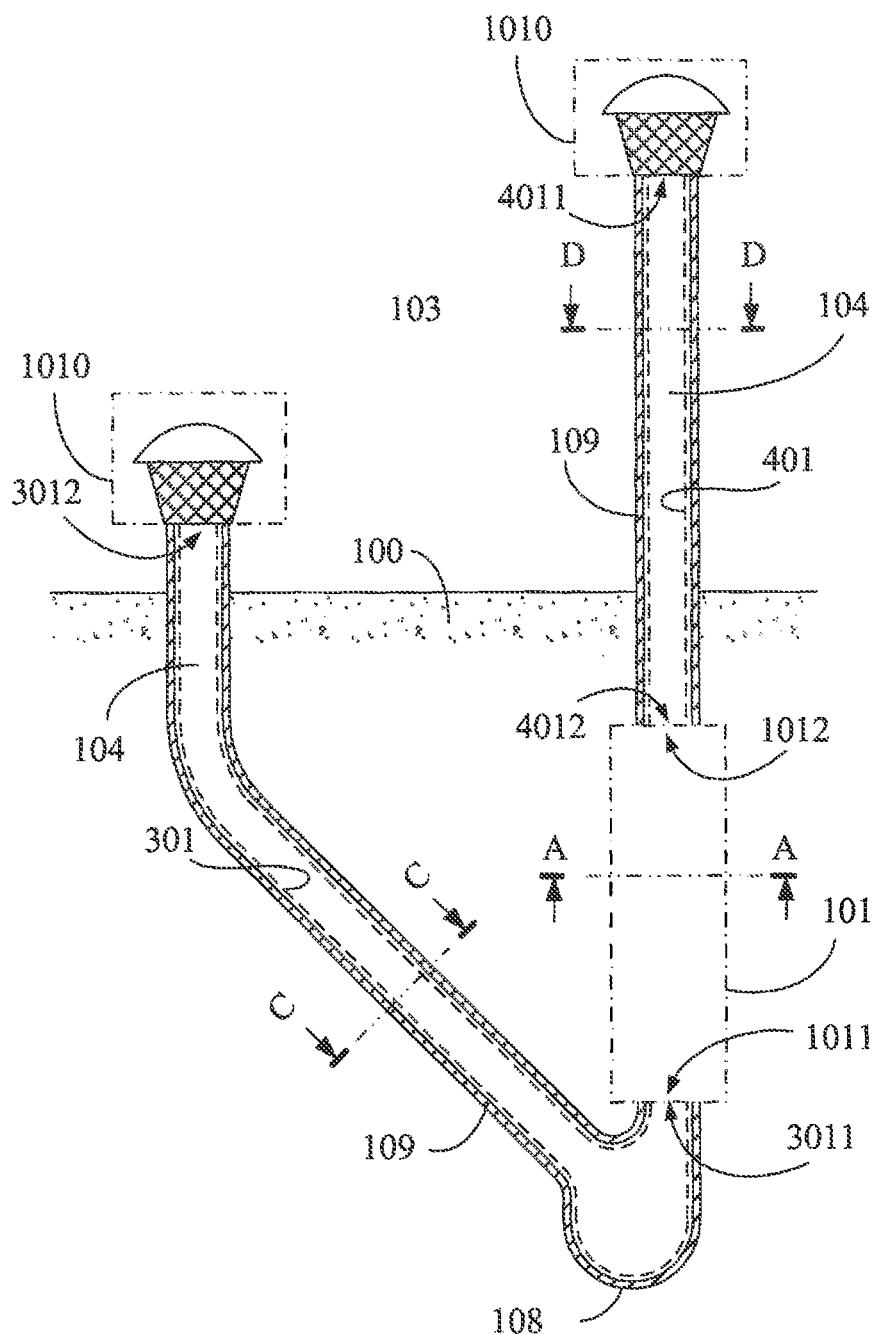
FIG. 2 is a schematic structural view of an embodiment in which the outward-expanding arc-shaped fluid chamber (108) is installed between a linear section of the first pipeline structure (301) and a vertical heat gaining device (101) and second pipeline structure (401).

FIG. 2 is a schematic structural view showing an embodiment in which the outward-expanding arc-shaped fluid chamber (108) is installed between the linear pipeline structure (301) and a vertical heat gaining device (101) and pipeline structure (401).

As shown in FIG. 2, the heat gaining device (101) is installed in a natural thermal energy storage body (100) which is constituted by a solid or liquid thermal energy storage body having a large, stable thermal energy storage capacity, such as a stratum, ground, lake, pool, river, desert, berg and ocean.

The fluid inlet/outlet port (1011) of the heat gaining device (101) leads to the fluid inlet/outlet port (3012) and a protection net and protection cover device (1010) through the pipeline structure (301), and another fluid inlet/outlet port (1012) of the heat gaining device (101) leads to the temperature differentiation body (103) through the fluid inlet/outlet port (4011) of the pipeline structure (401) and another protection net and protection cover device (1010), such that the heat exchange fluid (104) passing the heat gaining device (101) follows an open-loop flowpath through the pipeline structures (301), (401) and the temperature differentiation body (103) for releasing thermal energy to the temperature differentiation body (103). The heat exchange fluid (104) is made of a gaseous or liquid fluid having heat storage and conduction properties. The temperature differentiation body (103) is a space or structure having certain functions and configured by gas or solid or liquid, for receiving the thermal energy released by the heat exchange fluid during system operation.

Features of main components of this embodiment are as follow:

Heat gaining device (101) is made of a material having good heat conductivity, and provided with a flowpath structure jointly configured by one or more than one flowpath; or structured by a conduit structure jointly configured by one or more than one flowpath, wherein the flowpath cross section A-A is a cross section of a pipe-like structure formed in a round shape or other geometric shapes, the interior or exterior of the heat gaining device (101) being optionally installed with thermal conductive fin sheets having no negative influence on the flowing fluid and installed vertically in the natural thermal energy storage body (100). The two ends of the flowpath of the heat gaining device (101) respectively have a fluid inlet/outlet port (1011), (1012) for being respectively connected to one end of the pipeline structure (301) and one end of the pipeline structure (401), both of which lead to the temperature differentiation body (103) for forming the open-loop flowpath, the flowpath inside the heat gaining device (101) being vertical with respect to the horizontal level, the fluid inlet/outlet port (1011) being at a lower position to allow heat exchange fluid (104) having relatively low temperature to flow in, and the fluid inlet/outlet port (1012) being at a higher position to allow the heat exchange fluid (104) having relatively high temperature to flow out, so as to cooperate with the heat exchange fluid (104) to generate a hot ascending/cold descending effect.

Pipeline structure (301) is constituted by a fluid pipeline structure having one or more than one flowpath with a cross section C-C that is round or has other geometric shapes. The pipeline structure (301) is configured by one or more than one of the following means: 1) a material having good heat conductivity; 2) a material having good heat conductivity, and the exterior of the whole or a part of the pipeline segment being covered by a heat insulation member (109); 3) a pipe-like structure or building structural body having good thermal insulation properties; one end of the pipeline structure (301) being formed with one or more than one fluid inlet/outlet port (3011) for communicating with the fluid inlet/outlet port (1011) of the heat gaining device (101). the other end of the pipeline structure (301) is formed with one or more than one fluid inlet/outlet port (3012) jointly configured to lead to the protection net and protection cover device (1010) for transporting the heat exchange fluid (104).

Pipeline structure (401) is constituted by a fluid pipeline structure having one or more than one flowpath and a cross section D-D having round or other geometric shapes. The pipeline structure (401) is configured by one or more than one of the following means: 1) a material having good heat conductivity; 2) a material having good heat conductivity, and the exterior of the whole or a part of the pipeline segment being covered by a heat insulation member (109); and/or 3) a pipe-like structure or building structural body having good thermal insulation properties. One end of the pipeline structure (401) is formed with one or more than one fluid inlet/outlet ports (4012) for communicating with the fluid inlet/outlet port (1012) of the heat gaining device (101). The other end of the pipeline structure (401) is formed with one or more than one fluid inlet/outlet port (4011) leading to a protection net and protection cover device (1010) for transporting the heat exchange fluid (104).

Outward-expanding arc-shaped fluid chamber (108) is constituted by an outward-expanding arc-shaped flowpath structure formed at one or more than one of the turning locations of the open-loop type flowpath configured by the heat gaining device (101), the pipeline structure (301), the temperature differentiation body (103) and the pipeline structure (401), for temporarily storing a part of the heat exchange fluid (104) and moderating the flow speed of the heat exchange fluid (104), thereby reducing the flow damping of the open-loop type flowpath to the heat exchange fluid (104).

The volume of the fluid stored in the outward-expanding arc-shaped fluid chamber (108) installed close to the fluid inlet/outlet port of the heat gaining device (101) is relatively larger, and therefore the total heat capacity is larger, when the heat gaining device (101) introduces thermal energy from the temperature differentiation body which is disposed at the exterior and in contact with said device. Therefore, even though the thermal energy is transmitted towards two sides through the fluid, the fluid at the side where the outward-expanding arc-shaped fluid chamber (108) is installed on the heat gaining device (101) generates a smaller temperature difference and the other side where the outward-expanding arc-shaped fluid chamber (108) is not installed generates a greater temperature difference, thereby forming temperature differentiation at two sides of the inlet/outlet ports of the heat gaining device (101).

The above-described open-loop natural thermal energy releasing system includes at least a heat gaining device (101), at least a pipeline structure (301) and at least a pipeline structure (401); wherein the heat gaining device (101), the pipeline structure (301) and the pipeline structure (401) can be integrally formed or assembled by plural components, and the dimensions and shape at each connection location for the assembly is in a gradually-altered shape for forming a smooth transition, the smooth transition reducing damping while the fluid is flowing, thereby facilitating the flow circulation of the fluid.

Figure 3:
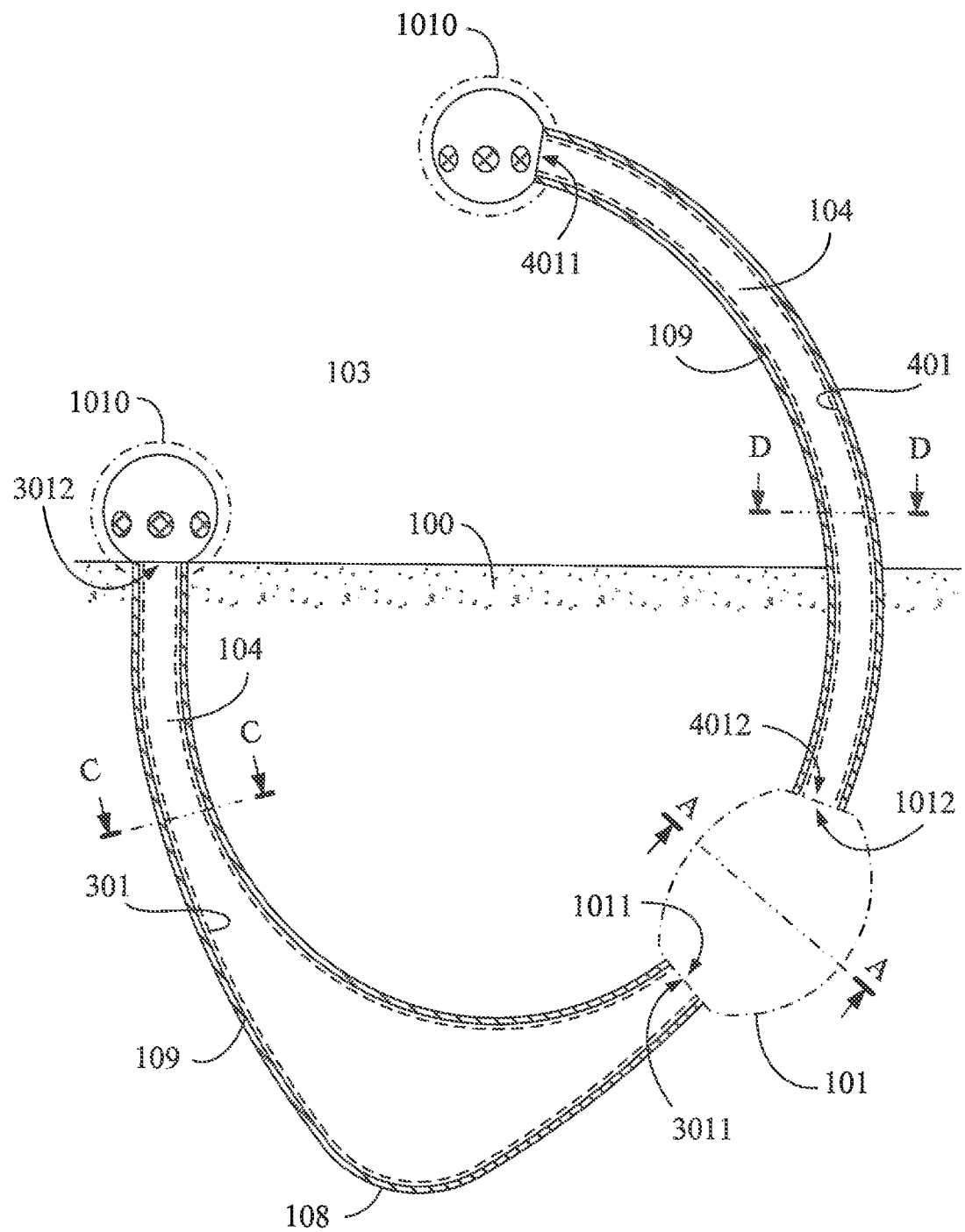
FIG. 3 is a schematic structural view of an embodiment in which the outward-expanding arc-shaped fluid chamber (108) is installed between an arc-shaped section of the first pipeline structure (301) and an upwardly-inclined heat gaining device (101) and arc-shaped second pipeline structure (401).

FIG. 3 is a schematic structural view showing an embodiment in which the outward-expanding arc-shaped fluid chamber (108) is installed between an arc-shaped pipeline structure (301) and the upward-inclined heat gaining device (101) and arc-shaped pipeline structure (401).

As shown in FIG. 3, the heat gaining device (101) is installed in a natural thermal energy storage body (100) which is constituted by a solid or liquid thermal energy storage body having a large and stable thermal energy storage capacity, such as a stratum, ground, lake, pool, river, desert, berg and ocean.

The fluid inlet/outlet port (1011) of the heat gaining device (101) leads to the fluid inlet/outlet port (3012) and to a protection net and protection cover device (1010) through the pipeline structure (301). Another fluid inlet/outlet port (1012) of the heat gaining device (101) leads to the temperature differentiation body (103) through the fluid inlet/outlet port (4011) of the pipeline structure (401) and the protection net and protection cover device (1010) for the fluid inlet/outlet port, such that the heat exchange fluid (104) passing the heat gaining device (101) is enabled to follow an open-loop flowpath through the pipeline structures (301), (401) and the temperature differentiation body (103) for releasing the thermal energy to the temperature differentiation body (103). The heat exchange fluid (104) is made of a gaseous or liquid fluid having heat storage and conduction properties. The temperature differentiation body (103) is a space or structure having certain functions and configured by gas or solid or liquid, for receiving the thermal energy released by the heat exchange fluid during the system operation.

Features of main components of the embodiment of FIG. 3 are as follows:

Heat gaining device (101) is made of a material having good heat conductivity, and provided with a flowpath structure jointly configured by one or more than one flowpath; or structured by a conduit structure jointly configured by one or more than one flowpath, wherein the flowpath cross section A-A of the pipe-like structure has a round shape or other geometric shapes. The interior or exterior of the heat gaining device (101) can be installed with thermal conductive fin sheets having no negative influence on the flowing fluid and installed in the natural thermal energy storage body (100) with an upward inclination. Two ends of the flowpath of the heat gaining device (101) respectively have a fluid inlet/outlet port (1011),(1012) for being respectively connected to one end of the pipeline structure (301) and one end of the pipeline structure (401) so as to lead to the temperature differentiation body (103) for forming the open-loop flowpath. The flowpath inside the heat gaining device (101) is upward-inclined with respect to the horizontal level, such that the fluid inlet/outlet port (1011) at a lower position allows the heat exchange fluid (104) having a relatively low temperature to flow in, and the fluid inlet/outlet port (1012) at a higher position allows the heat exchange fluid (104) having a relatively high temperature to flow out, so as to cooperate with the heat exchange fluid (104) to generate a hot ascending/cold descending effect.

Pipeline structure (301) is constituted by a fluid pipeline structure having a cross section C-C having round or other geometric shapes, the pipeline structure (301) being configured by one or more than one of the following means: 1) a material having good heat conductivity; 2) a material having good heat conductivity, the exterior of the whole or a part of the pipeline segment being covered by a heat insulation member (109); and 3) a pipe-like structure or building structural body having good thermal insulation properties; one end of the pipeline structure (301) being formed with one or more than one fluid inlet/outlet port (3011) for communicating with the fluid inlet/outlet port (1011) of the heat gaining device (101) having one or more than one flowpath. The other end of the pipeline structure (301) is formed with one or more than one fluid inlet/outlet port (3012) which are jointly configured to lead to the protection net and protection cover device (1010) for each of the fluid inlet/outlet ports for transporting the heat exchange fluid (104).

Pipeline structure (401) is constituted by a fluid pipeline structure having one or more than one flowpath with a cross section D-D having round or other geometric shapes, the pipeline structure (401) being configured by one or more than one of the following means: 1) a material having good heat conductivity; 2) a material having good heat conductivity, the exterior of the whole or a part of the pipeline segment being covered by a heat insulation member (109); and 3) a pipe-like structure or building structural body having good thermal insulation properties; one end of the pipeline structure (401) being formed with one or more than one fluid inlet/outlet port (4012) for communicating with the fluid inlet/outlet port (1012) of the heat gaining device (101) having one or more than one flowpath. The other end of the pipeline structure (401) is formed with one or more than one fluid inlet/outlet port (4011) leading to the protection net and protection cover device (1010) for each of the fluid inlet/outlet ports for transporting the heat exchange fluid (104).

Outward-expanding arc-shaped fluid chamber (108) is constituted by an outward-expanding arc-shaped flowpath structure formed at one or more than one of the turning locations of the open-loop type flowpath configured by the heat gaining device (101), the pipeline structure (301), the temperature differentiation body (103) and the pipeline structure (401), for temporarily storing a part of the heat exchange fluid (104) and moderating the flow speed of the heat exchange fluid (104), thereby reducing the flow damping of the open-loop type flowpath to the heat exchange fluid (104);

The volume of the fluid stored in the outward-expanding arc-shaped fluid chamber (108) installed close to the fluid inlet/outlet port of the heat gaining device (101) is relatively larger, and therefore the total heat capacity is larger, when the heat gaining device (101) introduces thermal energy from the temperature differentiation body which is disposed at the exterior and in contact with said device. Although the thermal energy is transmitted towards two sides through the fluid, the fluid at the side where the outward-expanding arc-shaped fluid chamber (108) is installed on the heat gaining device (101) generates a smaller temperature difference while the other side where the outward-expanding arc-shaped fluid chamber (108) is not installed generates a greater temperature difference, thereby forming temperature differentiation at the two inlet/outlet ports on the two sides of the heat gaining device (101).

The above-described open-loop natural thermal energy releasing system includes an open-loop flowpath with partial fluid return configured by at least a heat gaining device (101), a temperature differentiation body (103), at least a pipeline structure (301) and at least a pipeline structure (401), wherein the heat gaining device (101), the pipeline structure (301) and the pipeline structure (401) can be integrally formed or assembled by plural components, and the dimension and shape at each connection location for the assembly is gradually-altered to form a smooth transition, the smooth transition reducing damping while the fluid is flowing, thereby facilitating the flow circulation of the fluid.

Figure 4:
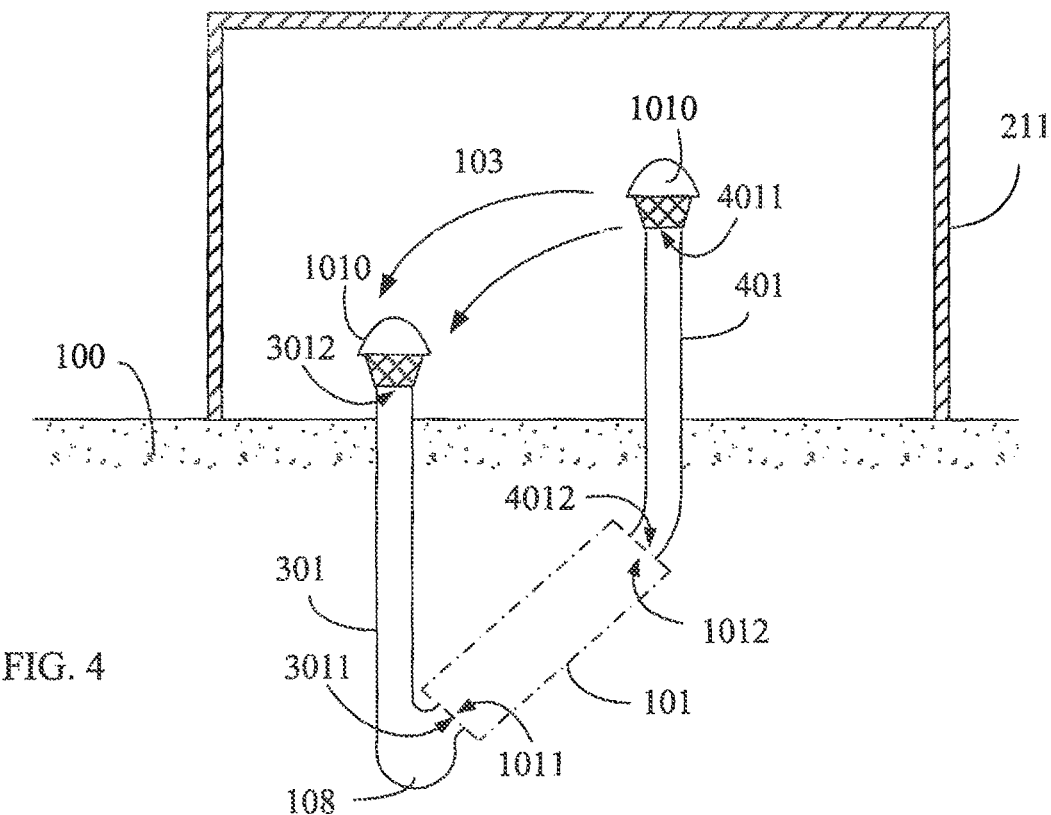
FIG. 4 is a lateral structural view showing an embodiment in which the outward-expanding arc-shaped fluid chamber (108) is installed at a bottom of a first pipeline structure (301) leading to an upwardly-inclined heat gaining device (101) disposed in a natural thermal energy storage device (100), a fluid inlet/outlet port (1012) of the heat gaining device (101) is connected to a fluid inlet/outlet port (4012) of a pipeline structure (401), and a closed-type space limiting and flow direction guiding structure (211) is installed between a fluid inlet/outlet port (4011) of the pipeline structure (401) and a fluid inlet/outlet port (3012) of the pipeline structure (301).

FIG. 4 is a lateral structural view showing an embodiment of the present invention in which the bottom of the linear pipeline structure (301) is installed with the outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the pipeline structure (401) and the fluid inlet/outlet port (3012) of the pipeline structure (301).

In the open-loop natural thermal energy releasing system shown in FIG. 4, the bottom of the linear pipeline structure (301) is installed with the outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and the closed-type space limiting and flow direction guiding structure (211) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104).

Figure 5:
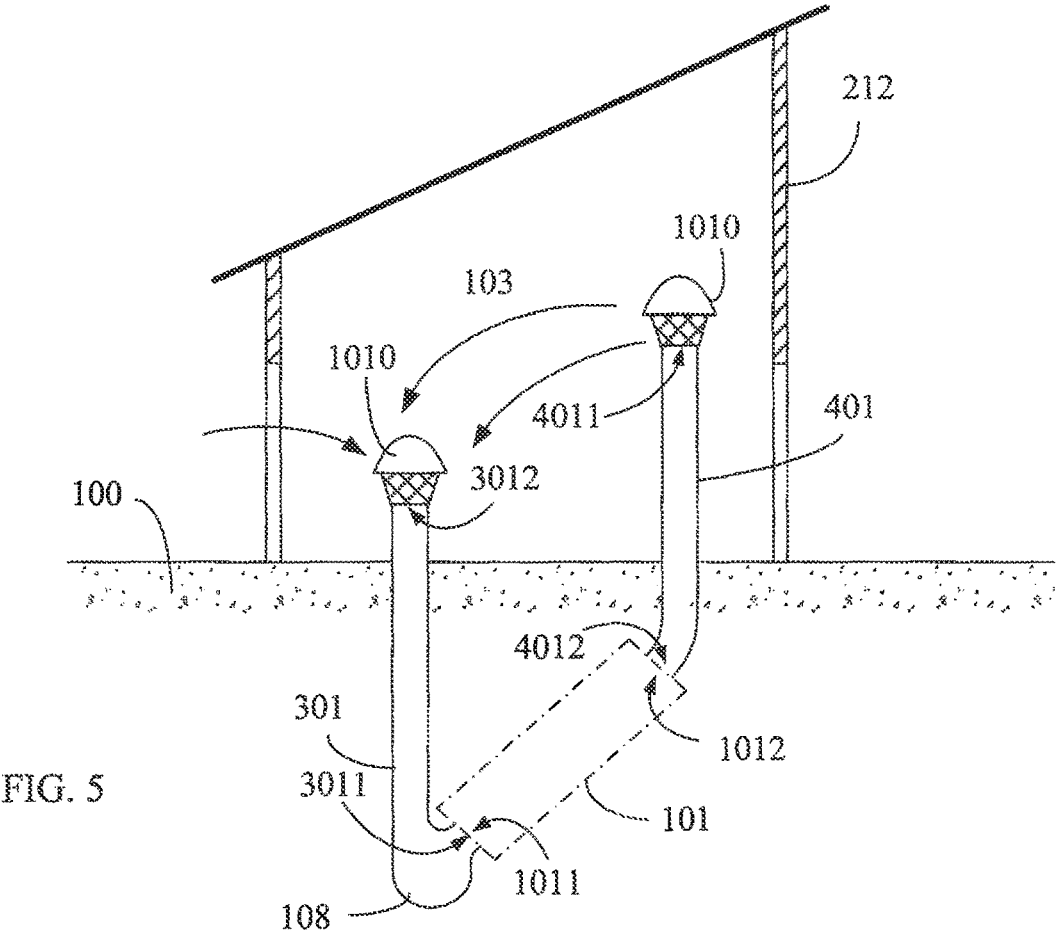
FIG. 5 is a lateral structural view of an embodiment in which the outward-expanding arc-shaped fluid chamber (108) is installed at a bottom of a linear pipeline structure (301) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the pipeline structure (401) and the fluid inlet/outlet port (3012) of the pipeline structure (301).

FIG. 5 is a lateral structural view showing an embodiment of the present invention in which the bottom of the linear pipeline structure (103) is installed with the outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the pipeline structure (401) and the fluid inlet/outlet port (3012) of the pipeline structure (301).

In the open-loop natural thermal energy releasing system of FIG. 5, the bottom of the linear pipeline structure (301) is installed with the outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and the semi-closed type space limiting and flow direction guiding structure (212) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104), as well as for exchanging fluid with the exterior.

Figure 6:
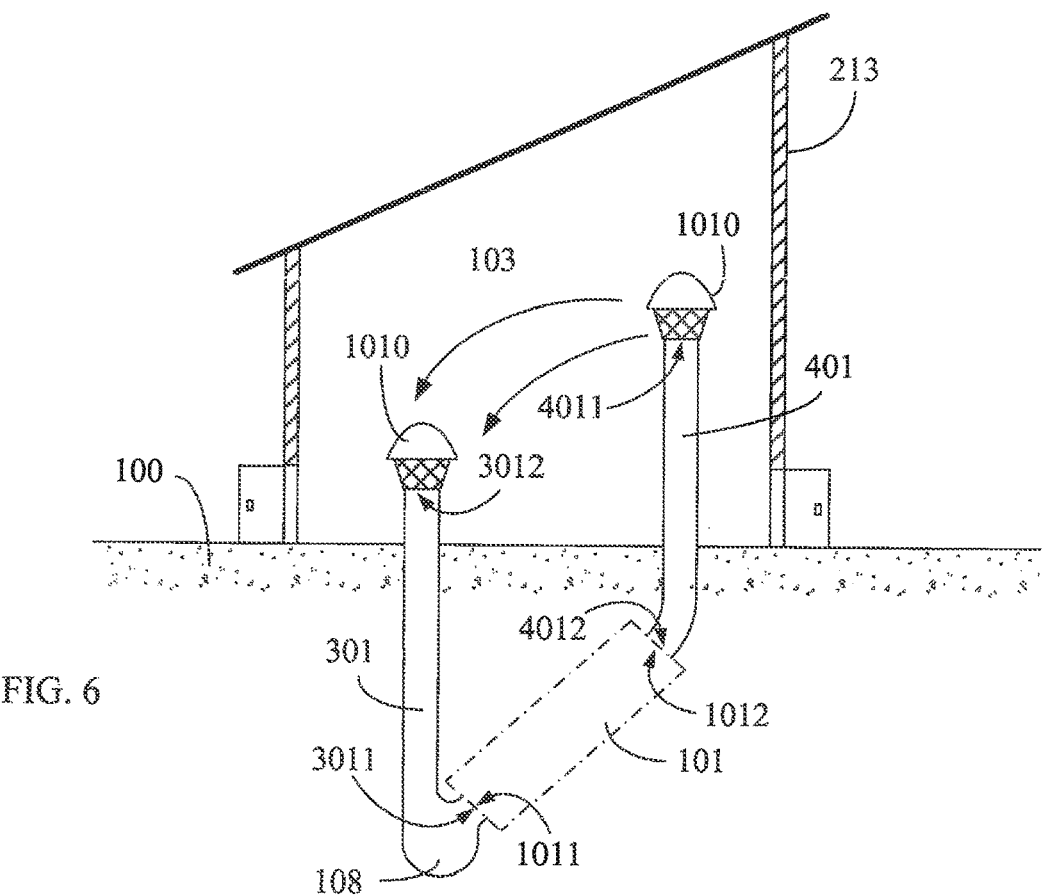
FIG. 6 is a lateral structural view in which the outward-expanding arc-shaped fluid chamber (108) is installed at a bottom of the linear pipeline structure (301) and leads to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing is installed between the fluid inlet/outlet port (4011) of the pipeline structure (401) and the fluid inlet/outlet port (3012) of the pipeline structure (301).

FIG. 6 is a lateral structural view showing an embodiment of the present invention in which the bottom of linear pipeline structure (301) is installed with the outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing is installed between the fluid inlet/outlet port (4011) of the pipeline structure (401) and the fluid inlet/outlet port (3012) of the pipeline structure (301).

In the open-loop natural thermal energy releasing system of FIG. 6, the bottom of the linear pipeline structure (301) is installed with the outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and the space limiting and flow direction guiding structure (213) capable of controlling door opening or closing is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104). The space limiting and flow direction guiding structure (213) capable of controlling door opening or closing allows the limited space to be equipped with closed-type or semi-closed type operational function.

Figure 7:
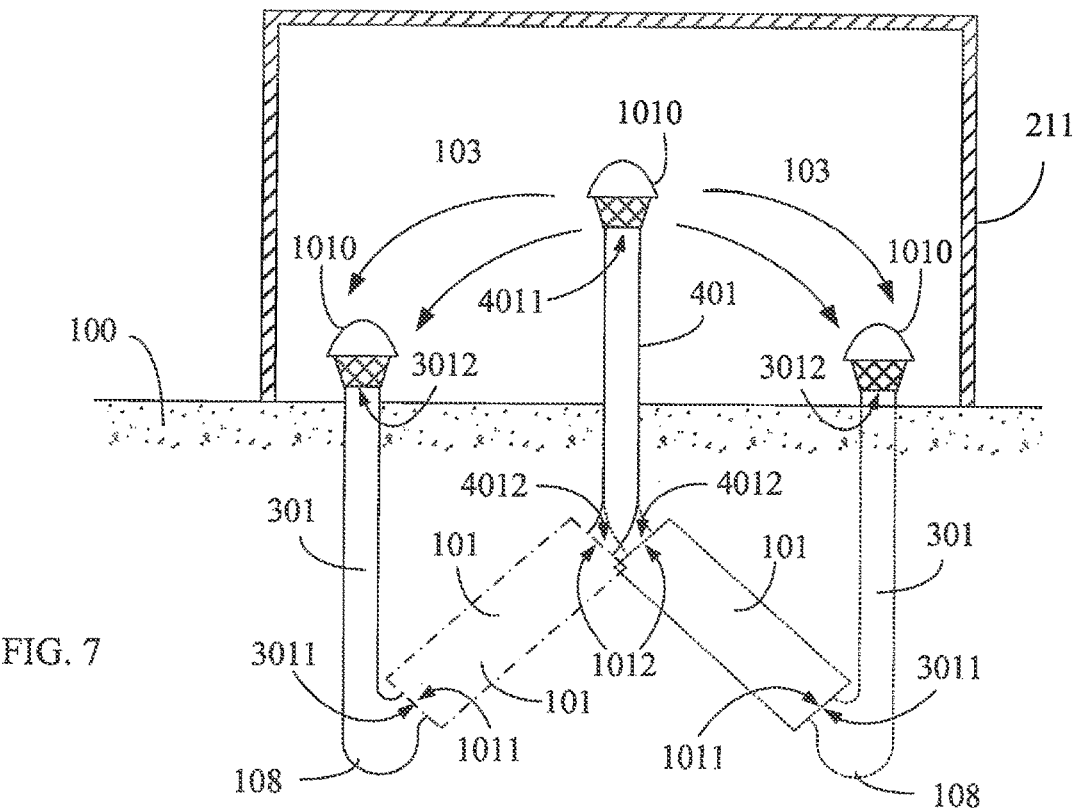
FIG. 7 is a lateral structural view in which the linear pipeline structure (301) and the pipeline structures (401) of at least two open-loop natural thermal energy releasing systems are staggeringly disposed in the natural thermal energy storage body (100), wherein the bottom of each open-loop natural thermal energy releasing system is installed with an outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the pipeline structure (401) and the fluid inlet/outlet port (3012) of the pipeline structure (301).

FIG. 7 is a lateral structural view showing an embodiment in which the linear pipeline structure (301) and the pipeline structures (401) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the pipeline structure (401) and the fluid inlet/outlet port (3012) of the pipeline structure (301).

In the open-loop natural thermal energy releasing system of FIG. 7, the linear pipeline structure (301) and the pipeline structures (401) of the at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and the closed-type space limiting and flow direction guiding structure (211) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104).

Figure 8:
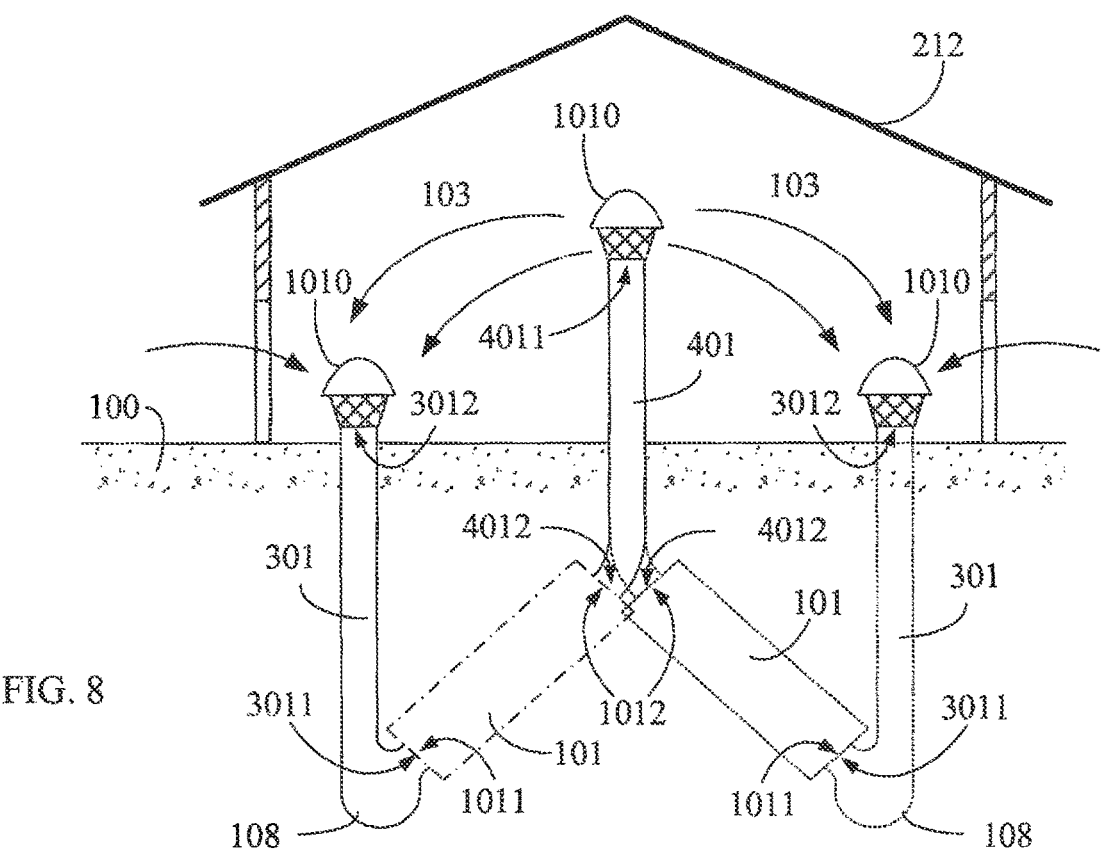
FIG. 8 is a lateral structural view of an embodiment in which the linear pipeline structure (301) and the pipeline structures (401) of at least two open-loop natural thermal energy releasing systems are staggeringly disposed in the natural thermal energy storage body (100), wherein the bottom of each open-loop natural thermal energy releasing system is installed with an outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the pipeline structure (401) and the fluid inlet/outlet port (3012) of the pipeline structure (301).

FIG. 8 is a lateral structural view showing an embodiment in which the linear pipeline structure (301) and the pipeline structures (401) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) being connected to the fluid inlet/outlet port (4012) of the pipeline structure (401), and a semi-closed type space limiting and flow direction guiding structure (212) being installed between the fluid inlet/outlet port (4011) of the pipeline structure (401) and the fluid inlet/outlet port (3012) of the pipeline structure (301).

In the open-loop natural thermal energy releasing system of FIG. 8, the linear pipeline structure (301) and the pipeline structures (401) of the at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and the semi-closed type space limiting and flow direction guiding structure (212) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104), as well as for exchanging fluid with the exterior.

Figure 9:
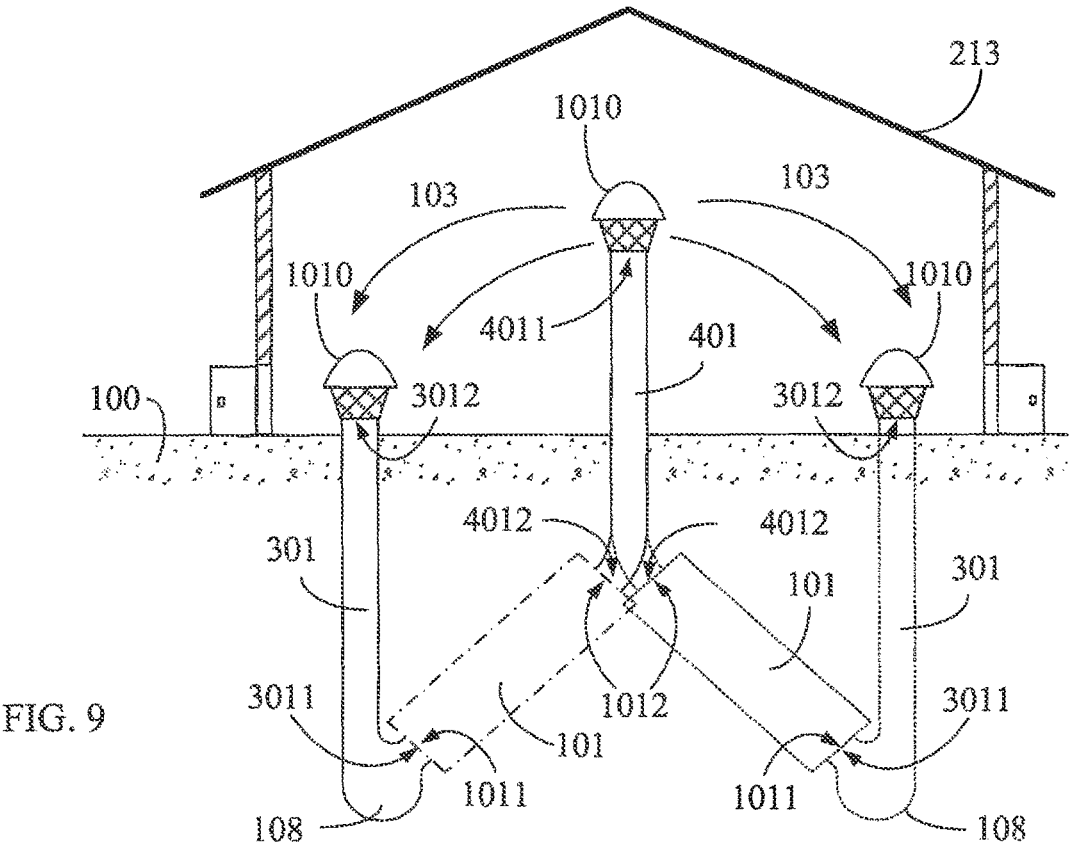
FIG. 9 is a lateral structural view of an embodiment in which the linear pipeline structure (301) and the pipeline structures (401) of at least two open-loop natural thermal energy releasing systems are staggeringly disposed in the natural thermal energy storage body (100), wherein the bottom of each open-loop natural thermal energy releasing system is installed with an outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing is installed between the fluid inlet/outlet port (4011) of the pipeline structure (401) and the fluid inlet/outlet port (3012) of the pipeline structure (301).

FIG. 9 is a lateral structural view of an embodiment in which the linear pipeline structure (301) and the pipeline structures (401) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing is installed between the fluid inlet/outlet port (4011) of the pipeline structure (401) and the fluid inlet/outlet port (3012) of the pipeline structure (301).

In the open-loop natural thermal energy releasing system of FIG. 9, the linear pipeline structure (301) and the pipeline structures (401) of the at least two open-loop natural thermal energy releasing systems with partial reflux are staggeringly disposed in the natural thermal energy storage body (100), wherein the bottom of each open-loop natural thermal energy releasing system with partial reflux is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and the space limiting and flow direction guiding structure (213) capable of controlling door opening or closing is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104), wherein the space limiting and flow direction guiding structure (213) is capable of controlling the door opening or closing for allowing the limited space to be equipped with a closed-type or semi-closed type operational function.

Figure 10:
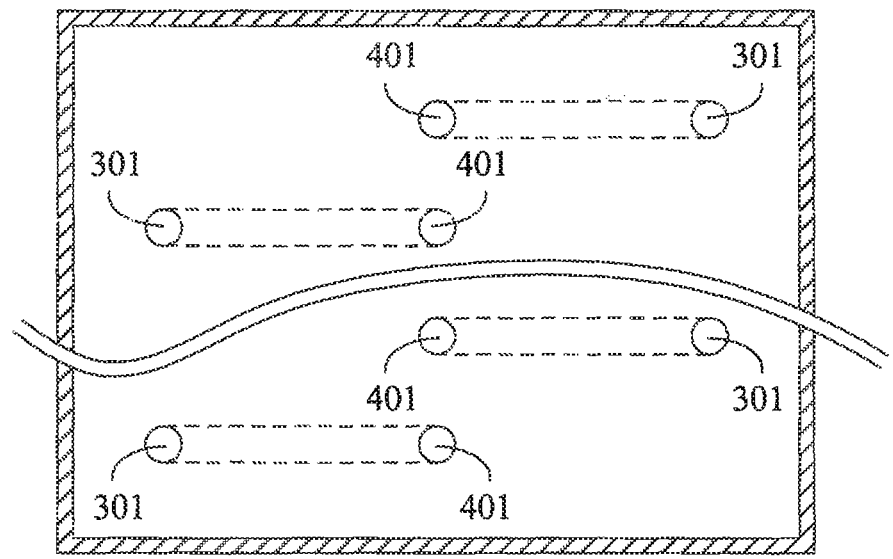
FIG. 10 is a top view showing a cross section of the structures illustrated in FIG. 7 to FIG. 9 taken along the horizontal.

FIG. 10 is a top view showing a cross section of the structures shown in FIG. 7 to FIG. 9 taken along the horizontal.

As shown in FIG. 10, in each set of open-loop natural thermal energy releasing systems, the heat gaining devices (101) are staggeringly distributed in the natural thermal energy storage body (100), and two ends thereof are extended to the temperature differentiation body (103) through the pipeline structure (301) and the pipeline structure (401).

Figure 11:
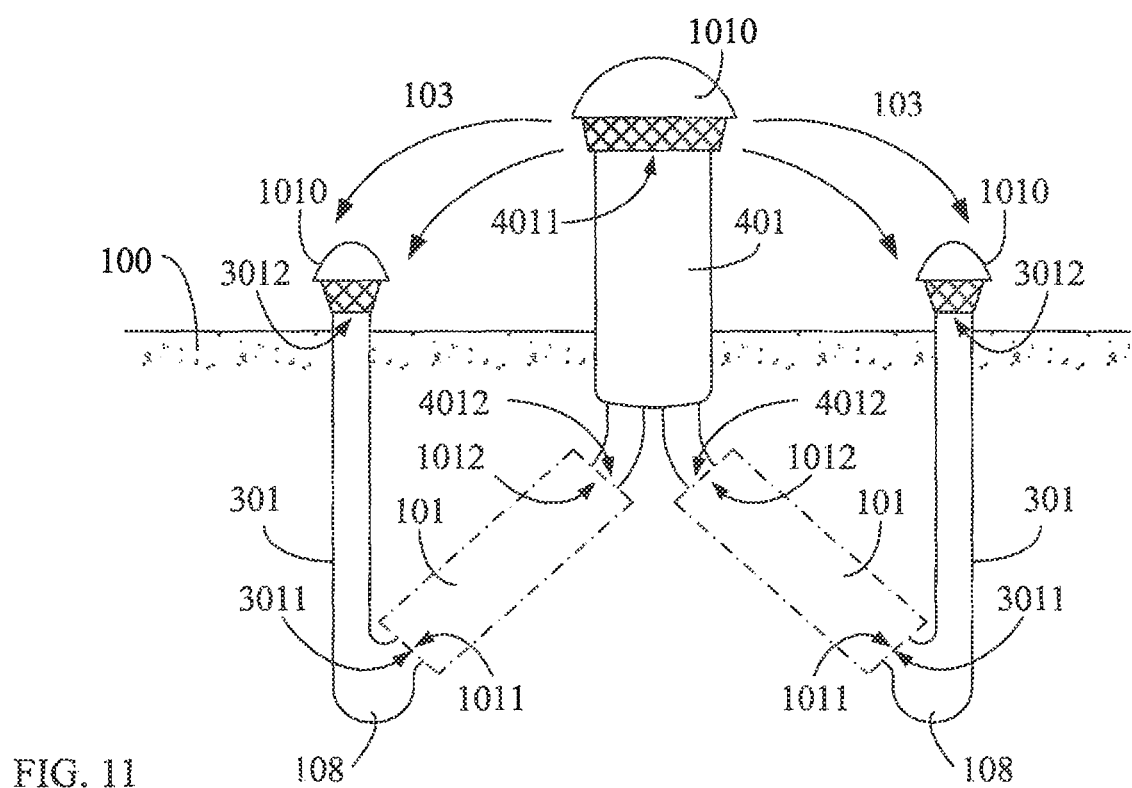
FIG. 11 is a lateral structural view showing an embodiment in which two or more than two pipeline structures (301) have a radially-expanded root part, wherein the bottom of each root part is installed with an outward-expanding arc-shaped fluid chamber (108), and the fluid inlet/outlet port (3011) of each individual outward-expanding arc-shaped fluid chamber (108) leads to the fluid inlet/outlet port (1011) of the upward-inclined heat gaining device (101), and the fluid inlet/outlet port (1012) of the heat gaining device (101) being connected to the fluid inlet/outlet port (4012) of the shared pipeline structure (401).

The embodiment disclosed in FIG. 1 can be further formed as a jointly-configured structure and provided with a jointly-configured pipeline structure (401), as follows:

FIG. 11 is a lateral structural view showing two or more than two pipeline structures (301) having a radially-expanded root part, wherein the bottom of each root part is installed with an outward-expanding arc-shaped fluid chamber (108), the fluid inlet/outlet port (3011) of each individual outward-expanding arc-shaped fluid chamber (108) leading to the fluid inlet/outlet port (1011) of the upward-inclined heat gaining device (101), and the fluid inlet/outlet port (1012) of the heat gaining device (101) being connected to the fluid inlet/outlet port (4012) of the shared pipeline structure (401).

In the open-loop natural thermal energy releasing system of FIG. 11, two or more than two pipeline structures (301) having a radially-expanded root part are provided, the bottom of each root part being installed with the outward-expanding arc-shaped fluid chamber (108), the fluid inlet/outlet port (3011) of each individual outward-expanding arc-shaped fluid chamber (108) leading to the fluid inlet/outlet port (1011) of the upward-inclined heat gaining device (101), and the fluid inlet/outlet port (1012) of the heat gaining device (101) being connected to the fluid inlet/outlet port (4012) of the shared pipeline structure (401).

Figure 12:
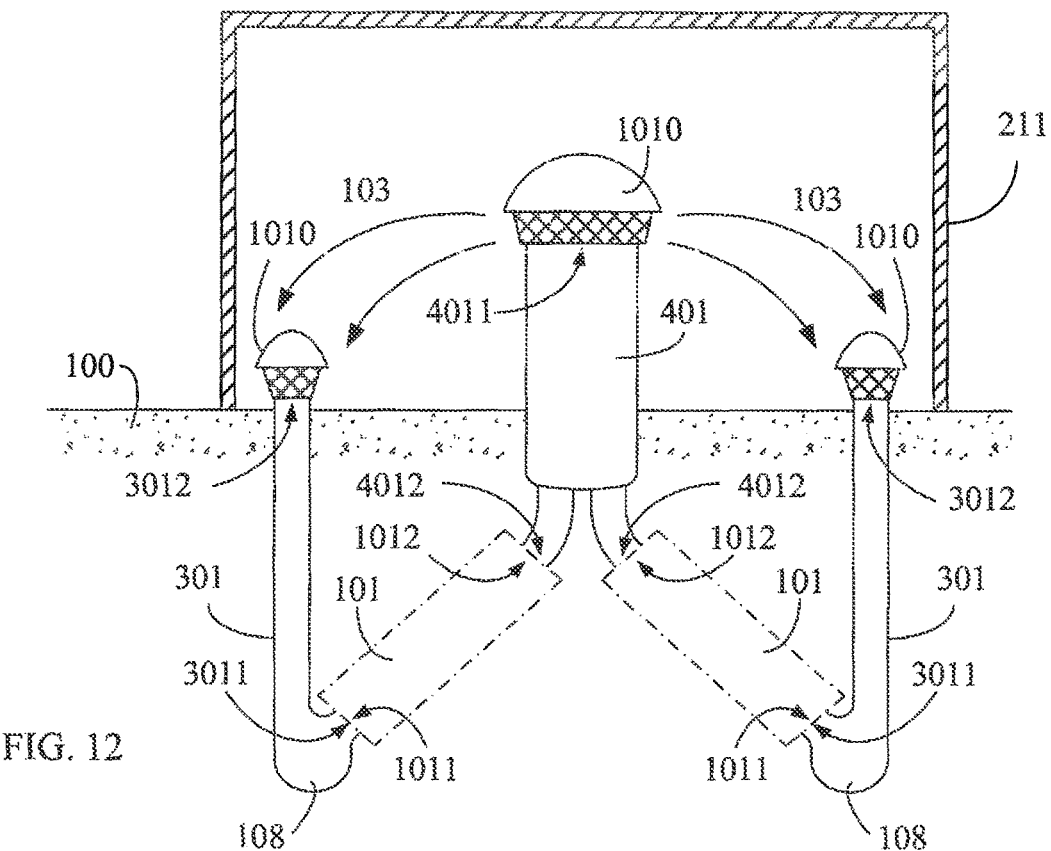
FIG. 12 is a lateral structural view showing an embodiment in which two or more than two pipeline structures (301) have a radially-expanded root part, wherein the bottom of each root part is installed with an outward-expanding arc-shaped fluid chamber (108), the fluid inlet/outlet port (3011) of each individual outward-expanding arc-shaped fluid chamber (108) leads to the fluid inlet/outlet port (1011) of the upward-inclined heat gaining device (101), the fluid inlet/outlet port (1012) of the heat gaining device (101) is connected to the fluid inlet/outlet port (4012) of the shared pipeline structure (401), and a closed-type space limiting and flow direction guiding structure (211) is installed between the fluid inlet/outlet port (4011) of the pipeline structure (401) and the fluid inlet/outlet port (3012) of the pipeline structure (301), according to the present invention.

FIG. 12 is a lateral structural view showing an embodiment in which two or more than two pipeline structures (301) have a radially-expanded root part, wherein the bottom of each root part is installed with an outward-expanding arc-shaped fluid chamber (108), the fluid inlet/outlet port (3011) of each individual outward-expanding arc-shaped fluid chamber (108) leading to the fluid inlet/outlet port (1011) of the upward-inclined heat gaining device (101), the fluid inlet/outlet port (1012) of the heat gaining device (101) being connected to the fluid inlet/outlet port (4012) of the shared pipeline structure (401), and a closed-type space limiting and flow direction guiding structure (211) is installed between the fluid inlet/outlet port (4011) of the pipeline structure (401) and the fluid inlet/outlet port (3012) of the pipeline structure (301).

In the open-loop natural thermal energy releasing system of FIG. 12, two or more than two of the pipeline structures (301) having the radially-expanded root part are provided, the bottom of each root part being installed with the outward-expanding arc-shaped fluid chamber (108), the fluid inlet/outlet port (3011) of each individual outward-expanding arc-shaped fluid chamber (108) leading to the fluid inlet/outlet port (1011) of the upward-inclined heat gaining device (101), the fluid inlet/outlet port (1012) of the heat gaining device (101) being connected to the fluid inlet/outlet port (4012) of the shared pipeline structure (401), and a closed-type space limiting and flow direction guiding structure (211) being installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104).

Figure 13:
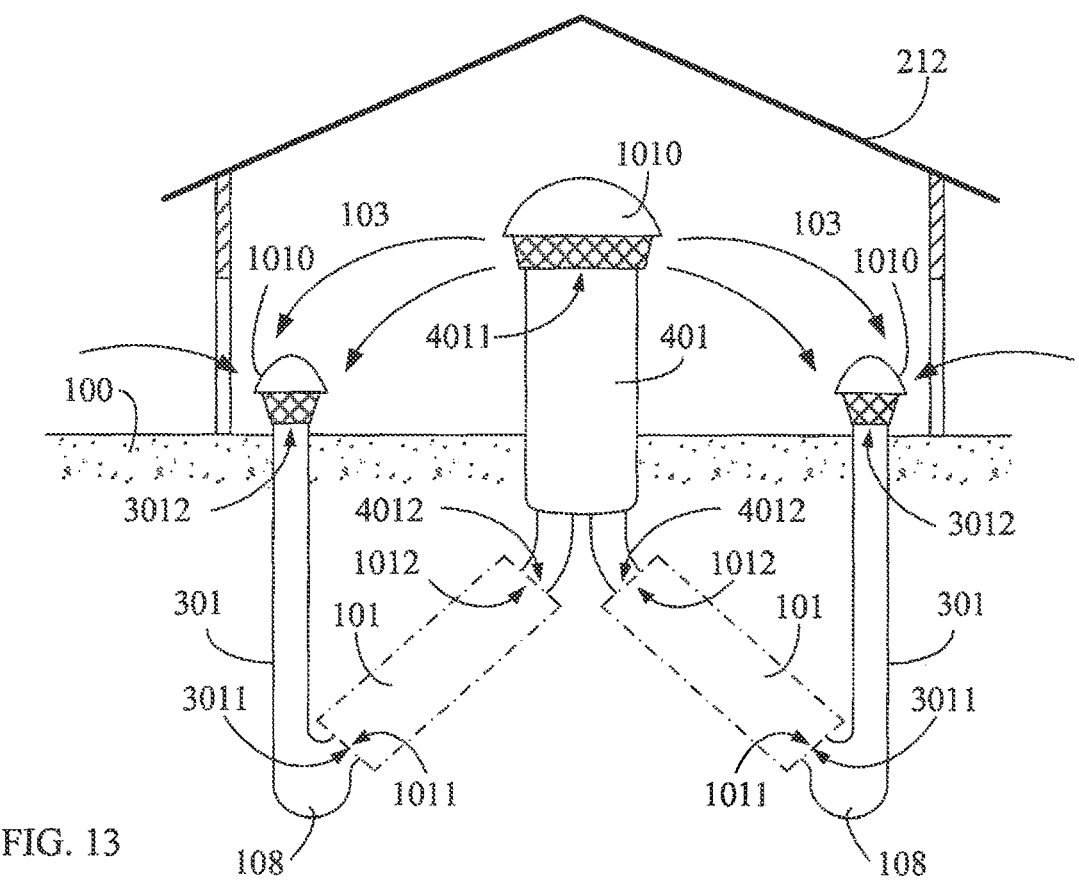
FIG. 13 is a lateral structural view showing an embodiment in which two or more than two pipeline structures (301) have a radially-expanded root part, wherein the bottom of each root part is installed with an outward-expanding arc-shaped fluid chamber (108), the fluid inlet/outlet port (3011) of each individual outward-expanding arc-shaped fluid chamber (108) leads to the fluid inlet/outlet port (1011) of the upward-inclined heat gaining device (101), and the fluid inlet/outlet port (1012) of the heat gaining device (101) is connected to the fluid inlet/outlet port (4012) of the shared pipeline structure (401), and the semi-closed type space limiting and flow direction guiding structure (212) is installed between the fluid inlet/outlet port (4011) of the pipeline structure (401) and the fluid inlet/outlet port (3012) of the pipeline structure (301).

FIG. 13 is a lateral structural view showing an embodiment in which two or more than two pipeline structures (301) have the radially-expanded root part, wherein the bottom of each root part is installed with an outward-expanding arc-shaped fluid chamber (108), the fluid inlet/outlet port (3011) of each individual outward-expanding arc-shaped fluid chamber (108) leading to the fluid inlet/outlet port (1011) of the upward-inclined heat gaining device (101), the fluid inlet/outlet port (1012) of the heat gaining device (101) being connected to the fluid inlet/outlet port (4012) of the shared pipeline structure (401), and a semi-closed type space limiting and flow direction guiding structure (212) being installed between the fluid inlet/outlet port (4011) of the pipeline structure (401) and the fluid inlet/outlet port (3012) of the pipeline structure (301).

In the open-loop natural thermal energy releasing system of FIG. 13, two or more than two pipeline structures (301) having the radially-expanded root part are provided, the bottom of each root part being installed with the outward-expanding arc-shaped fluid chamber (108), the fluid inlet/outlet port (3011) of each individual outward-expanding arc-shaped fluid chamber (108) leading to the fluid inlet/outlet port (1011) of the upward-inclined heat gaining device (101), the fluid inlet/outlet port (1012) of the heat gaining device (101) being connected to the fluid inlet/outlet port (4012) of the shared pipeline structure (401), and the semi-closed type space limiting and flow direction guiding structure (212) being installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104), as well as for exchanging fluid with the exterior.

Figure 14:
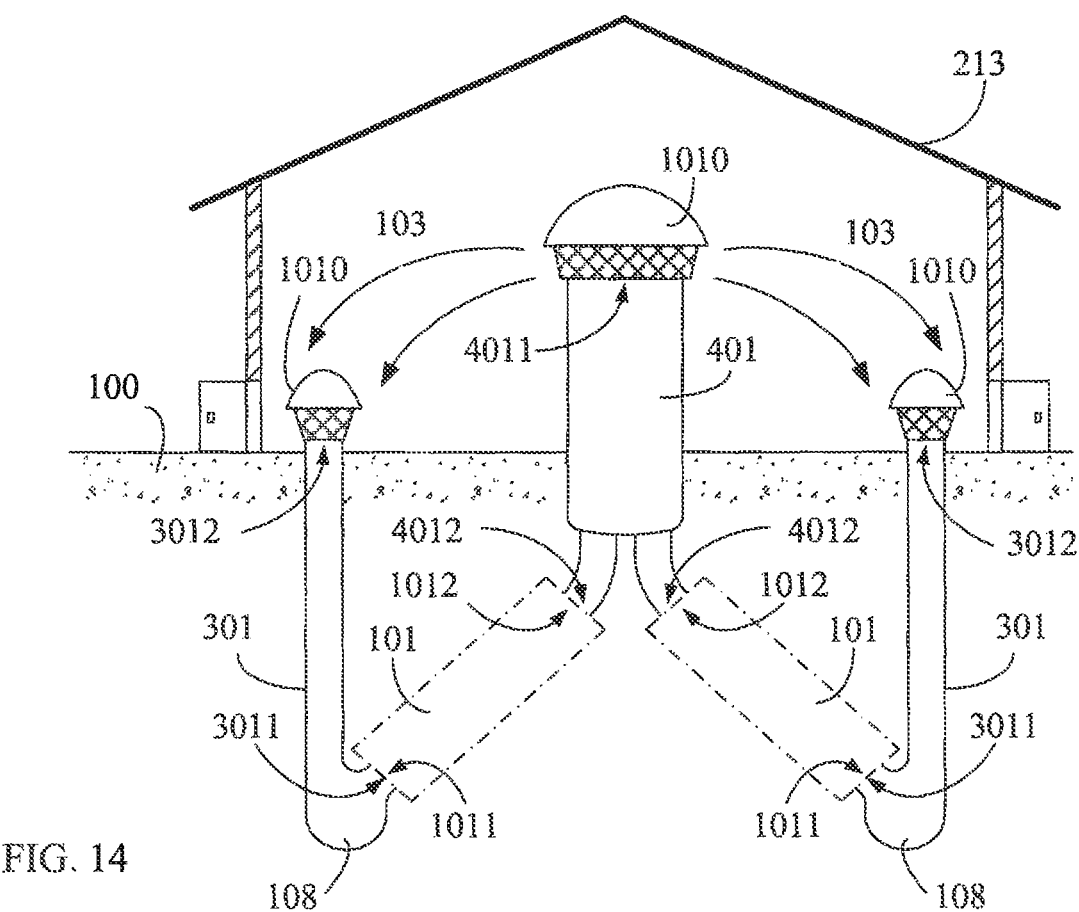
FIG. 14 is a lateral structural view showing an embodiment in which two or more than two pipeline structures (301) have a radially-expanded root part, wherein the bottom of each root part is installed with an outward-expanding arc-shaped fluid chamber (108), the fluid inlet/outlet port (3011) of each individual outward-expanding arc-shaped fluid chamber (108) leads to the fluid inlet/outlet port (1011) of the upward-inclined heat gaining device (101), and the fluid inlet/outlet port (1012) of the heat gaining device (101) is connected to the fluid inlet/outlet port (4012) of the shared pipeline structure (401), and a space limiting and flow direction guiding structure (213) capable of controlling door opening or closing is installed between the fluid inlet/outlet port (4011) of the pipeline structure (401) and the fluid inlet/outlet port (3012) of the pipeline structure (301).

FIG. 14 is a lateral structural view showing an embodiment in which two or more than two pipeline structures (301) have the radially-expanded root part, wherein the bottom of each root part is installed with an outward-expanding arc-shaped fluid chamber (108), the fluid inlet/outlet port (3011) of each individual outward-expanding arc-shaped fluid chamber (108) leading to the fluid inlet/outlet port (1011) of the upward-inclined heat gaining device (101), the fluid inlet/outlet port (1012) of the heat gaining device (101) being connected to the fluid inlet/outlet port (4012) of the shared pipeline structure (401), and a space limiting and flow direction guiding structure (213) capable of controlling door opening or closing being installed between the fluid inlet/outlet port (4011) of the pipeline structure (401) and the fluid inlet/outlet port (3012) of the pipeline structure (301).

In the open-loop natural thermal energy releasing system shown in FIG. 4, two or more than two pipeline structures (301) having the radially-expanded root part are provided, the bottom of each root part being installed with the outward-expanding arc-shaped fluid chamber (108), the fluid inlet/outlet port (3011) of each individual outward-expanding arc-shaped fluid chamber (108) leading to the fluid inlet/outlet port (1011) of the upward-inclined heat gaining device (101), the fluid inlet/outlet port (1012) of the heat gaining device (101) being connected to the fluid inlet/outlet port (4012) of the shared pipeline structure (401), and the space limiting and flow direction guiding structure (213)

capable of controlling door opening or closing (213) being installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104). The space limiting and flow direction guiding structure (213) is capable of controlling the door opening or closing for allowing the limited space to be equipped with a closed-type or semi-closed type operational function.

Figure 15:
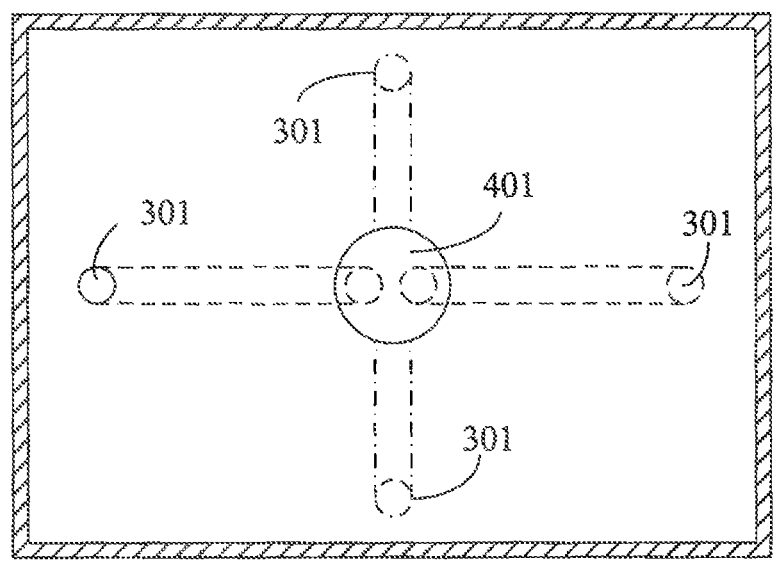
FIG. 15 is a top view showing a cross section of the structures shown in FIG. 11 to FIG. 14 taken along the horizontal.

FIG. 15 is a top view showing a cross section of the structures of FIG. 11 to FIG. 14 taken along the horizontal.

As shown in FIG. 15, the pipeline structures (301) are individually distributed in a radial and vertical manner and at the periphery of the shared pipeline structure (401), each individual bottom leading to a respective individual outward-expanding arc-shaped fluid chamber (108), the fluid inlet/outlet port (3011) of each outward-expanding arc-shaped fluid chamber (108) leading to a respective fluid inlet/outlet port (1011) of the upward-inclined heat gaining device (101), and through a shunt manifold, the fluid inlet/outlet port (1012) of the heat gaining device (101) leading to the fluid inlet/outlet port (4011) via the shared pipeline structure (401).

Figure 16:
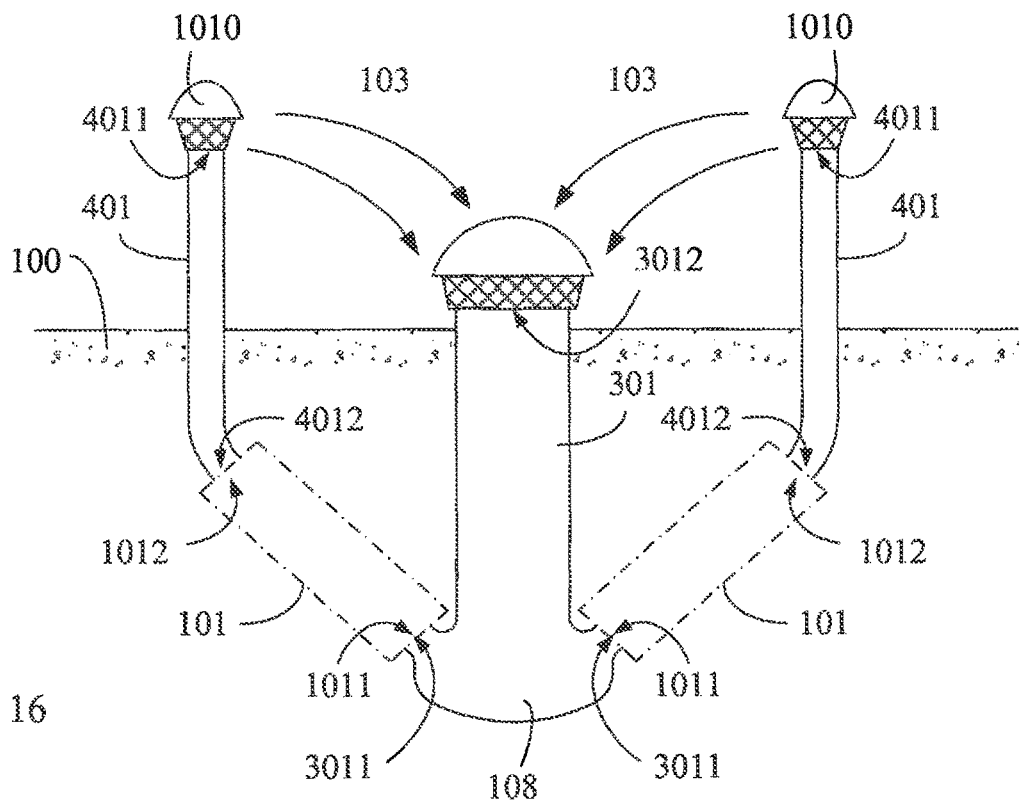
FIG. 16 is a lateral structural view showing an embodiment in which the bottom of the root part of a shared pipeline structure (301) is installed with an outward-expanding arc-shaped fluid chamber (108), an individual fluid inlet/outlet port (3011) of the outward-expanding arc-shaped fluid chamber (108) leads to the fluid inlet/outlet port (1011) of the upward-inclined heat gaining device (101), and the fluid inlet/outlet port (1012) of the heat gaining device (101) is connected to the fluid inlet/outlet port (4012) of two or more than two pipeline structures (401) having the radially-expanded root part.

The embodiment disclosed in FIG. 1 can be further formed as a jointly-configured structure and provided with a jointly-configured pipeline structure (301), as follows:

FIG. 16 is a lateral structural view showing an embodiment of the present invention provided with a shared pipeline structure (301), wherein the bottom of the shared pipeline structure (301) forms a radially expanded root part installed with an outward-expanding arc-shaped fluid chamber (108), the individual fluid inlet/outlet port (3011) of the outward-expanding arc-shaped fluid chamber (108) leading to the fluid inlet/outlet port (1011) of the upward-inclined heat gaining device (101), and the fluid inlet/outlet port (1012) of the heat gaining device (101) being connected to the fluid inlet/outlet port (4012) of two or more than two pipeline structures (401).

In the open-loop natural thermal energy releasing system of FIG. 16, the bottom of the root part of the shared pipeline structure (301) is installed with the outward-expanding arc-shaped fluid chamber (108), the individual fluid inlet/outlet port (3011) of the outward-expanding arc-shaped fluid chamber (108) leads to the fluid inlet/outlet port (1011) of the upward-inclined heat gaining device (101), and the fluid inlet/outlet port (1012) of the heat gaining device (101) is connected to the fluid inlet/outlet port (4012) of two or more than two of the pipeline structures (401) extending from the radially-expanded root part of the shared pipeline structure (301).

Figure 17:
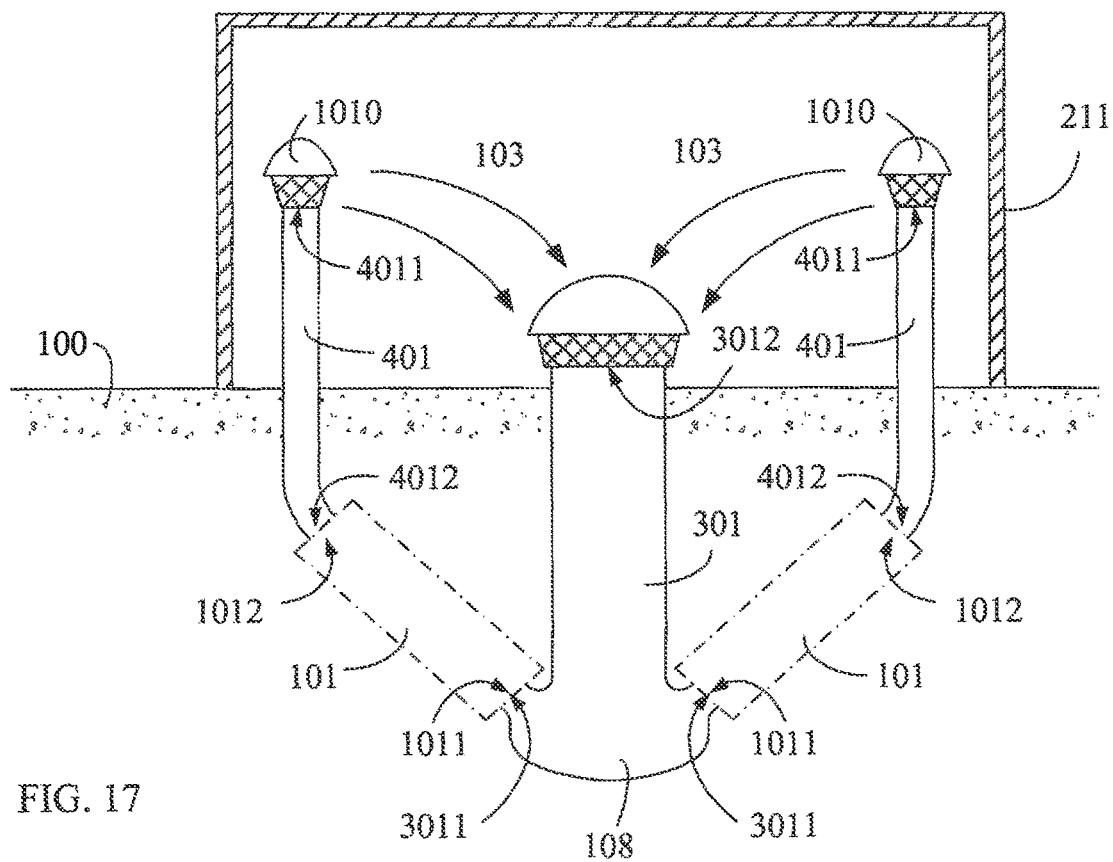
FIG. 17 is a lateral structural view showing an embodiment in which the bottom of the root part of a shared pipeline structure (301) is installed with an outward-expanding arc-shaped fluid chamber (108), the individual fluid inlet/outlet port (3011) of the outward-expanding arc-shaped fluid chamber (108) leads to the fluid inlet/outlet port (1011) of the upward-inclined heat gaining device (101), the fluid inlet/outlet port (1012) of the heat gaining device (101) is connected to the fluid inlet/outlet port (4012) of two or more than two pipeline structures (401) having the radially-expanded root part, and a closed-type space limiting and flow direction guiding structure (211) is installed between the fluid inlet/outlet port (4011) of the pipeline structure (401) and the fluid inlet/outlet port (3012) of the pipeline structure (301).

FIG. 17 is a lateral structural view showing an embodiment of the present invention provided with a shared pipeline structure (301), wherein the bottom of the root part is installed with an outward-expanding arc-shaped fluid chamber (108), the individual fluid inlet/outlet port (3011) of the outward-expanding arc-shaped fluid chamber (108) leading to the fluid inlet/outlet port (1011) of the upward-inclined heat gaining device (101), the fluid inlet/outlet port (1012) of the heat gaining device (101) being connected to the fluid inlet/outlet port (4012) of two or more than two pipeline structures (401) extending from the radially-expanded root part, and a closed-type space limiting and flow direction guiding structure (211) being installed between the fluid inlet/outlet port (4011) of the pipeline structure (401) and the fluid inlet/outlet port (3012) of the pipeline structure (301).

In the open-loop natural thermal energy releasing system of FIG. 17, the shared pipeline structure (301) is provided, wherein the bottom of the root part is installed with the outward-expanding arc-shaped fluid chamber (108), the individual fluid inlet/outlet port (3011) of the outward-expanding arc-shaped fluid chamber (108) leads to the fluid inlet/outlet port (1011) of the upward-inclined heat gaining device (101), the fluid inlet/outlet port (1012) of the heat gaining device (101) is connected to the fluid inlet/outlet port (4012) of two or more than two of the pipeline structures (401), and the closed-type space limiting and flow direction guiding structure (211) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104).

Figure 18:
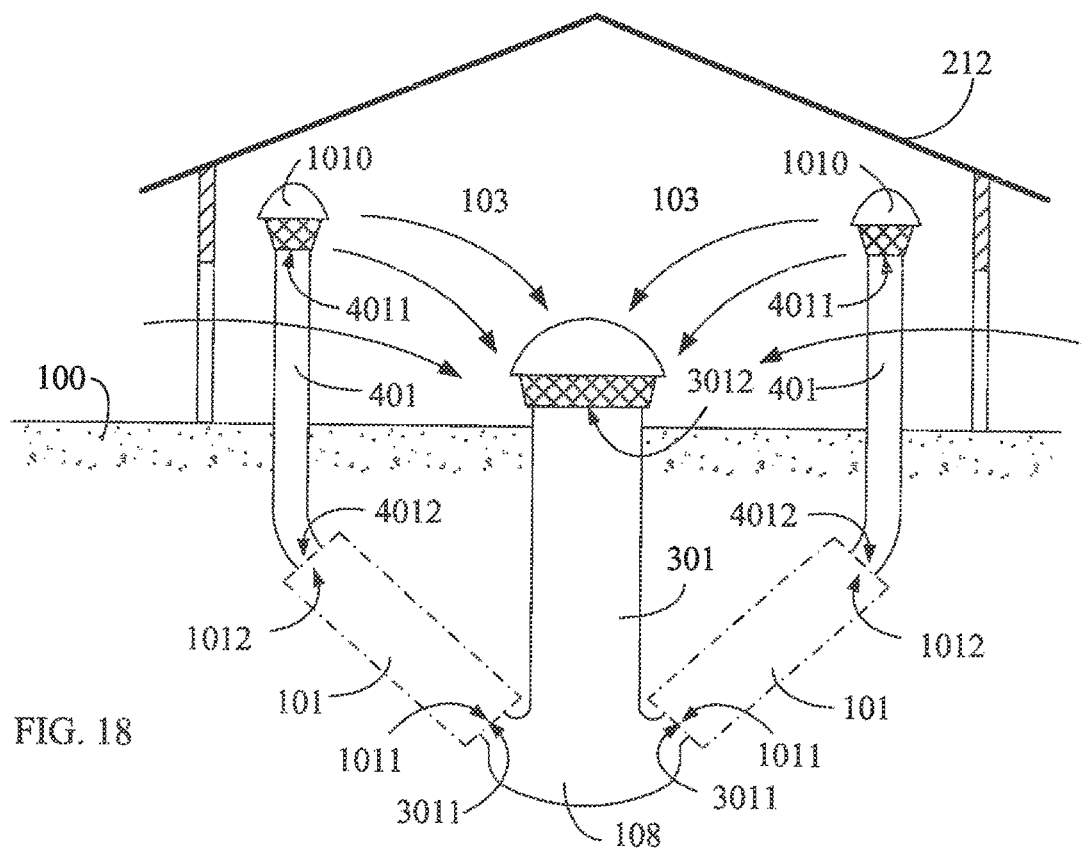
FIG. 18 is a lateral structural view showing an embodiment in which the bottom of the root part of a shared pipeline structure (301) is installed with an outward-expanding arc-shaped fluid chamber (108), the individual fluid inlet/outlet port (3011) of the outward-expanding arc-shaped fluid chamber (108) leads to the fluid inlet/outlet port (1011) of the upward-inclined heat gaining device (101), the fluid inlet/outlet port (1012) of the heat gaining device (101) is connected to the fluid inlet/outlet port (4012) of two or more than two of the pipeline structures (401) having the radially-expanded root part, and a semi-closed type space limiting and flow direction guiding structure (212) is installed between the fluid inlet/outlet port (4011) of the pipeline structure (401) and the fluid inlet/outlet port (3012) of the pipeline structure (301).

FIG. 18 is a lateral structural view showing an embodiment of the present invention provided with a shared pipeline structure (301), wherein the bottom of the root part is installed with the outward-expanding arc-shaped fluid chamber (108), the individual fluid inlet/outlet port (3011) of the outward-expanding arc-shaped fluid chamber (108) leading to the fluid inlet/outlet port (1011) of the upward-inclined heat gaining device (101), the fluid inlet/outlet port (1012) of the heat gaining device (101) being connected to the fluid inlet/outlet port (4012) of two or more than two of the pipeline structures (401), and the semi-closed type space limiting and flow direction guiding structure (212) being installed between the fluid inlet/outlet port (4011) of the pipeline structure (401) and the fluid inlet/outlet port (3012) of the pipeline structure (301).

In the open-loop natural thermal energy releasing system of FIG. 18, the shared pipeline structure (301) is provided, wherein the bottom of the root part is installed with the outward-expanding arc-shaped fluid chamber (108), the individual fluid inlet/outlet port (3011) of the outward-expanding arc-shaped fluid chamber (108) leads to the fluid inlet/outlet port (1011) of the upward-inclined heat gaining device (101), the fluid inlet/outlet port (1012) of the heat gaining device (101) is connected to the fluid inlet/outlet port (4012) of two or more than two of the pipeline structures (401) having the radially-expanded root part, and the semi-closed type space limiting and flow direction guiding structure (212) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104) as well as for exchanging fluid with the exterior.

Figure 19:
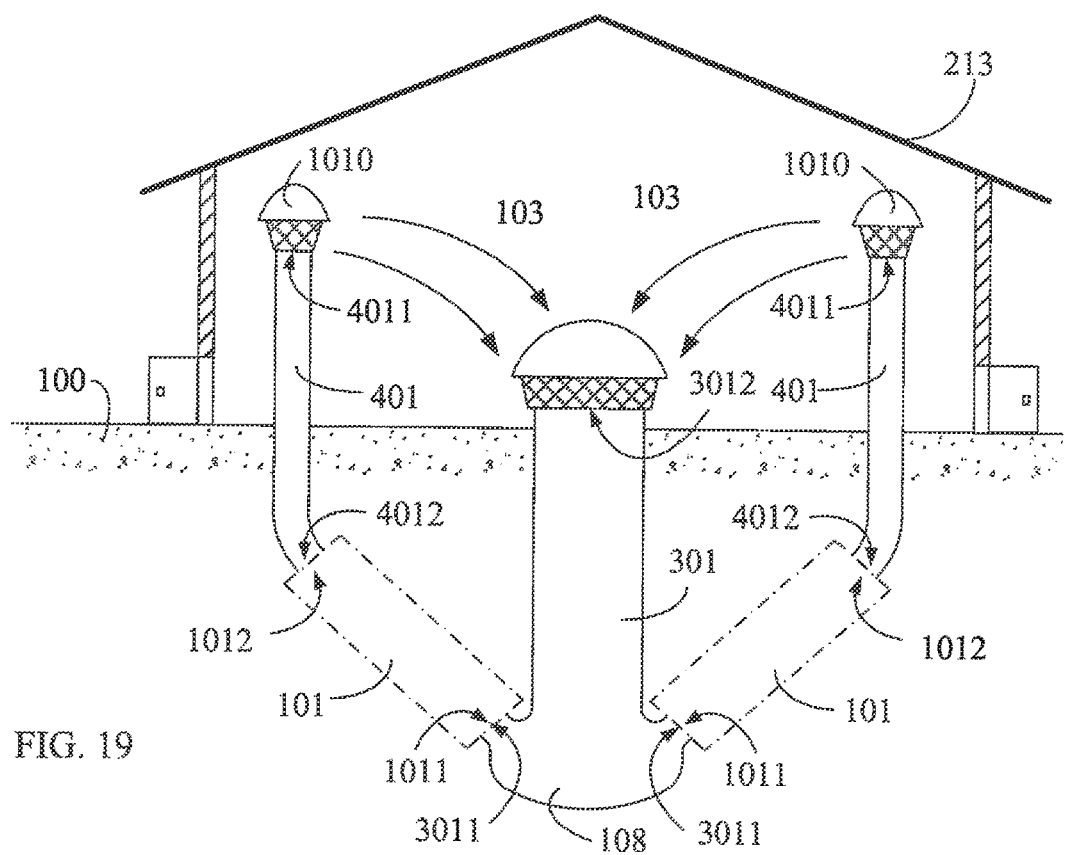
FIG. 19 is a lateral structural view showing an embodiment in which the bottom of the root part of a shared pipeline structure (301) is installed with an outward-expanding arc-shaped fluid chamber (108), the individual fluid inlet/outlet port (3011) of the outward-expanding arc-shaped fluid chamber (108) leads to the fluid inlet/outlet port (1011) of the upward-inclined heat gaining device (101), the fluid inlet/outlet port (1012) of the heat gaining device (101) is connected to the fluid inlet/outlet port (4012) of two or more than two pipeline structures (401) having the radially-expanded root part, and a space limiting and flow direction guiding structure (213) capable of controlling door opening or closing is installed between the fluid inlet/outlet port (4011) of the heat exchange fluid (104) of the pipeline structure (401) and the fluid inlet/outlet port (3012) of the pipeline structure (301).

FIG. 19 is a lateral structural view showing an embodiment of the present invention provided with a shared pipeline structure (301), wherein the bottom of the root part is installed with an outward-expanding arc-shaped fluid chamber (108), the individual fluid inlet/outlet port (3011) of the outward-expanding arc-shaped fluid chamber (108) leading to the fluid inlet/outlet port (1011) of the upward-inclined heat gaining device (101), the fluid inlet/outlet port (1012) of the heat gaining device (101) being connected to the fluid inlet/outlet port (4012) of two or more than two of the pipeline structures (401), and the space limiting and flow direction guiding structure (213) capable of controlling door opening or closing being installed between the fluid inlet/outlet port (4011) of the pipeline structure (401) and the fluid inlet/outlet port (3012) of the pipeline structure (301).

In the open-loop natural thermal energy releasing system of FIG. 19, the shared pipeline structure (301) is provided, wherein the bottom of the root part is installed with the outward-expanding arc-shaped fluid chamber (108), the individual fluid inlet/outlet port (3011) of the outward-expanding arc-shaped fluid chamber (108) leads to the fluid inlet/outlet port (1011) of the upward-inclined heat gaining device (101), the fluid inlet/outlet port (1012) of the heat gaining device (101) is connected to the fluid inlet/outlet port (4012) of two or more than two of the pipeline structures (401), and the space limiting and flow direction guiding structure (213) capable of controlling the door opening or closing is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104), wherein the space limiting and flow direction guiding structure (213) is capable of controlling the door opening or closing for allowing the limited space to be equipped with a closed-type or semi-closed type operational function.

Figure 20:
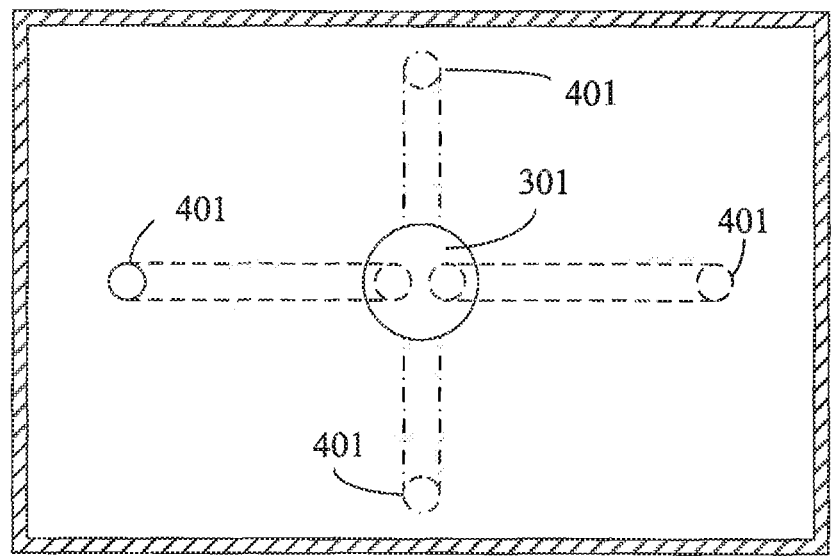
FIG. 20 is a top view showing a cross section of the structures illustrated in FIG. 16 to FIG. 19 taken along the horizontal.

FIG. 20 is a top view showing a cross section of the structures of FIG. 16 to FIG. 19 taken along the horizontal.

As shown in FIG. 20, each fluid inlet/outlet port (3011) leads from the outward-expanding arc-shaped fluid chamber (108) installed at the bottom of the shared pipeline structure (301) to the fluid inlet/outlet port (1011) of the individual heat gaining device (101) through the individual manifold which is radially extended, and the fluid inlet/outlet port (1012) of the heat gaining device (101) leads to the individual fluid inlet/outlet port (3012) through the vertical pipeline structure (301).

Figure 21:
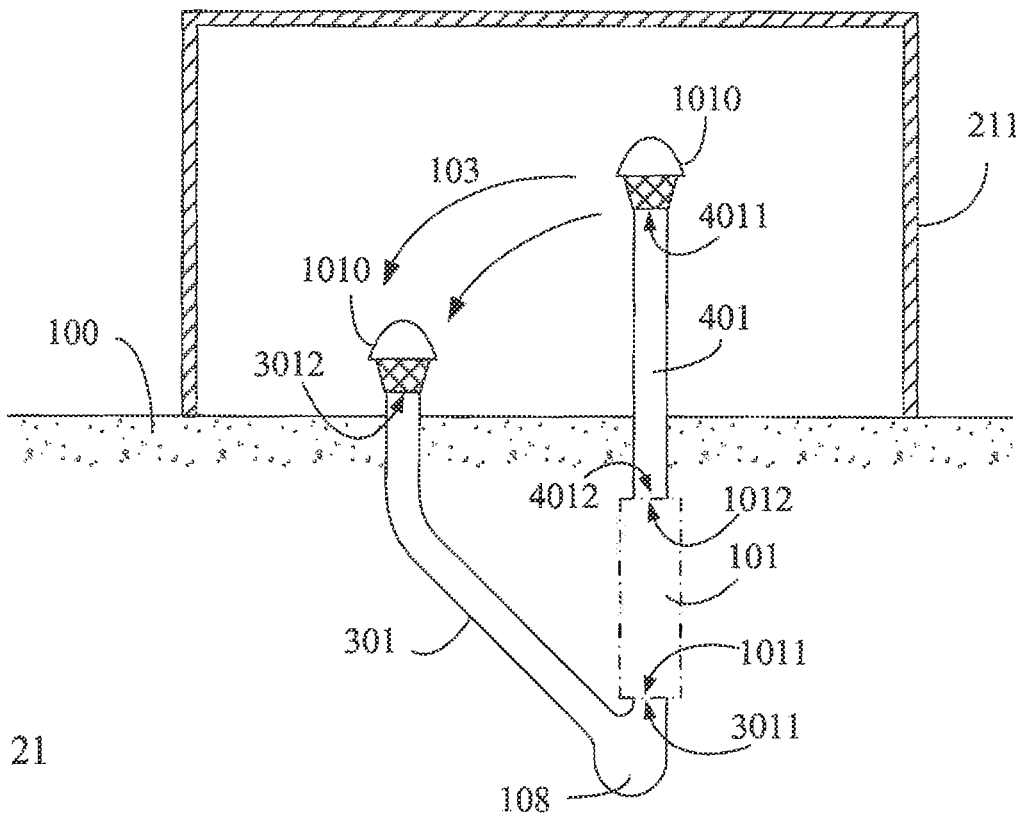
FIG. 21 is a lateral structural view showing an embodiment in which a bottom of a linear pipeline structure (301) is installed with the outward-expanding arc-shaped fluid chamber (108) for connection to a vertical heat gaining device (101) disposed in the natural thermal energy storage body (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the pipeline structure (401) and the fluid inlet/outlet port (3012) of the pipeline structure (301).

FIG. 21 is a lateral structural view showing an embodiment of the present invention in which the bottom of a linear pipeline structure (301) is installed with the outward-expanding arc-shaped fluid chamber (108) for being connected to the vertical heat gaining device (101) disposed in the natural thermal energy storage body (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the pipeline structure (401) and the fluid inlet/outlet port (3012) of the pipeline structure (301).

In the open-loop natural thermal energy releasing system of FIG. 21, the bottom of the linear pipeline structure (301) is installed with the outward-expanding arc-shaped fluid chamber (108) for being connected to the vertical heat gaining device (101) disposed in the natural thermal energy storage body (100), the fluid inlet/outlet port (1012) of the heat gaining device (101) is connected to the fluid inlet/outlet port (4012) of the pipeline structure (401), and the close-type space limiting and flow direction guiding structure (211) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104).

Figure 22:
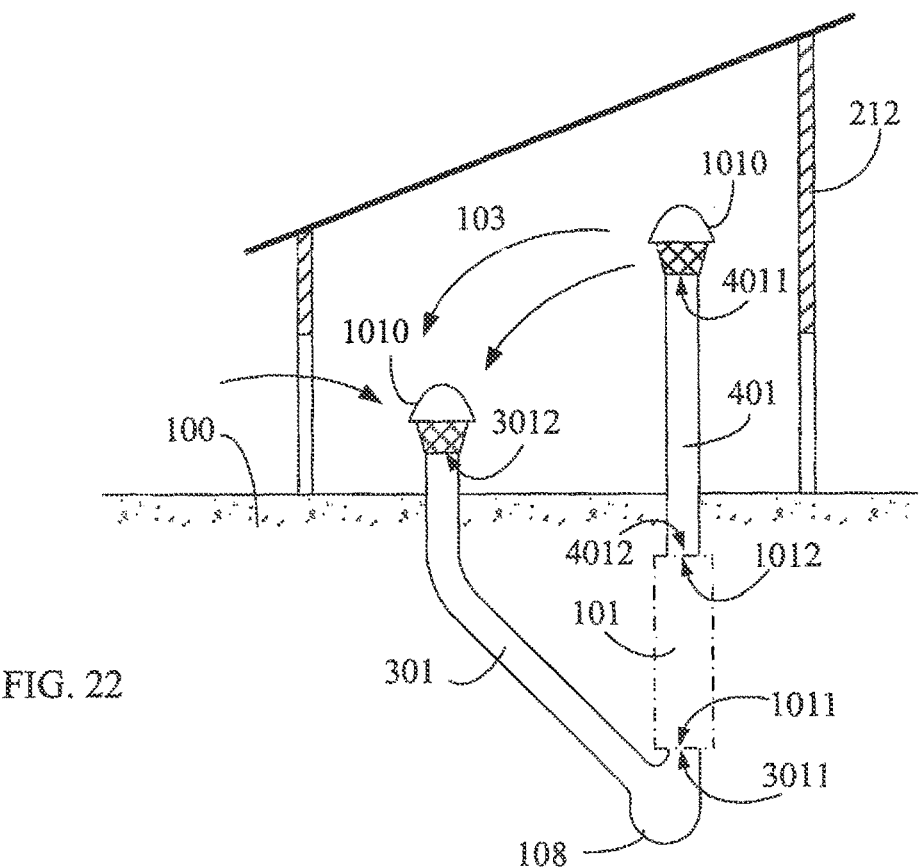
FIG. 22 is a lateral structural view showing an embodiment in which a bottom of a linear pipeline structure (301) is installed with the outward-expanding arc-shaped fluid chamber (108) for connection to the vertical heat gaining device (101) disposed in the natural thermal energy storage body (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the pipeline structure (401) and the fluid inlet/outlet port (3012) of the pipeline structure (301).

FIG. 22 is a lateral structural view showing an embodiment of the present invention in which the bottom of the linear pipeline structure (301) installed with the outward-expanding arc-shaped fluid chamber (108) for being connected to the vertical heat gaining device (101) disposed in the natural thermal energy storage body (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the pipeline structure (401) and the fluid inlet/outlet port (3012) of the pipeline structure (301).

In the open-loop natural thermal energy releasing system of FIG. 22, the bottom of the linear pipeline structure (301) is installed with the outward-expanding arc-shaped fluid chamber (108) for being connected to the vertical heat gaining device (101) disposed in the natural thermal energy storage body (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104) as well as for exchanging fluid with the exterior.

Figure 23:
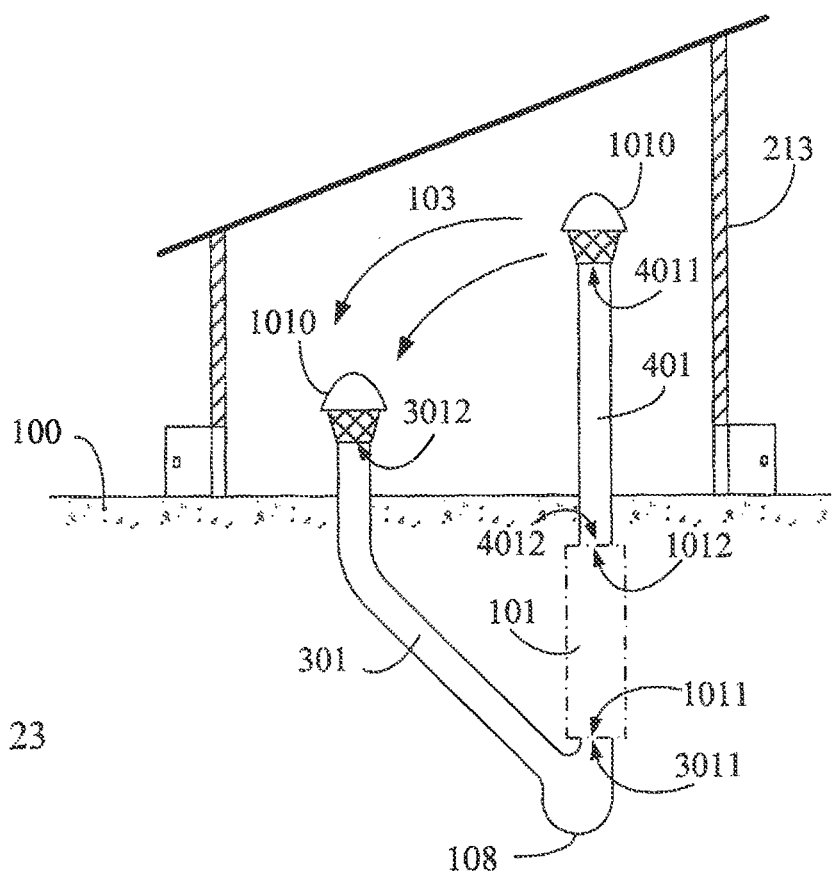
FIG. 23 is a lateral structural view showing an embodiment in which a bottom of a linear pipeline structure (301) is installed with the outward-expanding arc-shaped fluid chamber (108) for connection to the vertical heat gaining device (101) disposed in the natural thermal energy storage body (100), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing is installed between the fluid inlet/outlet port (4011) of the pipeline structure (401) and the fluid inlet/outlet port (3012) of the pipeline structure (301).

FIG. 23 is a lateral structural view showing an embodiment of the present invention in which the bottom of the linear pipeline structure (301) is installed with the outward-expanding arc-shaped fluid chamber (108) for being connected to the vertical heat gaining device (101) disposed in the natural thermal energy storage body (100), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing is installed between the fluid inlet/outlet port (4011) of the pipeline structure (401) and the fluid inlet/outlet port (3012) of the pipeline structure (301).

In the open-loop natural thermal energy releasing system of FIG. 23, the bottom of the linear pipeline structure (301) is installed with the outward-expanding arc-shaped fluid chamber (108) for being connected to the vertical heat gaining device (101) disposed in the natural thermal energy storage body (100), the fluid inlet/outlet port (1012) of the heat gaining device (101) is connected to the fluid inlet/outlet port (4012) of the pipeline structure (401), and the space limiting and flow direction guiding structure (213) capable of controlling the door opening or closing is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104), wherein the space limiting and flow direction guiding structure (213) is capable of controlling the door opening or closing for allowing the limited space to be equipped with a closed-type or semi-closed type operational function.

Figure 24:
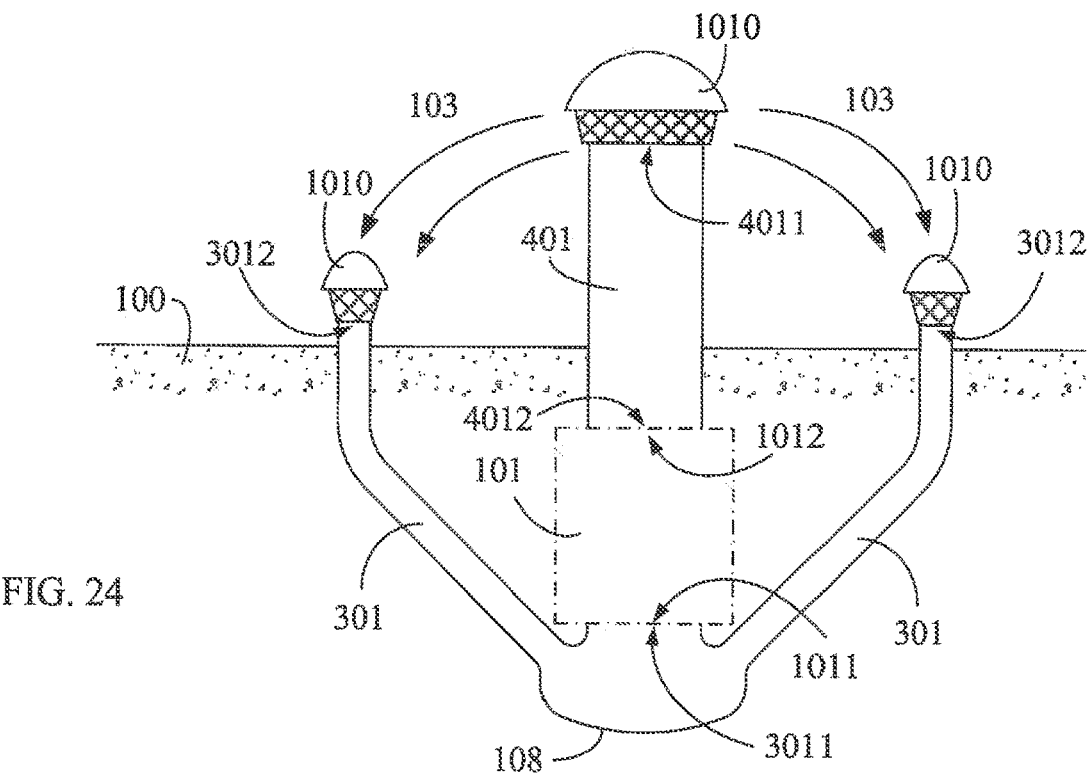
FIG. 24 is a lateral structural view showing an embodiment in which two or more than two pipeline structures (301) have a radially-expanded root part, the bottom of each root part leads to the outward-expanding arc-shaped fluid chamber (108), the fluid inlet/outlet port (3011) of the outward-expanding arc-shaped fluid chamber (108) leads to the fluid inlet/outlet port (1011) of the shared vertical heat gaining device (101), and the fluid inlet/outlet port (1012) of the shared heat gaining device (101) is connected to the fluid inlet/outlet port (4012) of the shared pipeline structure (401).

The embodiment disclosed in FIG. 2 can also be further formed as a jointly-configured structure and provided with a jointly-configured pipeline structure (401) and heat gaining device (101), as follows:

FIG. 24 is a lateral structural view showing an embodiment of the present invention provided with two or more than two pipeline structures (301) having a radially-expanded root part, the bottom of each root part leading to the outward-expanding arc-shaped fluid chamber (108), the fluid inlet/outlet port (3011) of the outward-expanding arc-shaped fluid chamber (108) leading to the fluid inlet/outlet port (1011) of the shared vertical heat gaining device (101), and the fluid inlet/outlet port (1012) of the shared heat gaining device (101) being connected to the fluid inlet/outlet port (4012) of the shared pipeline structure (401).

In the open-loop natural thermal energy releasing system shown in FIG. 24, two or more than two of the pipeline structures (301) having the radially-expanded root part are provided, the bottom of each root part leading to the outward-expanding arc-shaped fluid chamber (108), the fluid inlet/outlet port (3011) of the outward-expanding arc-shaped fluid chamber (108) leading to the fluid inlet/outlet port (1011) of the shared vertical heat gaining device (101), and the fluid inlet/outlet port (1012) of the shared heat gaining device (101) being connected to the fluid inlet/outlet port (4012) of the shared pipeline structure (401).

Figure 25:
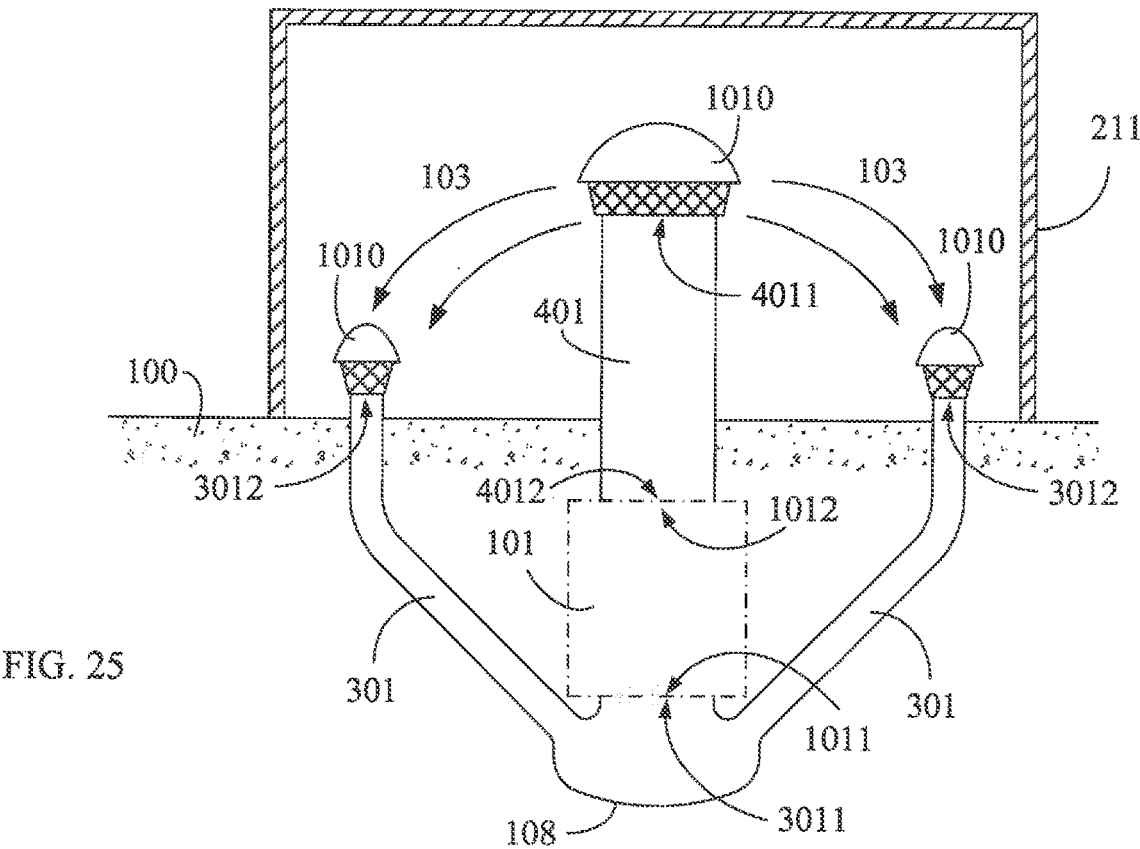
FIG. 25 is a lateral structural view showing an embodiment in which two or more than two pipeline structures (301) have the radially-expanded root part, the bottom of each root part leads to the outward-expanding arc-shaped fluid chamber (108), the fluid inlet/outlet port (3011) of the outward-expanding arc-shaped fluid chamber (108) leads to the fluid inlet/outlet port (1011) of the shared vertical heat gaining device (101), the fluid inlet/outlet port (1012) of the shared heat gaining device (101) is connected to the fluid inlet/outlet port (4012) of the shared pipeline structure (401), and a closed-type space limiting and flow direction guiding structure (211) is installed between the fluid inlet/outlet port (4011) of the pipeline structure (401) and the fluid inlet/outlet port (3012) of the pipeline structure (301).

FIG. 25 is a lateral structural view showing an embodiment of the present invention provided with two or more than two of the pipeline structures (301) having the radially-expanded root part, the bottom of each root part leading to the outward-expanding arc-shaped fluid chamber (108), the fluid inlet/outlet port (3011) of the outward-expanding arc-shaped fluid chamber (108) leading to the fluid inlet/outlet port (1011) of the shared vertical heat gaining device (101), the fluid inlet/outlet port (1012) of the shared heat gaining device (101) being connected to the fluid inlet/outlet port (4012) of the shared pipeline structure (401), and a closed-type space limiting and flow direction guiding structure (211) being installed between the fluid inlet/outlet port (4011) of the pipeline structure (401) and the fluid inlet/outlet port (3012) of the pipeline structure (301).

In the open-loop natural thermal energy releasing system of FIG. 25, two or more than two of the pipeline structures (301) having the radially-expanded root part are provided, the bottom of each root part leading to the outward-expanding arc-shaped fluid chamber (108), the fluid inlet/outlet port (3011) of the outward-expanding arc-shaped fluid chamber (108) leading to the fluid inlet/outlet port (1011) of the shared vertical heat gaining device (101), the fluid inlet/outlet port (1012) of the shared heat gaining device (101) being connected to the fluid inlet/outlet port (4012) of the shared pipeline structure (401), and a closed-type space limiting and flow direction guiding structure (211) being installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104).

Figure 26:
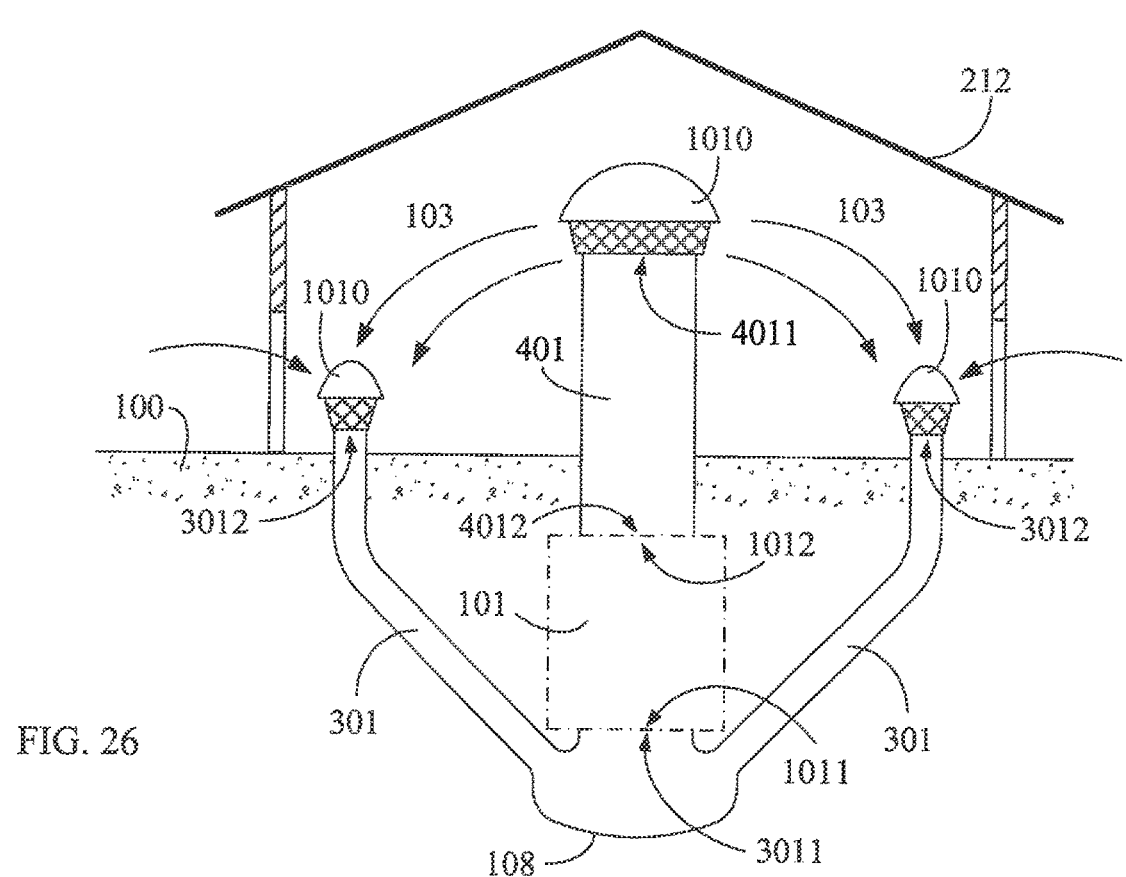
FIG. 26 is a lateral structural view showing an embodiment in which two or more than two pipeline structures (301) have a radially-expanded root part, the bottom of each root part leads to the outward-expanding arc-shaped fluid chamber (108), the fluid inlet/outlet port (3011) of the outward-expanding arc-shaped fluid chamber (108) leads to the fluid inlet/outlet port (1011) of the shared vertical heat gaining device (101), the fluid inlet/outlet port (1012) of the shared heat gaining device (101) is connected to the fluid inlet/outlet port (4012) of the shared pipeline structure (401), and a semi-closed type space limiting and flow direction guiding structure (212) is installed between the fluid inlet/outlet port (4011) of the pipeline structure (401) and the fluid inlet/outlet port (3012) of the pipeline structure (301).

FIG. 26 is a lateral structural view showing an embodiment of the present invention provided with two or more than two pipeline structures (301) having a radially-expanded root part, the bottom of each root part leading to the outward-expanding arc-shaped fluid chamber (108), the fluid inlet/outlet port (3011) of the outward-expanding arc-shaped fluid chamber (108) leading to the fluid inlet/outlet port (1011) of the shared vertical heat gaining device (101), the fluid inlet/outlet port (1012) of the shared heat gaining device (101) being connected to the fluid inlet/outlet port (4012) of the shared pipeline structure (401), and a semi-closed type space limiting and flow direction guiding structure (212) being installed between the fluid inlet/outlet port (4011) of the pipeline structure (401) and the fluid inlet/outlet port (3012) of the pipeline structure (301).

In the open-loop natural thermal energy releasing system of FIG. 26, two or more than two of the pipeline structures (301) having the radially-expanded root part are provided, the bottom of each root part leading to the outward-expanding arc-shaped fluid chamber (108), the fluid inlet/outlet port (3011) of the outward-expanding arc-shaped fluid chamber (108) leading to the fluid inlet/outlet port (1011) of the shared vertical heat gaining device (101), the fluid inlet/outlet port (1012) of the shared heat gaining device (101) being connected to the fluid inlet/outlet port (4012) of the shared pipeline structure (401), and the semi-closed type space limiting and flow direction guiding structure (212) being installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104) as well as for exchanging fluid with the exterior.

Figure 27:
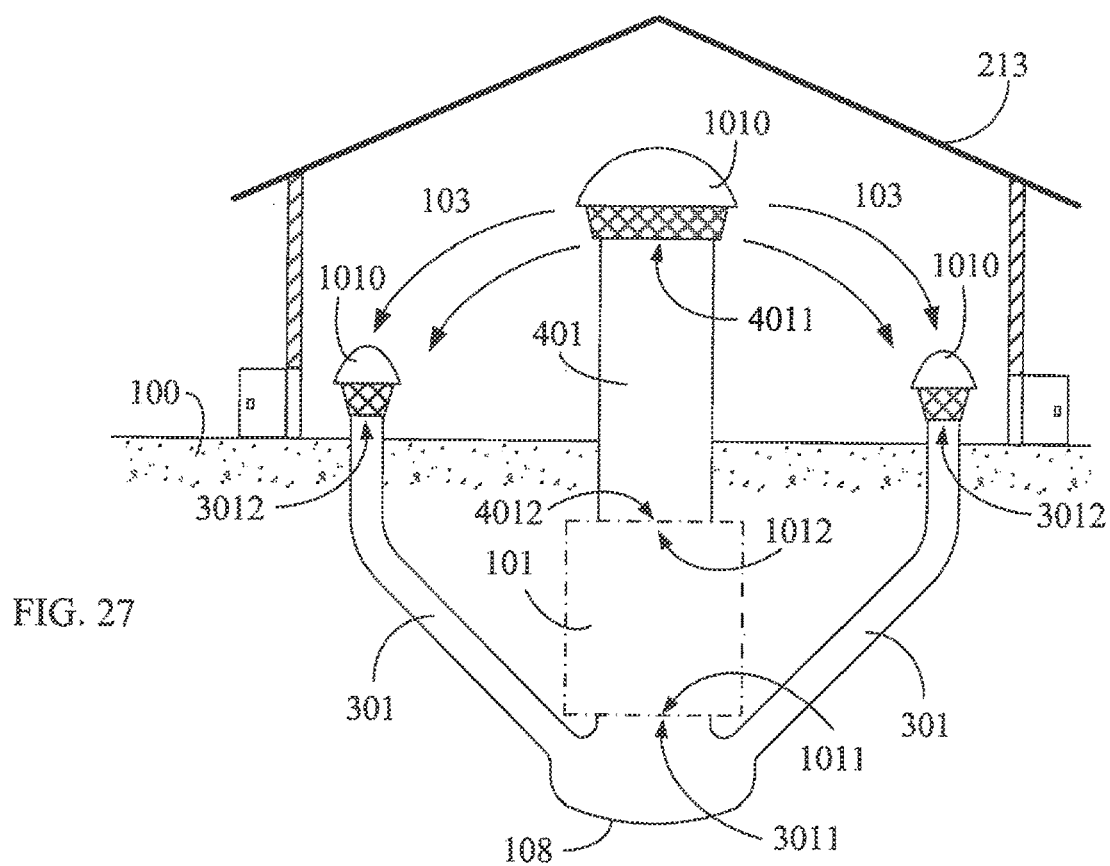
FIG. 27 is a lateral structural view showing an embodiment in which two or more than two pipeline structures (301) have a radially-expanded root part, the bottom of each root part leads to the outward-expanding arc-shaped fluid chamber (108), the fluid inlet/outlet port (3011) of the outward-expanding arc-shaped fluid chamber (108) leads to the fluid inlet/outlet port (1011) of the shared vertical heat gaining device (101), the fluid inlet/outlet port (1012) of the shared heat gaining device (101) is connected to the fluid inlet/outlet port (4012) of the shared pipeline structure (401), and a space limiting and flow direction guiding structure (213) capable of controlling door opening or closing (213) is installed between the fluid inlet/outlet port (4011) of the pipeline structure (401) and the fluid inlet/outlet port (3012) of the pipeline structure (301).

FIG. 27 is a lateral structural view showing an embodiment of the present invention provided with two or more than two pipeline structures (301) having the radially-expanded root part, the bottom of each root part leading to the outward-expanding arc-shaped fluid chamber (108), the fluid inlet/outlet port (3011) of the outward-expanding arc-shaped fluid chamber (108) leading to the fluid inlet/outlet port (1011) of the shared vertical heat gaining device (101), the fluid inlet/outlet port (1012) of the shared heat gaining device (101) being connected to the fluid inlet/outlet port (4012) of the shared pipeline structure (401), and a space limiting and flow direction guiding structure (213) capable of controlling door opening or closing being installed between the fluid inlet/outlet port (4011) of the pipeline structure (401) and the fluid inlet/outlet port (3012) of the pipeline structure (301).

In the open-loop natural thermal energy releasing system of FIG. 27, two or more than two of the pipeline structures (301) having the radially-expanded root part are provided, the bottom of each root part leading to the outward-expanding arc-shaped fluid chamber (108), the fluid inlet/outlet port (3011) of the outward-expanding arc-shaped fluid chamber (108) leading to the fluid inlet/outlet port (1011) of the shared vertical heat gaining device (101), the fluid inlet/outlet port (1012) of the shared heat gaining device (101) being connected to the fluid inlet/outlet port (4012) of the shared pipeline structure (401), and the space limiting and flow direction guiding structure (213) capable of controlling the door opening or closing (213) being installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104), wherein the space limiting and flow direction guiding structure (213) is capable of controlling the door opening or closing for allowing the limited space to be equipped with a closed-type or semi-closed type operational function.

Figure 28:
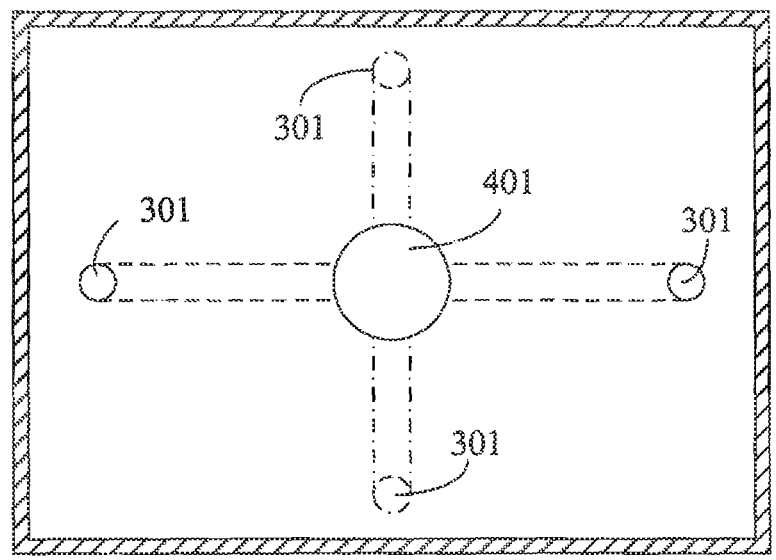
FIG. 28 is a top view showing a cross section of the structure shown in FIG. 24 to FIG. 27 taken along the horizontal.

FIG. 28 is a top view showing a cross section of the structures of FIG. 24 to FIG. 27 taken along the horizontal.

As shown in FIG. 28, the bottom of each root part of the radially-expanded pipeline structure (301) leads to the shared outward-expanding arc-shaped fluid chamber (108), leads upwardly to the shared heat gaining device (101), which then leads further upward to the fluid inlet/outlet port (4011) through the shared pipeline structure (401).

Figure 29:
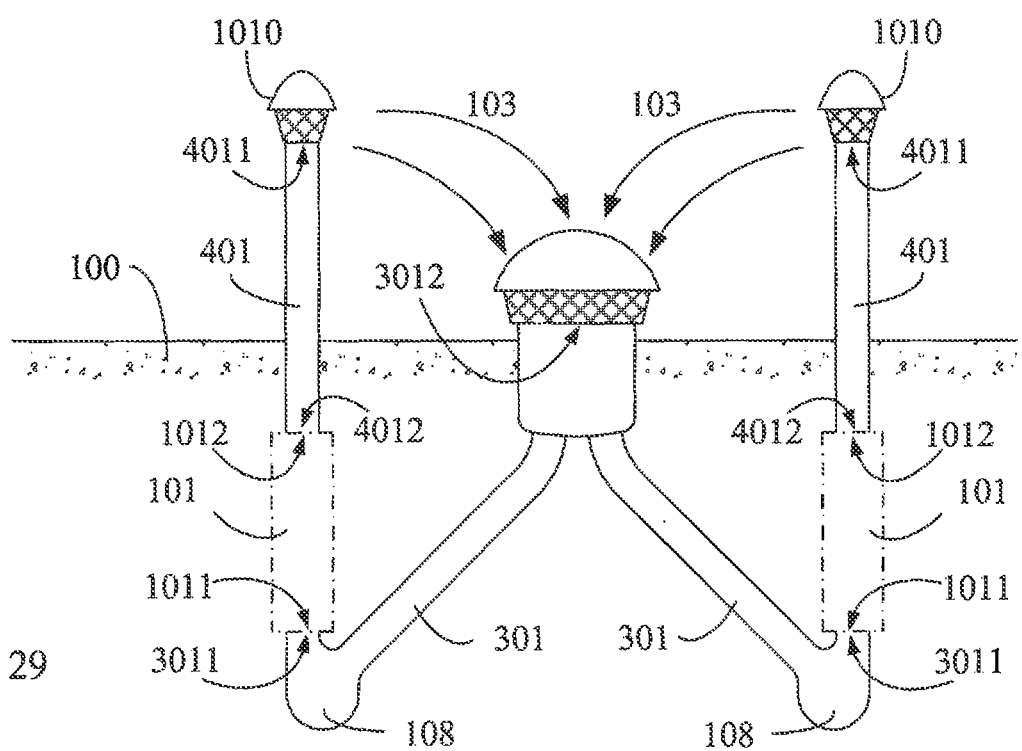
FIG. 29 is a lateral structural view showing an embodiment in which shared pipeline structures (301) have two or more than two radially-expanded shunt manifolds installed at the bottom and individually connected to the outward-expanding arc-shaped fluid chamber (108), the fluid inlet/outlet port (3011) of the outward-expanding arc-shaped fluid chamber (108) leads to the fluid inlet/outlet port (1011) of the vertical heat gaining device (101), the fluid inlet/outlet port (1012) of the heat gaining device (101) is connected to the fluid inlet/outlet port (4012) of the pipeline structure (401).

The embodiment disclosed in FIG. 2 can be still further formed as a jointly-configured structure and provided with the jointly-configured pipeline structure (301), as follows:

FIG. 29 is a lateral structural view showing an embodiment of the present invention provided with shared pipeline structures (301) having two or more than two radially-expanded shunt manifolds at the bottom that individually lead to the outward-expanding arc-shaped fluid chamber (108), the fluid inlet/outlet port (3011) of the outward-expanding arc-shaped fluid chamber (108) leading to the fluid inlet/outlet port (1011) of the vertical heat gaining device (101), and the fluid inlet/outlet port (1012) of the heat gaining device (101) being connected to the fluid inlet/outlet port (4012) of the pipeline structure (401).

In the open-loop natural thermal energy releasing system of FIG. 29, two or more than two radially-expanded shunt manifolds formed at the bottom of the shared pipeline structures individually lead to the connected outward-expanding arc-shaped fluid chamber (108), the fluid inlet/outlet port (3011) of the outward-expanding arc-shaped fluid chamber (108) lead to the fluid inlet/outlet port (1011) of the vertical heat gaining device (101), and the fluid inlet/outlet port (1012) of the heat gaining device (101) is connected to the fluid inlet/outlet port (4012) of the pipeline structure (401).

Figure 30:
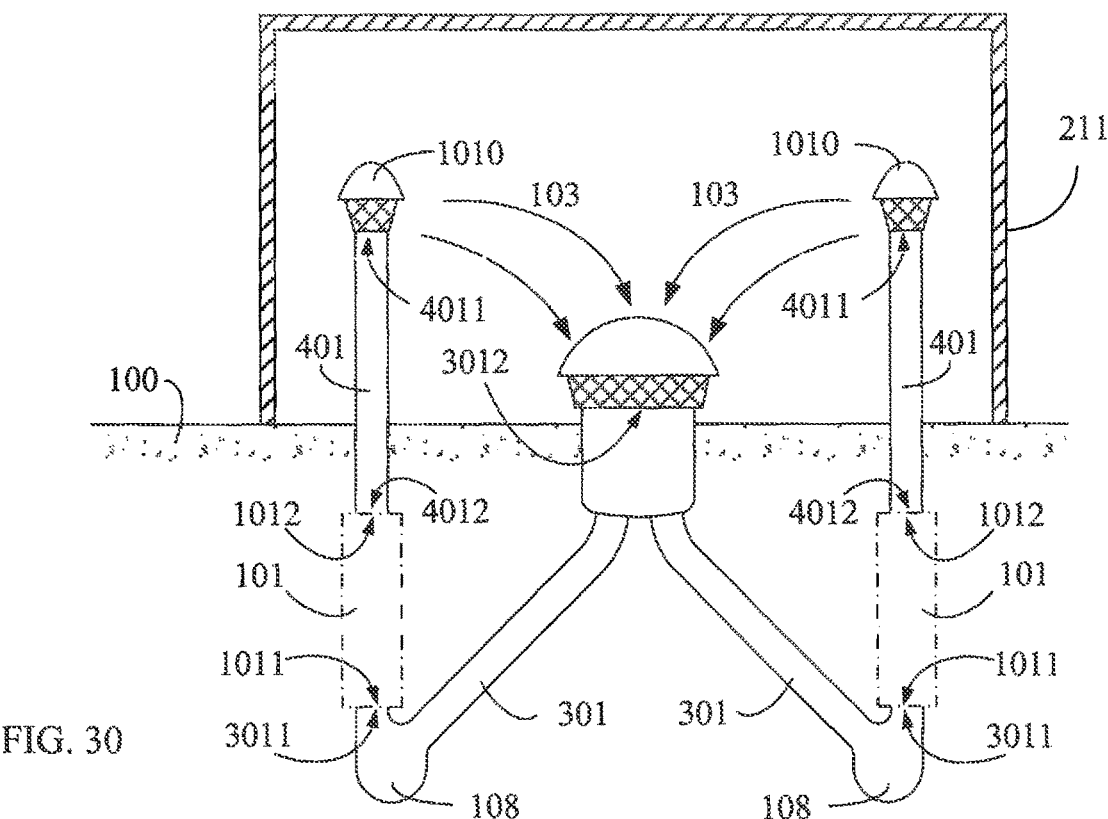
FIG. 30 is a lateral structural view showing an embodiment in which two or more than two radially-expanded shunt manifolds at installed at the bottom of shared pipeline structures (301) and individually connected to the outward-expanding arc-shaped fluid chamber (108), the fluid inlet/outlet port (3011) of the outward-expanding arc-shaped fluid chamber (108) leads to the fluid inlet/outlet port (1011) of the vertical heat gaining device (101), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the pipeline structure (401) and the fluid inlet/outlet port (3012) of the pipeline structure (301).

FIG. 30 is a lateral structural view showing an embodiment of the present invention provided with shared pipeline structures (301) having two or more than two radially-expanded shunt manifolds at the bottom for being individually connected to the outward-expanding arc-shaped fluid chamber (108), the fluid inlet/outlet port (3011) of the outward-expanding arc-shaped fluid chamber (108) leading to the fluid inlet/outlet port (1011) of the vertical heat gaining device (101), the fluid inlet/outlet port (1012) of the heat gaining device (101) being connected to the fluid inlet/outlet port (4012) of the pipeline structure (401), and a closed-type space limiting and flow direction guiding structure (211) being installed between the fluid inlet/outlet port (4011) of the pipeline structure (401) and the fluid inlet/outlet port (3012) of the pipeline structure (301).

In the open-loop natural thermal energy releasing system of FIG. 30, the two or more than two radially-expanded shunt manifolds formed at the bottom of the shared pipeline structures (301) individually lead to the connected outward-expanding arc-shaped fluid chamber (108), the fluid inlet/outlet port (3011) of the outward-expanding arc-shaped fluid chamber (108) leads to the fluid inlet/outlet port (1011) of the vertical heat gaining device (101), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104).

Figure 31:
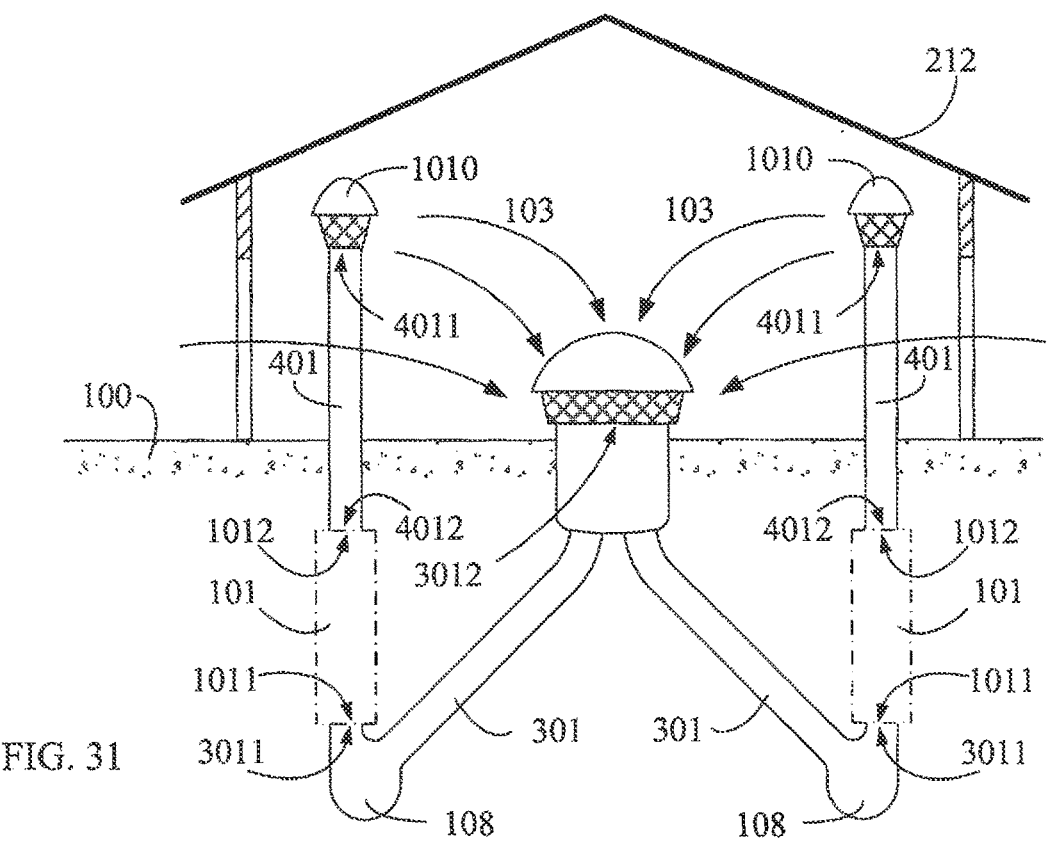
FIG. 31 is a lateral structural view showing an embodiment in which two or more than two radially-expanded shunt manifolds are installed at the bottom of shared pipeline structures (301) and individually connected to the outward-expanding arc-shaped fluid chamber (108), the fluid inlet/outlet port (3011) of the outward-expanding arc-shaped fluid chamber (108) leads to the fluid inlet/outlet port (1011) of the vertical heat gaining device (101), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the pipeline structure (401) and the fluid inlet/outlet port (3012) of the pipeline structure (301).

FIG. 31 is a lateral structural view showing an embodiment of the present invention provided with shared pipeline structures (301) having two or more than two radially-expanded shunt manifolds at the bottom for being individually connected to the outward-expanding arc-shaped fluid chamber (108), the fluid inlet/outlet port (3011) of the outward-expanding arc-shaped fluid chamber (108) leading to the fluid inlet/outlet port (1011) of the vertical heat gaining device (101), the fluid inlet/outlet port (1012) of the heat gaining device (101) being connected to the fluid inlet/outlet port (4012) of the pipeline structure (401), and a semi-closed type space limiting and flow direction guiding structure (212) being installed between the fluid inlet/outlet port (4011) of the pipeline structure (401) and the fluid inlet/outlet port (3012) of the pipeline structure (301).

In the open-loop natural thermal energy releasing system of FIG. 31, the two or more than two radially-expanded shunt manifolds formed at the bottom of the shared pipeline structures (301) are individually connected to the outward-expanding arc-shaped fluid chamber (108), the fluid inlet/outlet port (3011) of the outward-expanding arc-shaped fluid chamber (108) leads to the fluid inlet/outlet port (1011) of the vertical heat gaining device (101), the fluid inlet/outlet port (1012) of the heat gaining device (101) is connected to the fluid inlet/outlet port (4012) of the pipeline structure (401), and the semi-closed type space limiting and flow direction guiding structure (212) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104) as well as for exchanging fluid with the exterior.

Figure 32:
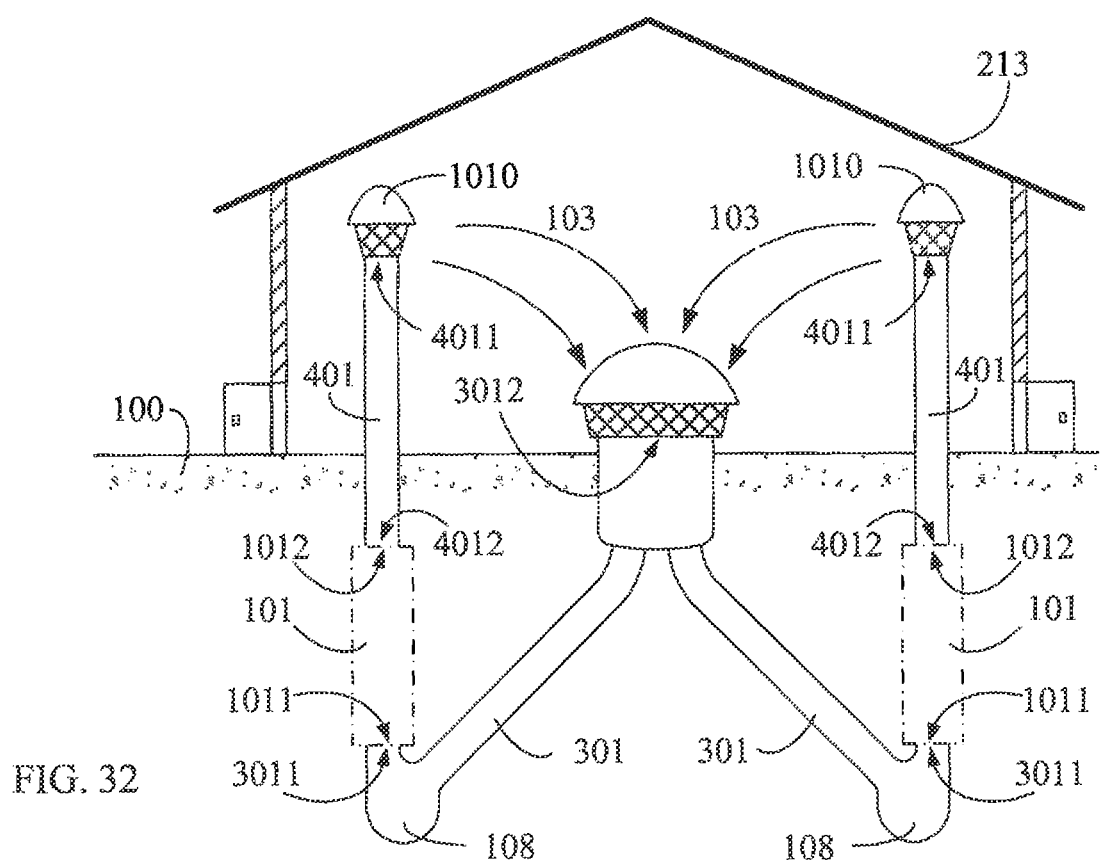
FIG. 32 is a lateral structural view showing an embodiment in which two or more than two radially-expanded shunt manifolds at installed at the bottom of shared pipeline structures (301) and individually connected to the outward-expanding arc-shaped fluid chamber (108), the fluid inlet/outlet port (3011) of the outward-expanding arc-shaped fluid chamber (108) leads to the fluid inlet/outlet port (1011) of the vertical heat gaining device (101), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing is installed between the fluid inlet/outlet port (4011) of the pipeline structure (401) and the fluid inlet/outlet port (3012) of the pipeline structure (301).

FIG. 32 is a lateral structural view showing an embodiment of the present invention provided with shared pipeline structures (301) having two or more than two radially-expanded shunt manifolds at the bottom for being individually connected to the outward-expanding arc-shaped fluid chamber (108), the fluid inlet/outlet port (3011) of the outward-expanding arc-shaped fluid chamber (108) leading to the fluid inlet/outlet port (1011) of the vertical heat gaining device (101), the fluid inlet/outlet port (1012) of the heat gaining device (101) being connected to the fluid inlet/outlet port (4012) of the pipeline structure (401), and a space limiting and flow direction guiding structure (213) capable of controlling door opening or closing being installed between the fluid inlet/outlet port (4011) of the pipeline structure (401) and the fluid inlet/outlet port (3012) of the pipeline structure (301).

In the open-loop natural thermal energy releasing system of FIG. 32, the two or more than two radially-expanded shunt manifolds formed at the bottom of the shared pipeline structures (301) are individually connected to the outward-expanding arc-shaped fluid chamber (108), the fluid inlet/outlet port (3011) of the outward-expanding arc-shaped fluid chamber (108) leads to the fluid inlet/outlet port (1011) of the vertical heat gaining device (101), the fluid inlet/outlet port (1012) of the heat gaining device (101) is connected to the fluid inlet/outlet port (4012) of the pipeline structure (401), and the space limiting and flow direction guiding structure (213) capable of controlling the door opening or closing (213) is installed between the fluid inlet/outlet port (4011) of the pipeline structure (401) and the fluid inlet/outlet port (3012) of the pipeline structure (301) for accommodating the temperature differentiation body (103) and for guiding the flow direction of the heat exchange fluid (104), wherein the space limiting and flow direction guiding structure (213) is capable of controlling the door opening or closing for allowing the limited space to be equipped with a closed-type or semi-closed type operational function.

Figure 33:
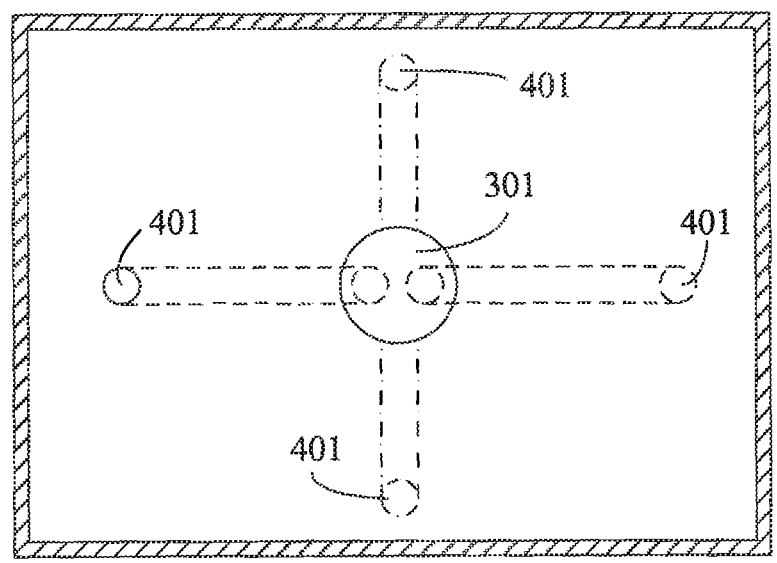
FIG. 33 is a top view showing a cross section of FIG. 29 to FIG. 32 taken along the horizontal.

FIG. 33 is a top view showing a cross section of the structures of FIG. 29 to FIG. 32 taken along the horizontal.

As shown in FIG. 33, the bottom of the shared pipeline structure (301) is installed with individual radially-expanded shunt manifolds for being individually connected to the outward-expanding arc-shaped fluid chamber (108), the individual outward-expanding arc-shaped fluid chamber (108) being connected to the vertical heat gaining device (101), and the heat gaining device (101) being connected to the fluid inlet/outlet port (4011) through the vertical pipeline structure (401).

Figure 34:
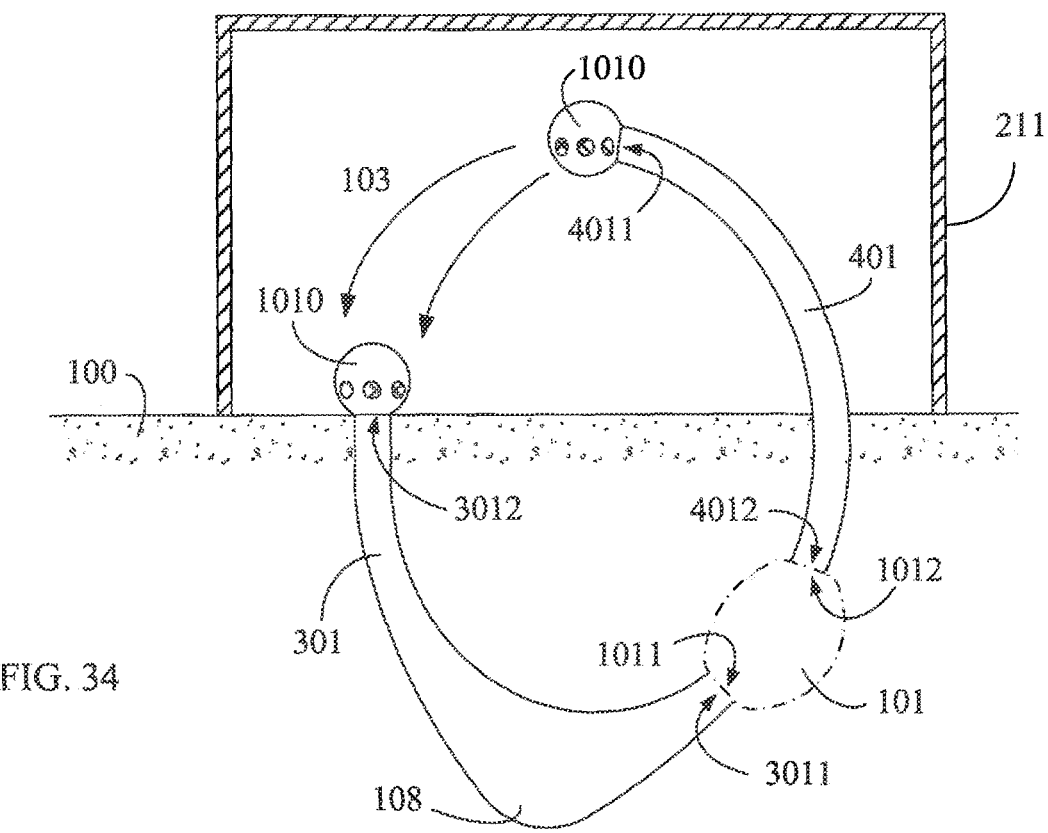
FIG. 34 is a lateral structural view of an embodiment in which the bottom of an arc-shaped pipeline structure (301) is installed with the outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the arc-shaped pipeline structure (401) and the fluid inlet/outlet port (3012) of the pipeline structure (301).
Figure 35:
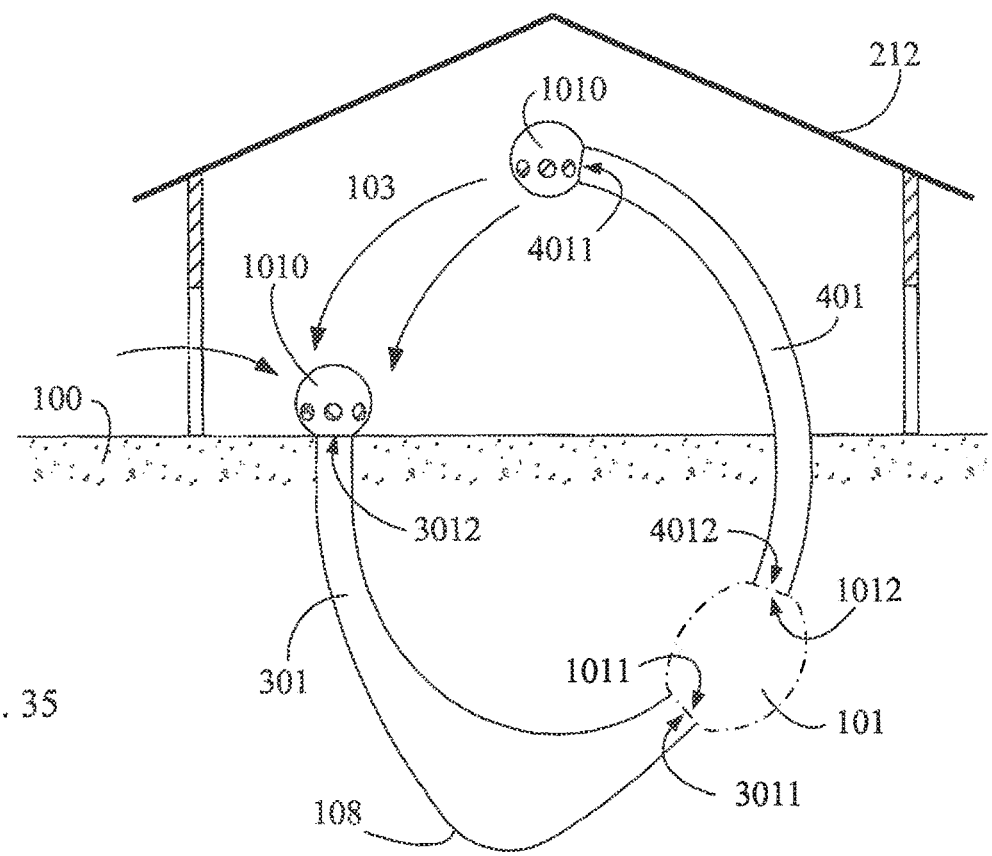
FIG. 35 is a lateral structural view of an embodiment in which the bottom of an arc-shaped pipeline structure (301) is installed with the outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the arc-shaped pipeline structure (401) and the fluid inlet/outlet port (3012) of the heat exchange fluid (104) of the pipeline structure (301).

FIG. 34 is a lateral structural view showing an embodiment of the present invention in which the bottom of an arc-shaped pipeline structure is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the arc-shaped pipeline structure (401) and the fluid inlet/outlet port (3012) of the pipeline structure (301), according to the present invention;

In the open-loop natural thermal energy releasing system of FIG. 34, the bottom of the arc-shaped pipeline structure (301) is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and the closed-type space limiting and flow direction guiding structure (211) is installed between the fluid inlet/outlet port (4011) of the arc-shaped pipeline structure (401) and the fluid inlet/outlet port (3012) of the pipeline structure (301) for accommodating the temperature differentiation body (103) and for guiding the flow direction of the heat exchange fluid (104);

FIG. 35 is a lateral structural view showing an embodiment of the present invention in which the bottom of the arc-shaped pipeline structure (301) is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the arc-shaped pipeline structure (401) and the fluid inlet/outlet port (3012) of the pipeline structure (301).

In the open-loop natural thermal energy releasing system of FIG. 35, the bottom of the arc-shaped pipeline structure (301) is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and the semi-closed type space limiting and flow direction guiding structure (212) is installed between the fluid inlet/outlet port (4011) of the arc-shaped pipeline structure (401) and the fluid inlet/outlet port (3012) of the pipeline structure (301) for accommodating the temperature differentiation body (103) and for guiding the flow direction of the heat exchange fluid (104), as well as for exchanging fluid with the exterior.

Figure 36:
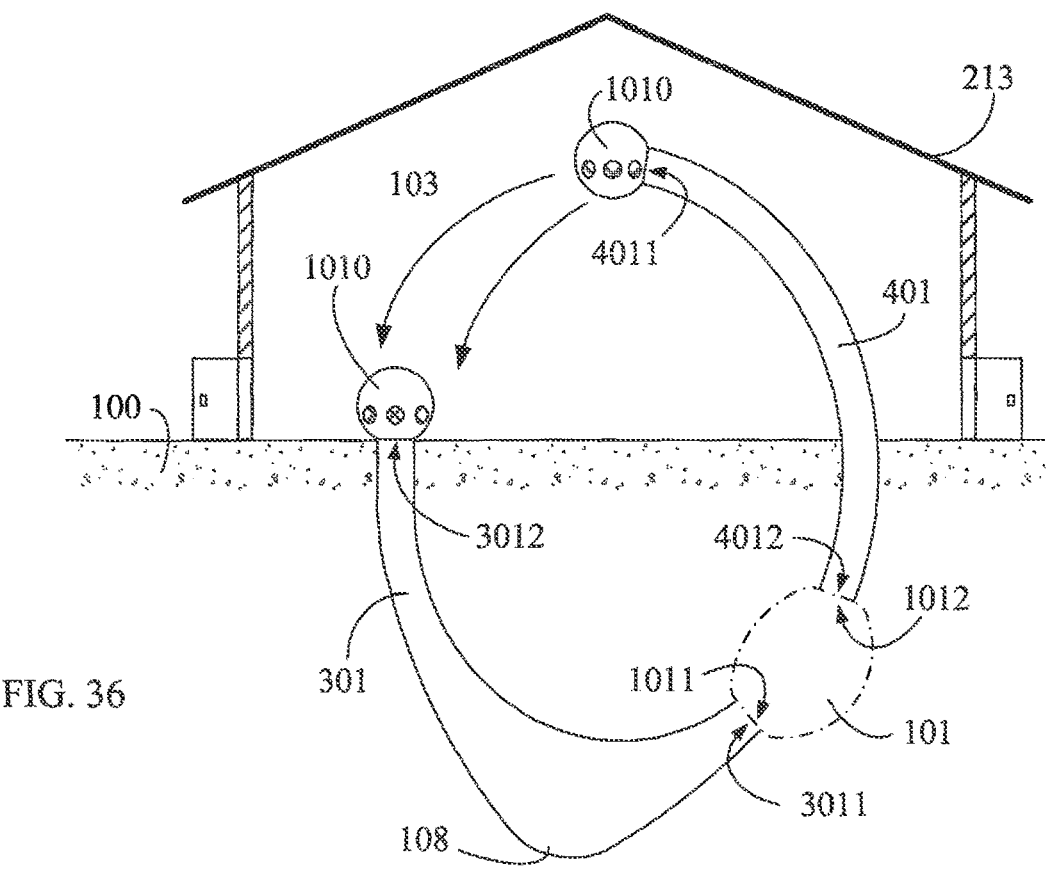
FIG. 36 is a lateral structural view of an embodiment in which the bottom of an arc-shaped pipeline structure (301) is installed with the outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), a space limiting and flow direction guiding structure (213) capable of controlling door opening or closing is installed between the fluid inlet/outlet port (4011) of the arc-shaped pipeline structure (401) and the fluid inlet/outlet port (3012) of the pipeline structure (301).

FIG. 36 is a lateral structural view showing an embodiment of the present invention in which the bottom of the arc-shaped pipeline structure (301) is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing (213) is installed between the fluid inlet/outlet port (4011) of the arc-shaped pipeline structure (401) and the fluid inlet/outlet port (3012) of the pipeline structure (301).

In the open-loop natural thermal energy releasing system of FIG. 36, the bottom of the arc-shaped pipeline structure (301) is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and the space limiting and flow direction guiding structure (213) capable of controlling the door opening or closing is installed between the fluid inlet/outlet port (4011) of the arc-shaped pipeline structure (401) and the fluid inlet/outlet port (3012) of the pipeline structure (301) for accommodating the temperature differentiation body (103) and for guiding the flow direction of the heat exchange fluid (104), wherein the space limiting and flow direction guiding structure (213) is capable of controlling the door opening or closing for allowing the limited space to be equipped with a closed-type or semi-closed type operational function.

Figure 37:
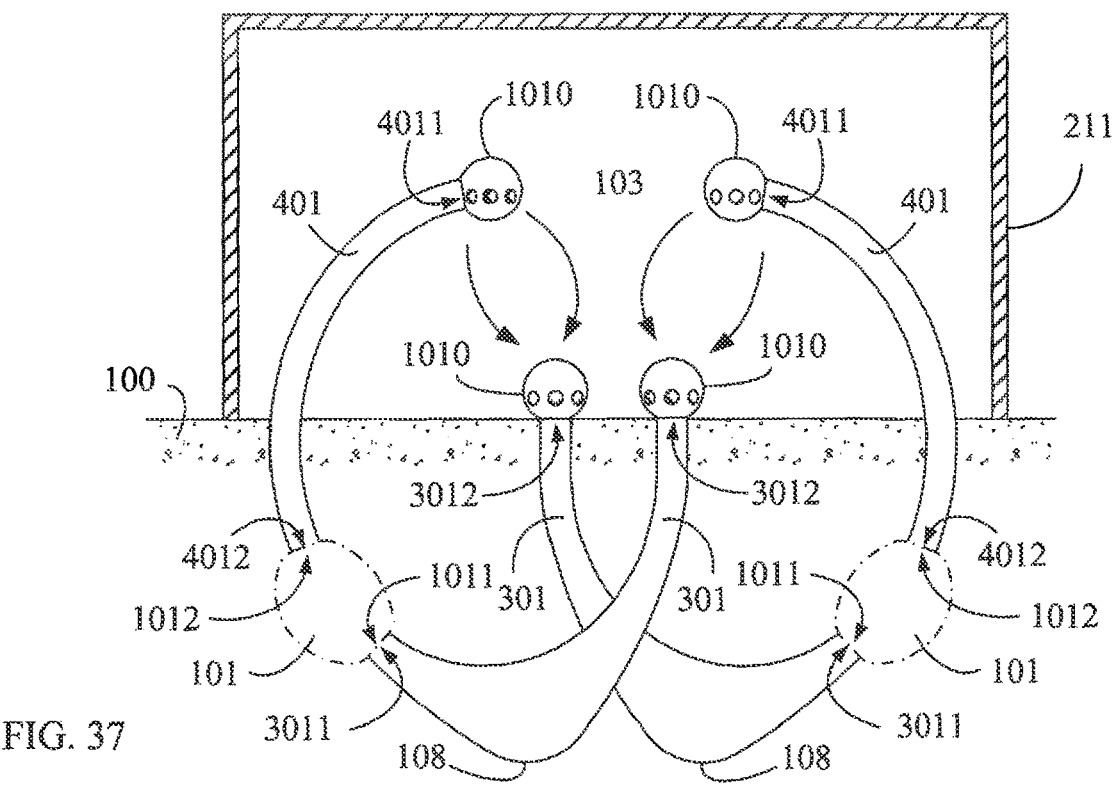
FIG. 37 is a lateral structural view showing an embodiment in which arc-shaped pipeline structures (301) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the arc-shaped pipeline structure (401) and the fluid inlet/outlet port (3012) of the pipeline structure (301).

FIG. 37 is a lateral structural view showing an embodiment of the present invention in which arc-shaped pipeline structures (301) of at least two open-loop natural thermal energy releasing systems are staggeringly disposed in the natural thermal energy storage body (100), wherein the bottom of each open-loop natural thermal energy releasing system with partial reflux is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the arc-shaped pipeline structure (401) and the fluid inlet/outlet port (3012) of the pipeline structure (301).

Figure 38:
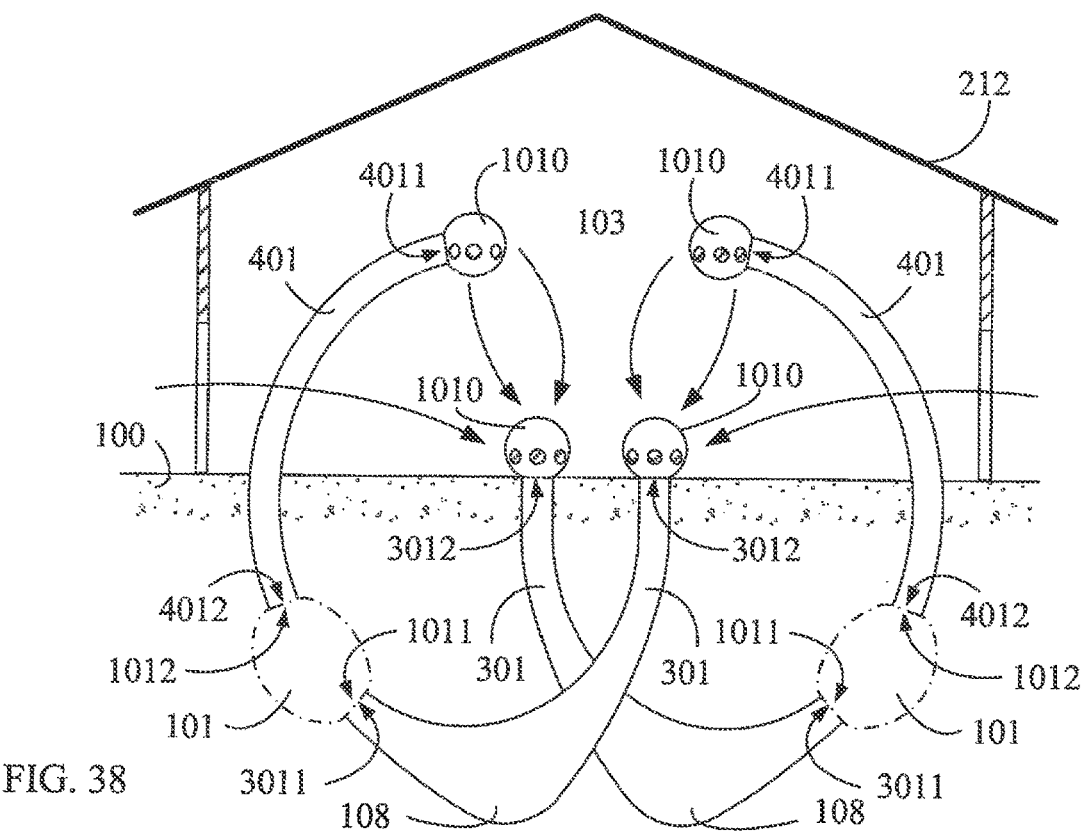
FIG. 38 is a lateral structural view showing an embodiment in which arc-shaped pipeline structures (301) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the arc-shaped pipeline structure (401) and the fluid inlet/outlet port (3012) of the pipeline structure (301).

In the open-loop natural thermal energy releasing system of FIG. 37, the arc-shaped pipeline structure (301) of the at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the arc-shaped pipeline structure (401) and the fluid inlet/outlet port (3012) of the pipeline structure (301) for accommodating the temperature differentiation body (103) and for guiding the flow direction of the heat exchange fluid (104). FIG. 38 is a lateral structural view showing an embodiment of the present invention in which the arc-shaped pipeline structures (301) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the arc-shaped pipeline structure (401) and the fluid inlet/outlet port (3012) of the pipeline structure (301).

In the open-loop natural thermal energy releasing system of FIG. 38, the arc-shaped pipeline structures (301) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the arc-shaped pipeline structure (401) and the fluid inlet/outlet port (3012) of the pipeline structure (301) for accommodating the temperature differentiation body (103) and for guiding the flow direction of the heat exchange fluid (104), as well as for exchanging fluid with the exterior.

Figure 39:
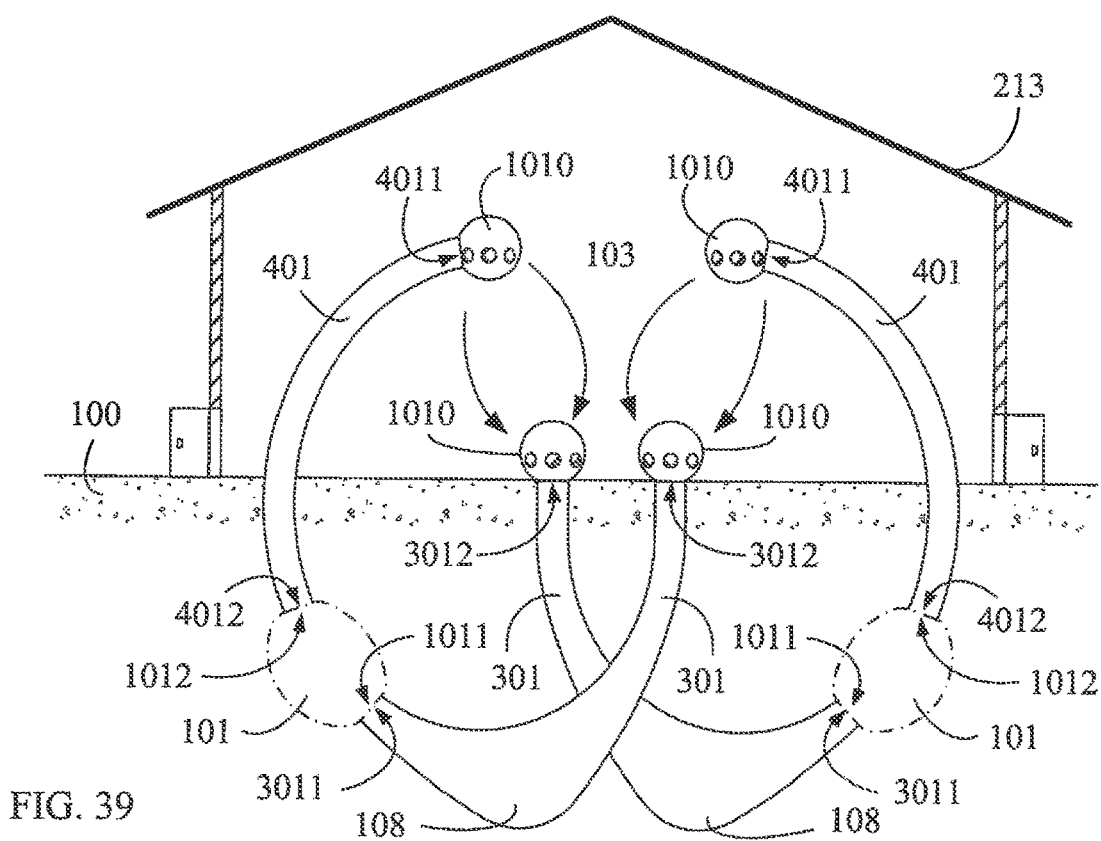
FIG. 39 is a lateral structural view showing an embodiment in which arc-shaped pipeline s structures (301) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing (213) is installed between the fluid inlet/outlet port (4011) of the arc-shaped pipeline structure (401) and the fluid inlet/outlet port (3012) of the pipeline structure (301).

FIG. 39 is a lateral structural view showing an embodiment of the present invention in which arc-shaped pipeline structures (301) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a space limiting and flow direction guiding structure (213) capable of controlling the door opening or closing is installed between the fluid inlet/outlet port (4011) of the arc-shaped pipeline structure (401) and the fluid inlet/outlet port (3012) of the pipeline structure (301).

In the open-loop natural thermal energy releasing system of FIG. 39, the arc-shaped pipeline structures (301) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and the space limiting and flow direction guiding structure (213) capable of controlling the door opening or closing is installed between the fluid inlet/outlet port (4011) of the arc-shaped pipeline structure (401) and the fluid inlet/outlet port (3012) of the pipeline structure (301) for accommodating the temperature differentiation body (103) and for guiding the flow direction of the heat exchange fluid (104), wherein the space limiting and flow direction guiding structure (213) is capable of controlling the door opening or closing for allowing the limited space to be equipped with a closed-type or semi-closed type operational function.

Figure 40:
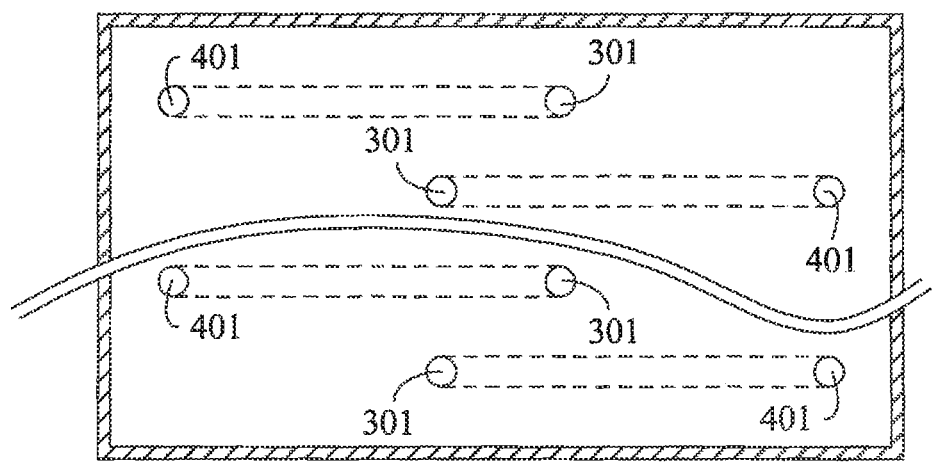
FIG. 40 is a top view showing a cross section of the structures shown in FIG. 21 to FIG. 23 taken along the horizontal.

FIG. 40 is a top view showing a cross section of the structures of FIG. 21 to FIG. 23 taken along the horizontal.

As shown in FIG. 40, in each set of the open-loop natural thermal energy releasing system, the heat gaining devices (101) are staggeringly distributed in the natural thermal energy storage body (100), and two ends thereof are extended to the temperature differentiation body (103) through the pipeline structure (301) and the pipeline structure (401).

Figure 41:
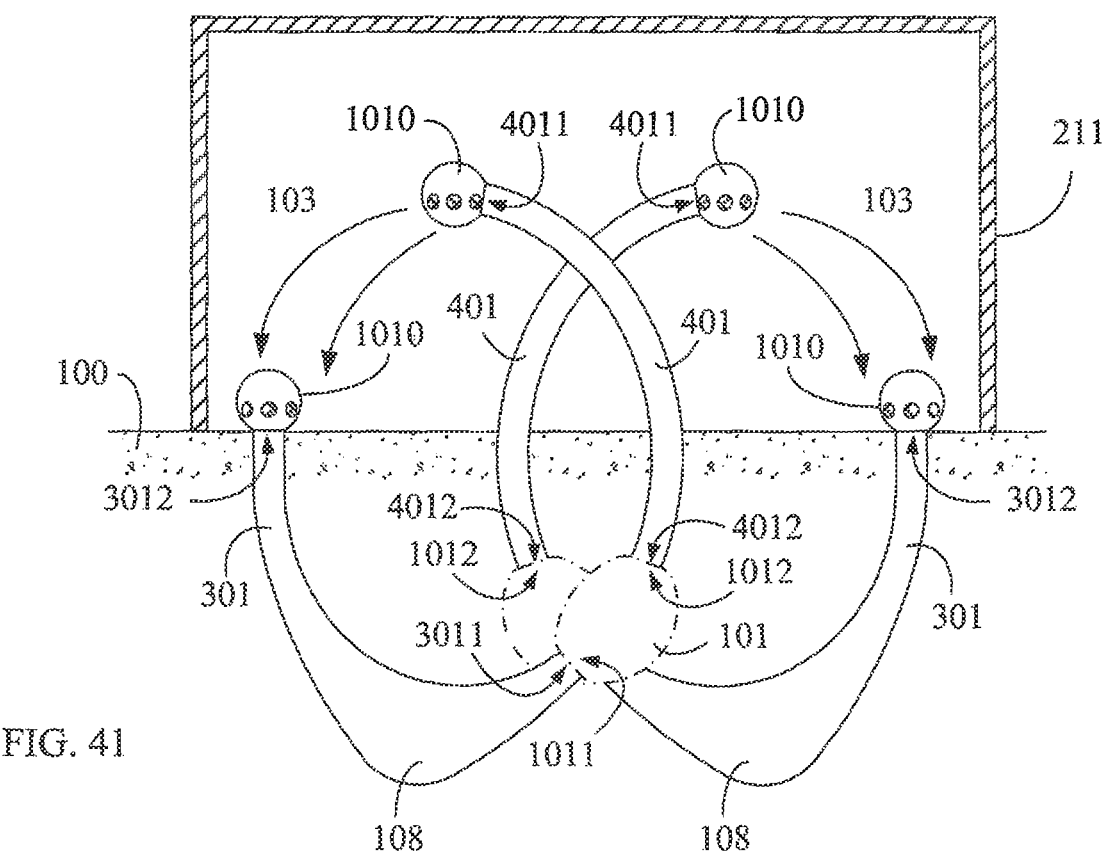
FIG. 41 is a lateral structural view showing an embodiment of the invention that includes an arc-shaped pipeline structure (301) and pipeline structures (401) of at least two open-loop natural thermal energy releasing systems that are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the arc-shaped pipeline structure (401) and the fluid inlet/outlet port (3012) of the pipeline structure (301).

FIG. 41 is a lateral structural view showing an embodiment of the present invention in which the arc-shaped pipeline structure (301) and the pipeline structures (401) of at least two open-loop natural thermal energy releasing systems are staggeringly disposed in the natural thermal energy storage body (100), wherein the bottom of each open-loop natural thermal energy releasing system with partial reflux is installed with the outward-expanding arc-shaped fluid chamber (108) for being leaded to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a closed-type space limiting and flow direction guiding structure (211) is installed between the fluid inlet/outlet port (4011) of the arc-shaped pipeline structure (401) and the fluid inlet/outlet port (3012) of the pipeline structure (301).

Figure 42:
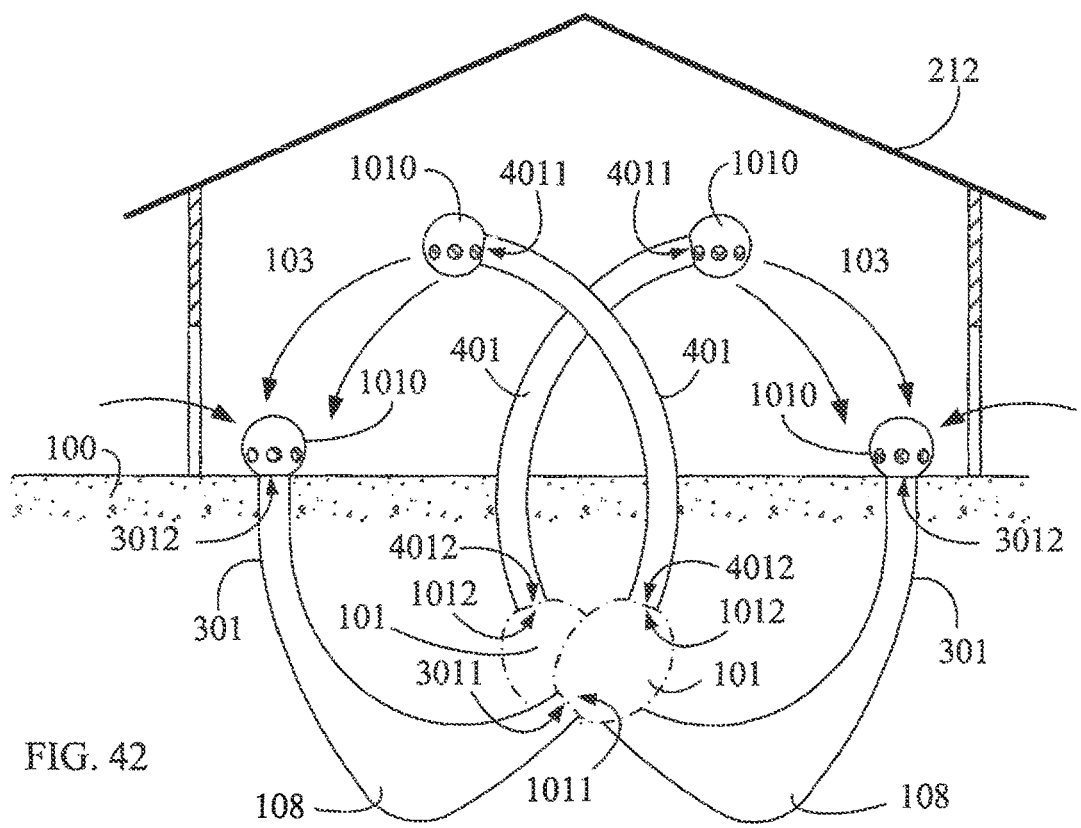
FIG. 42 is a lateral structural view showing an embodiment in which an arc-shaped pipeline structure (301) and pipeline structures (401) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the arc-shaped pipeline structure (401) and the fluid inlet/outlet port (3012) of the pipeline structure (301).

In the open-loop natural thermal energy releasing system of FIG. 41, the arc-shaped pipeline structure (301) and the pipeline structures (401) of the at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and the closed-type space limiting and flow direction guiding structure (211) is installed between the fluid inlet/outlet port (4011) of the arc-shaped pipeline structure (401) and the fluid inlet/outlet port (3012) of the pipeline structure (301) for accommodating the temperature differentiation body (103) and for guiding the flow direction of the heat exchange fluid (104). FIG. 42 is a lateral structural view showing an embodiment of the present invention in which the arc-shaped pipeline structure (301) and the pipeline structures (401) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), and the fluid inlet/outlet port (1012) of the heat gaining device (101) is connected to the fluid inlet/outlet port (4012) of the pipeline structure (401), and a semi-closed type space limiting and flow direction guiding structure (212) is installed between the fluid inlet/outlet port (4011) of the arc-shaped pipeline structure (401) and the fluid inlet/outlet port (3012) of the pipeline structure (301).

In the open-loop natural thermal energy releasing system of FIG. 42, the arc-shaped pipeline structure (301) and the pipeline structures (401) of the at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and the semi-closed type space limiting and flow direction guiding structure (212) is installed between the fluid inlet/outlet port (4011) of the arc-shaped pipeline structure (401) and the fluid inlet/outlet port (3012) of the pipeline structure (301) for accommodating the temperature differentiation body (103) and for guiding the flow direction of the heat exchange fluid (104), as well as for exchanging fluid with the exterior.

Figure 43:
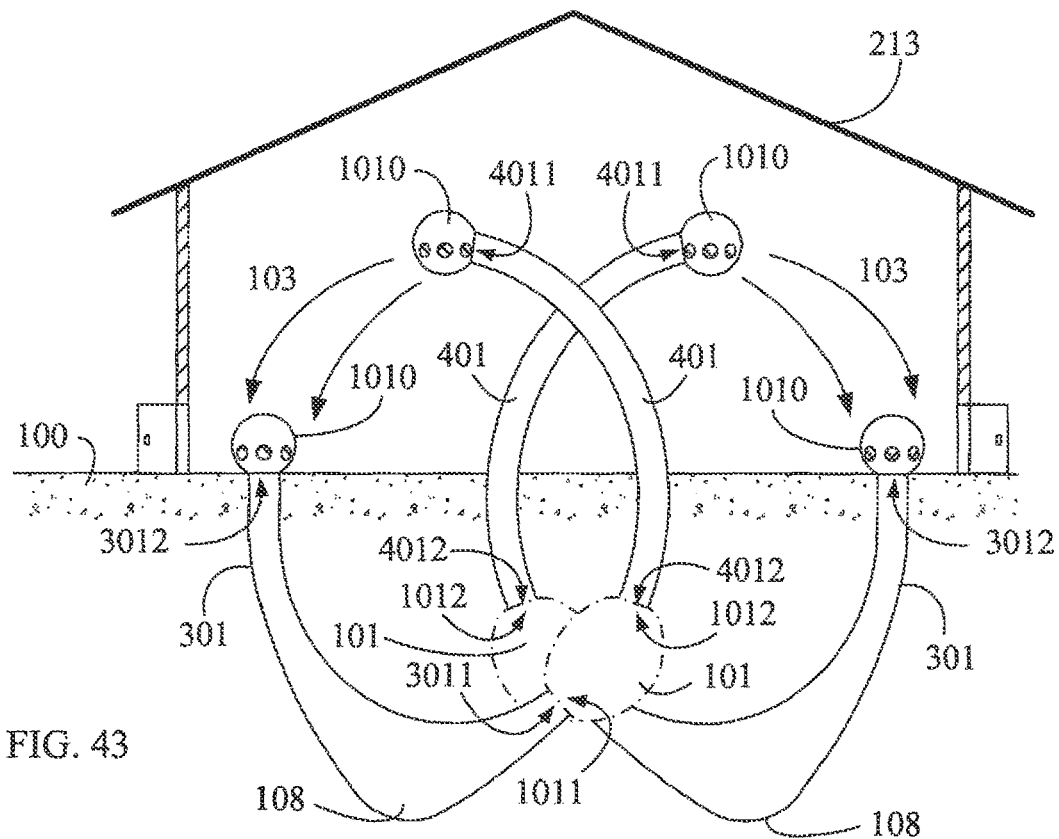
FIG. 43 is a lateral structural view showing an embodiment in which the arc-shaped pipeline structure (301) and the pipeline structures (401) of at least two open-loop natural thermal energy releasing systems are staggeringly disposed in the natural thermal energy storage body (100), wherein the bottom of each open-loop natural thermal energy releasing system with partial reflux is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing is installed between the fluid inlet/outlet port (4011) of the heat exchange fluid (104) of the arc-shaped pipeline structure (401) and the fluid inlet/outlet port (3012) of the heat exchange fluid (104) of the pipeline structure (301), according to the present invention.

FIG. 43 is a lateral structural view showing an embodiment of the present invention in which the arc-shaped pipeline structure (301) and the pipeline structures (401) of at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage body (100), the fluid inlet/outlet port (1012) of the heat gaining device (101) is connected to the fluid inlet/outlet port (4012) of the pipeline structure (401), and a space limiting and flow direction guiding structure (213) capable of controlling door opening or closing (213) is installed between the fluid inlet/outlet port (4011) of the arc-shaped pipeline structure (401) and the fluid inlet/outlet port (3012) of the pipeline structure (301).

In the open-loop natural thermal energy releasing system of FIG. 43, the arc-shaped pipeline structure (301) and the pipeline structures (401) of the at least two open-loop natural thermal energy releasing systems are staggeringly disposed in the natural thermal energy storage body (100), wherein the bottom of each open-loop natural thermal energy releasing system is installed with the outward-expanding arc-shaped fluid chamber (108) leading to the upward-inclined heat gaining device (101) disposed in the natural thermal energy storage device (100), the fluid inlet/outlet port (1012) of the heat gaining device (101) is connected to the fluid inlet/outlet port (4012) of the pipeline structure (401), and the space limiting and flow direction guiding structure (213) capable of controlling the door opening or closing is installed between the fluid inlet/outlet port (4011) of the arc-shaped pipeline structure (401) and the fluid inlet/outlet port (3012) of the pipeline structure (301) for accommodating the temperature differentiation body (103) and for guiding the flow direction of the heat exchange fluid (104), wherein the space limiting and flow direction guiding structure (213) is capable of controlling the door opening or closing for allowing the limited space to be equipped with a closed-type or semi-closed type operational function.

Figure 44:
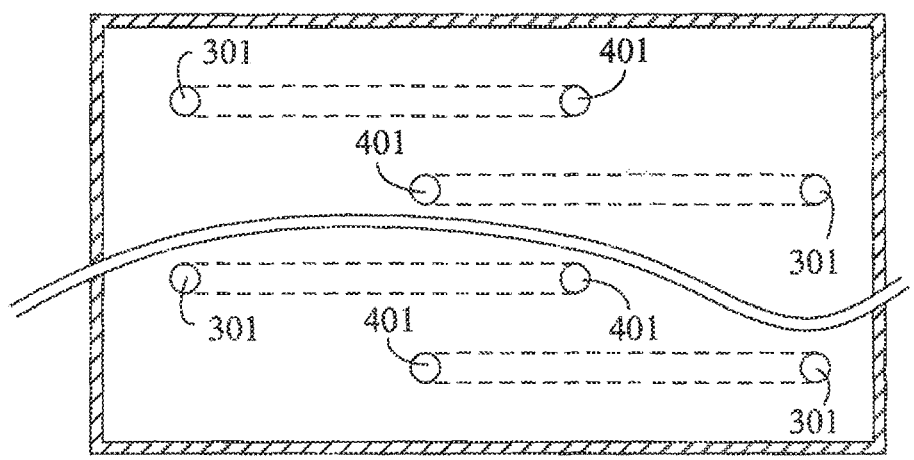
FIG. 44 is a top view showing a cross section of the structures shown in FIG. 25 to FIG. 27 taken along the horizontal.

FIG. 44 is a top view showing a cross section of the structures of FIG. 25 to FIG. 27 taken along the horizontal.

As shown in FIG. 44, in each set of the open-loop natural thermal energy releasing system, the heat gaining devices (101) are staggeringly distributed in the natural thermal energy storage body (100), and two ends thereof are extended to the temperature differentiation body (103) through the pipeline structure (301) and the pipeline structure (401).

Figure 45:
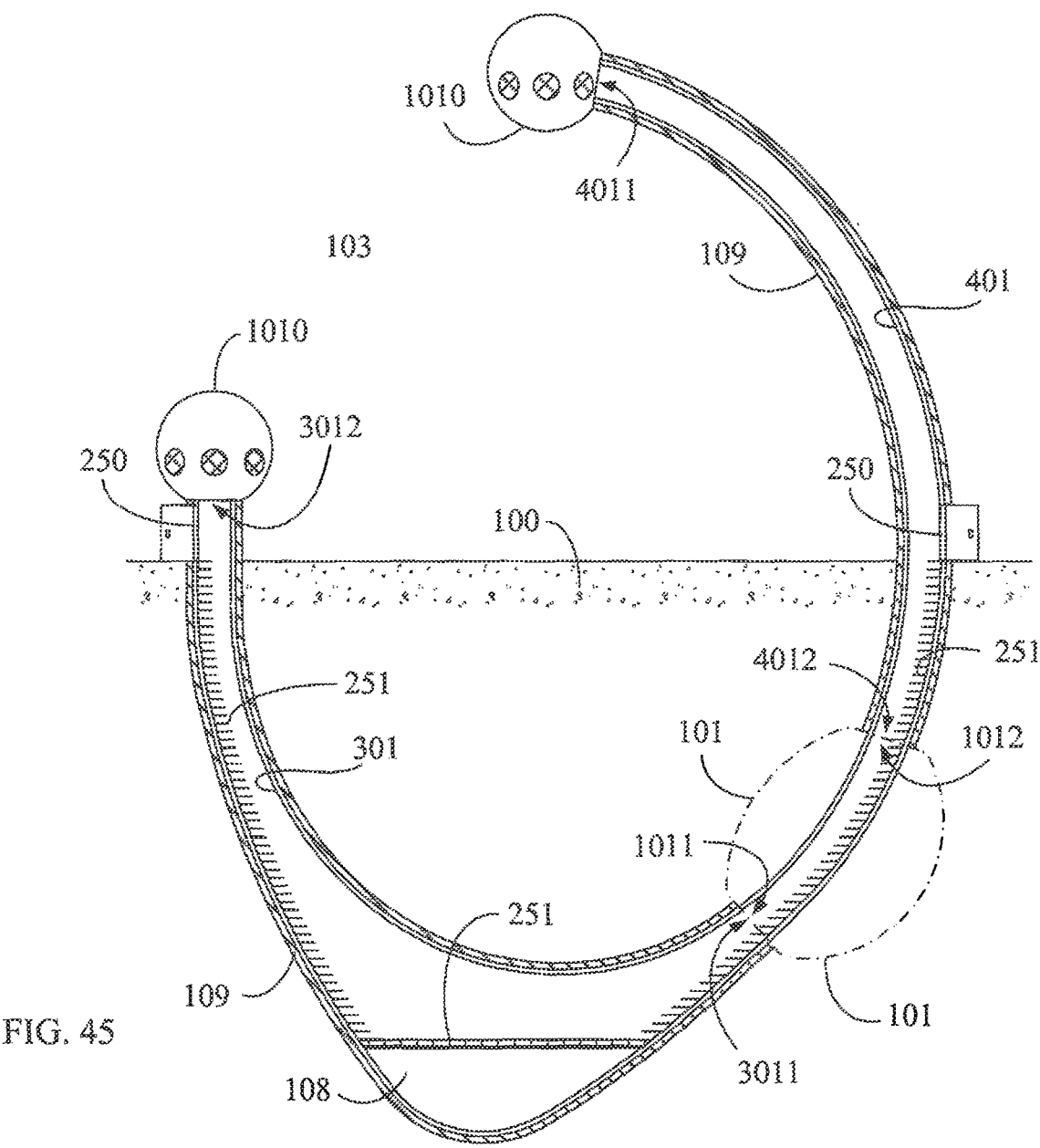
FIG. 45 is a schematic view showing an embodiment in which a maintenance entrance (250) and a maintenance stair passage (251) are further provided.

FIG. 45 is a schematic view showing an embodiment in which a maintenance entrance (250) and a maintenance stair passage (251) are further provided.

As shown in FIG. 45, when the open-loop natural thermal energy releasing system is desired to be enlarged and expanded, with considerations of the convenience for personnel entering for maintenance, a maintenance entrance (250) and a maintenance stair passage (251) can be further provided for allowing the personnel and equipment to enter, as follows:

Maintenance entrance (250) is constituted by a door or cover capable of being opened or closed and installed at one or both of the pipeline structure (301) and the pipeline structure (401).

Stair passage (251) is constituted by a stair structure installed along the interior of the pipe wall of the pipeline structure (301) or the pipeline structure (401) and crossing over the outward-expanding arc-shaped fluid chamber (108) for allowing personnel to climb and walk thereon.

In the open-loop natural thermal energy releasing system, an auxiliary fluid pump (107) can be further provided and installed in series in the open-loop flowpath configured by the heat gaining device (101), the pipeline structure (301) and the pipeline structure (401) for actively controlling an auxiliary fluid pump (107) to pump in the normal direction or pump in a reverse direction or stop operation.

Figure 46:
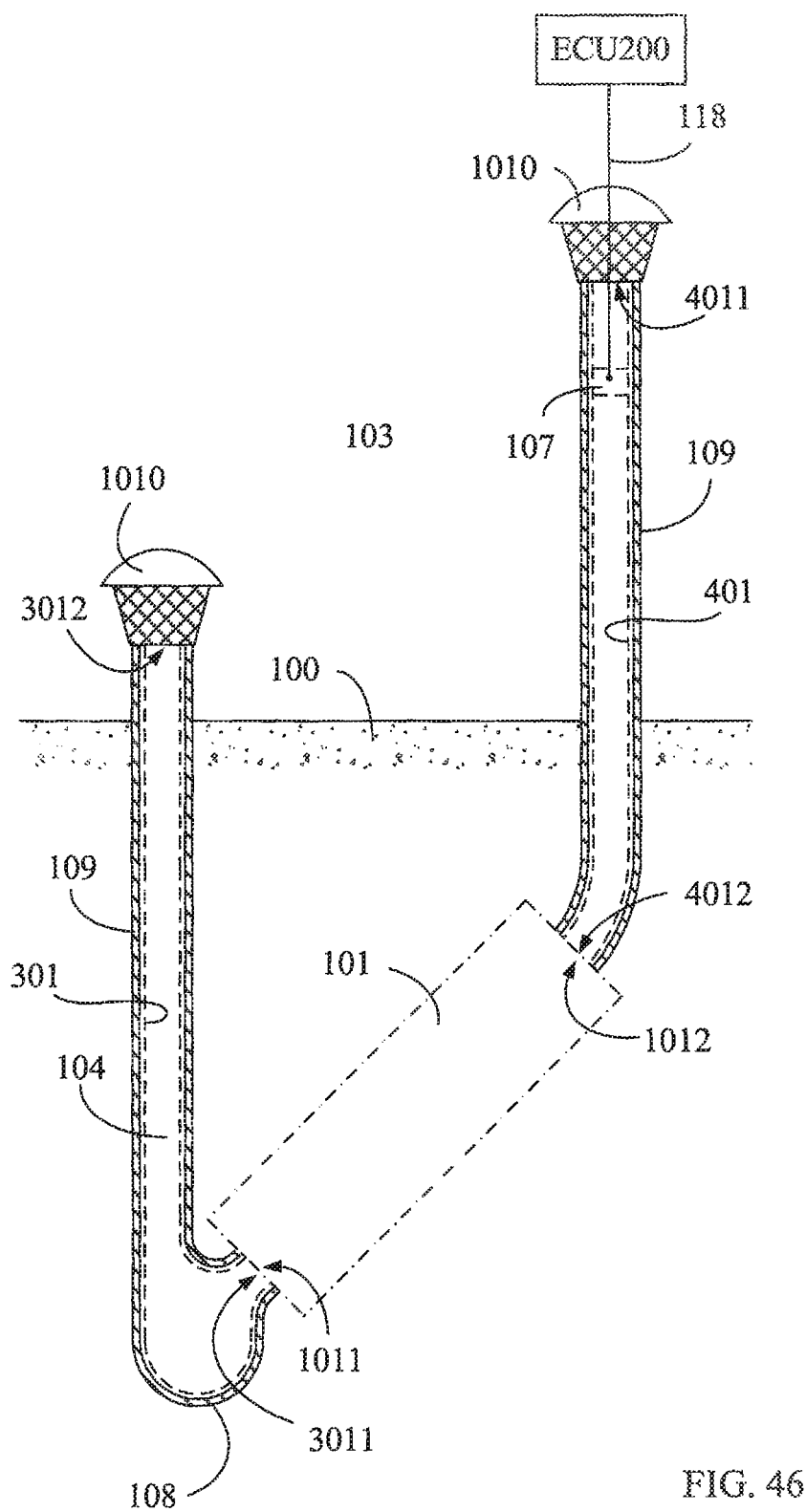
FIG. 46 is a lateral structural view showing a cross section of an embodiment in which an auxiliary fluid pump (107) is installed in the interior of the flowpath segment configured by the heat gaining device (101) and the pipeline structure (401).

FIG. 46 is a lateral structural view showing a cross section in which an auxiliary fluid pump (107) is installed in the interior of the flowpath segment configured by the heat gaining device (101) and the pipeline structure (401), according to one embodiment of the present invention.

As shown in FIG. 46:

Auxiliary fluid pump (107) is constituted by a fluid pump driven by a motor externally supplied with electric power through a power wire (118) or driven by natural forces, and is series connected in the closed-type circulation flowpath for pumping the heat exchange fluid (104). The auxiliary fluid pump (107) may provide a fixed single-direction pumping operation, or a direction-selectable pumping operation, and may be controlled to turn ON/OFF, change speed, or change the amount of flow pumping.

The operation functions of the system of this embodiment include the following: the auxiliary fluid pump (107) is not operated, and the heat exchange fluid (104) circulates due to the cold descending/hot ascending effect; or the auxiliary fluid pump (107) is actively controlled to pump in the normal direction for performing auxiliary pumping in the same direction as the cold descending/hot ascending flow direction of the heat exchange fluid (104); or the auxiliary fluid pump (107) is actively controlled to pump in the reverse direction for performing reverse pumping in the direction opposite to the cold descending/hot ascending flow direction of the heat exchange fluid (104).

In the open-loop natural thermal energy releasing system, one or more than one of the auxiliary heating/cooling devices (115) can be further provided for increasing the thermal energy transmitted to the temperature differentiation body (103) from the heat releasing device.

Figure 47:
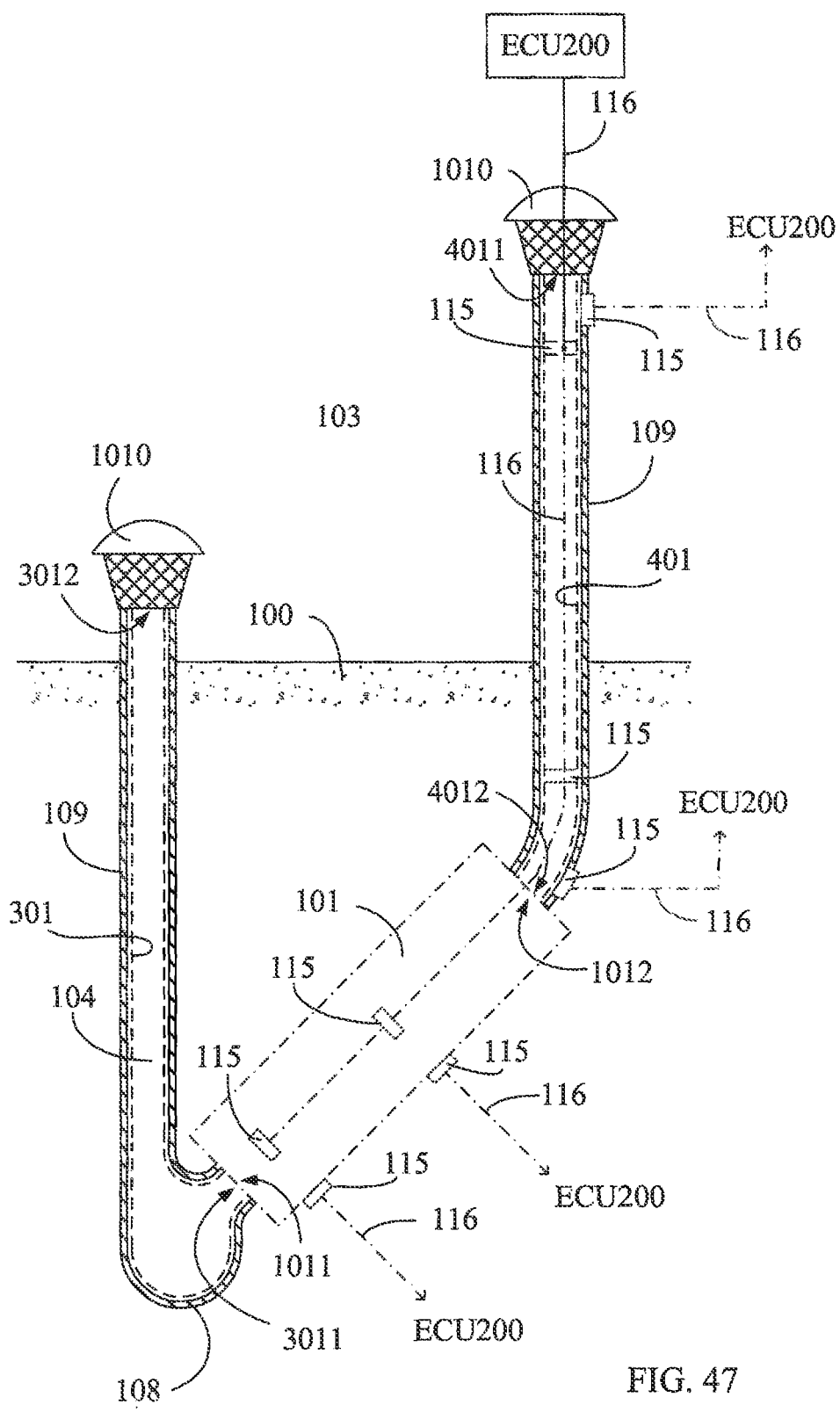
FIG. 47 is a lateral structural view showing a cross section of an embodiment in which an auxiliary heating/cooling device (115) is installed in the interior or the exterior of the flowpath segment configured by the heat gaining device (101) and the pipeline structure (401).

FIG. 47 is a lateral structural view showing a cross section in which an auxiliary heating/cooling device (115) is installed in the interior or the exterior of the flowpath segment configured by the heat gaining device (101) and the pipeline structure (401), according to one embodiment of the preset invention.

As shown in FIG. 47:

Auxiliary heating/cooling device (115) is driven by electric power provided from a power wire (116), and is constituted by an electrothermal device capable of converting electric energy into thermal energy; or constituted by a temperature regulation device capable of converting electric energy into thermal energy or converting electric energy into cooling energy; or being constituted by a semiconductor chip capable of converting electric energy into thermal energy or cooling energy, and is installed in the flowpath of the open-loop natural thermal energy releasing system and disposed at a location capable of generating kinetic power for assisting the heat exchange fluid (104) to perform hot ascending/cold descending without otherwise influencing the flow of heat exchange fluid (104). The auxiliary heating/cooling device (115) may be installed in one or more than one of the following ways: 1) fixedly installed in the open-loop flowpath; 2) disposed in the pipeline structure (401) or heat gaining device (101); and 3) surroundingly or partially installed on an exterior of the open-loop flowpath made of a heat conductive material, for indirectly heating or cooling the heat exchange fluid (104) in the flowpath.

Figure 48:
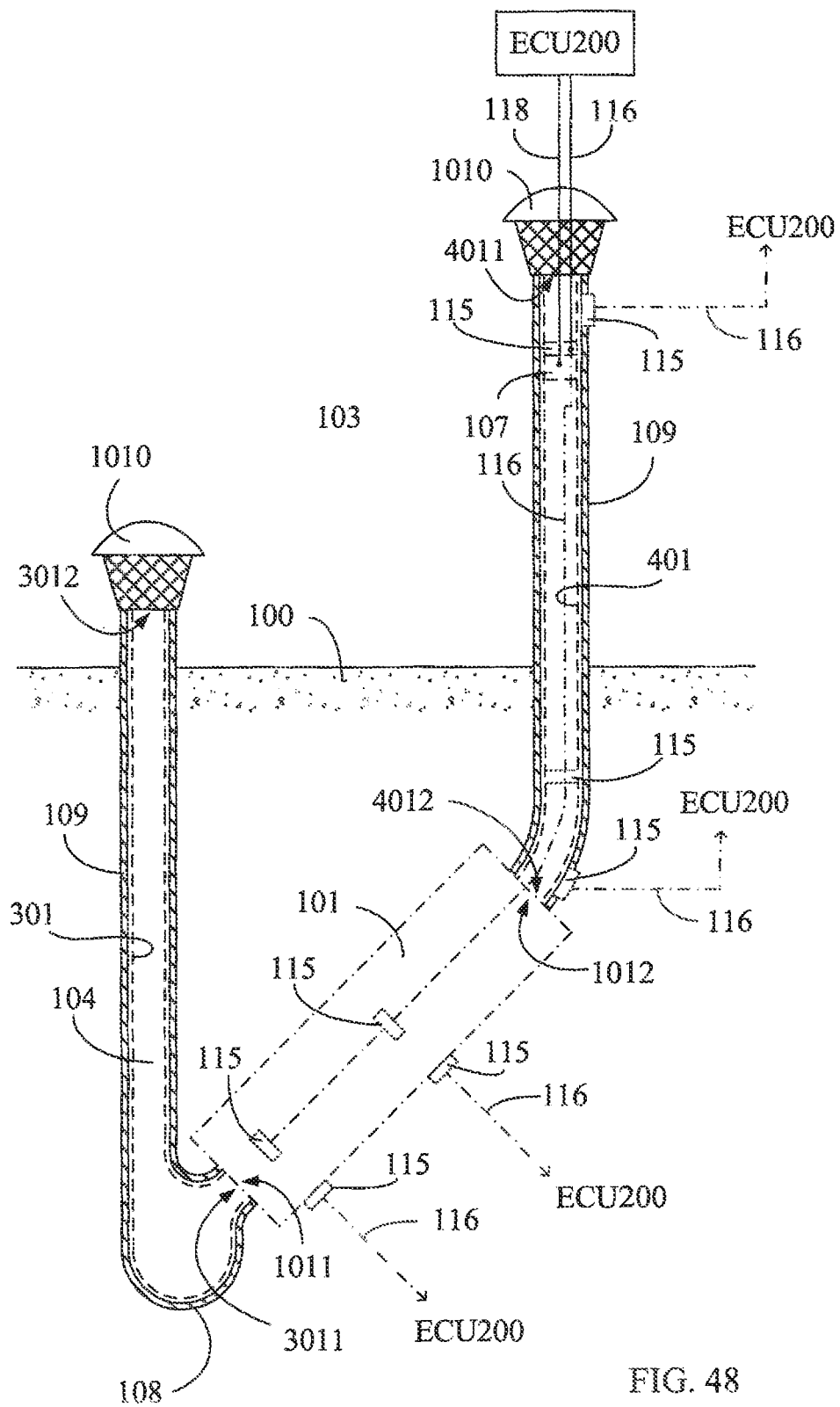
FIG. 48 is a lateral structural view showing a cross section of an embodiment in which the interior of the flowpath segment configured by the heat gaining device (101) and the pipeline structure (401) is installed with the auxiliary fluid pump (107), and the interior or the exterior is installed with the auxiliary heating/cooling device (115).

FIG. 48 is a lateral structural view showing a cross section in which the interior of the flowpath segment configured by the heat gaining device (101) and the pipeline structure (401) is installed with the auxiliary fluid pump (107), and the interior or the exterior is installed with the auxiliary heating/cooling device (115), according to one embodiment of the present invention.

As shown in FIG. 48:

Auxiliary fluid pump (107) is constituted by a fluid pump driven by a motor externally supplied with electric power through a power wire (118) or driven by natural forces, and is series connected in the closed-type circulation flowpath for pumping the heat exchange fluid (104 to provide a fixed single-direction pumping operation or direction-selectable pumping operation, and for being controlled to turn ON/OFF, change speed, or change the amount of flow pumping.

The auxiliary pumping functions of the system shown in FIG. 48 may include: the auxiliary fluid pump (107) is not operated, and the heat exchange fluid (104) circulates due to the cold descending/hot ascending effect; or the auxiliary fluid pump (107) is actively controlled to pump in the normal direction for performing auxiliary pumping in the same direction as the cold descending/hot ascending flow direction of the heat exchange fluid (104); or the auxiliary fluid pump (107) is actively controlled to pump in the reverse direction for performing reverse pumping in the direction opposite to the cold descending/hot ascending flow direction of the heat exchange fluid (104).

Auxiliary heating/cooling device (115) is driven by the electric power provided from a power wire (116), and may be constituted by an electrothermal device capable of converting electric energy into thermal energy; or constituted by a temperature regulation device capable of converting electric energy into thermal energy or converting electric energy into cooling energy; or constituted by a semiconductor chip capable of converting electric energy into thermal energy or cooling energy, and is installed in the flowpath of the open-loop natural thermal energy releasing system and disposed at a location capable of generating kinetic power for assisting the heat exchange fluid (104) to perform hot ascending/cold descending without otherwise influencing the flow of heat exchange fluid (104). Installation may be carried out in one or more than one of the following ways: 1) fixedly installed in the open-loop flowpath; 2) disposed in the pipeline structure (401) or heat gaining device (101); and 3) surroundingly or partially installed at the exterior of an open-loop flowpath made of a heat conductive material, for indirectly heating or cooling the heat exchange fluid (104) in the flowpath.

In the open-loop natural thermal energy releasing system of the embodiment of FIG. 48, one or both of the auxiliary fluid pump (107) and the auxiliary heating/cooling device (115) can be further installed, and one or both of a heat exchange fluid temperature sensing device (TS201) and an environment temperature sensing device (TS202) can be installed, wherein the auxiliary fluid pump (107), the auxiliary heating/cooling device (115), the heat exchange fluid temperature sensing device (TS201) and the environment temperature sensing device (TS202) can be controlled through operations of manually reading or setting in a power supply state, or can be controlled through setting in a power supply state by the installation of an electric power control unit (ECU200).

Figure 49:
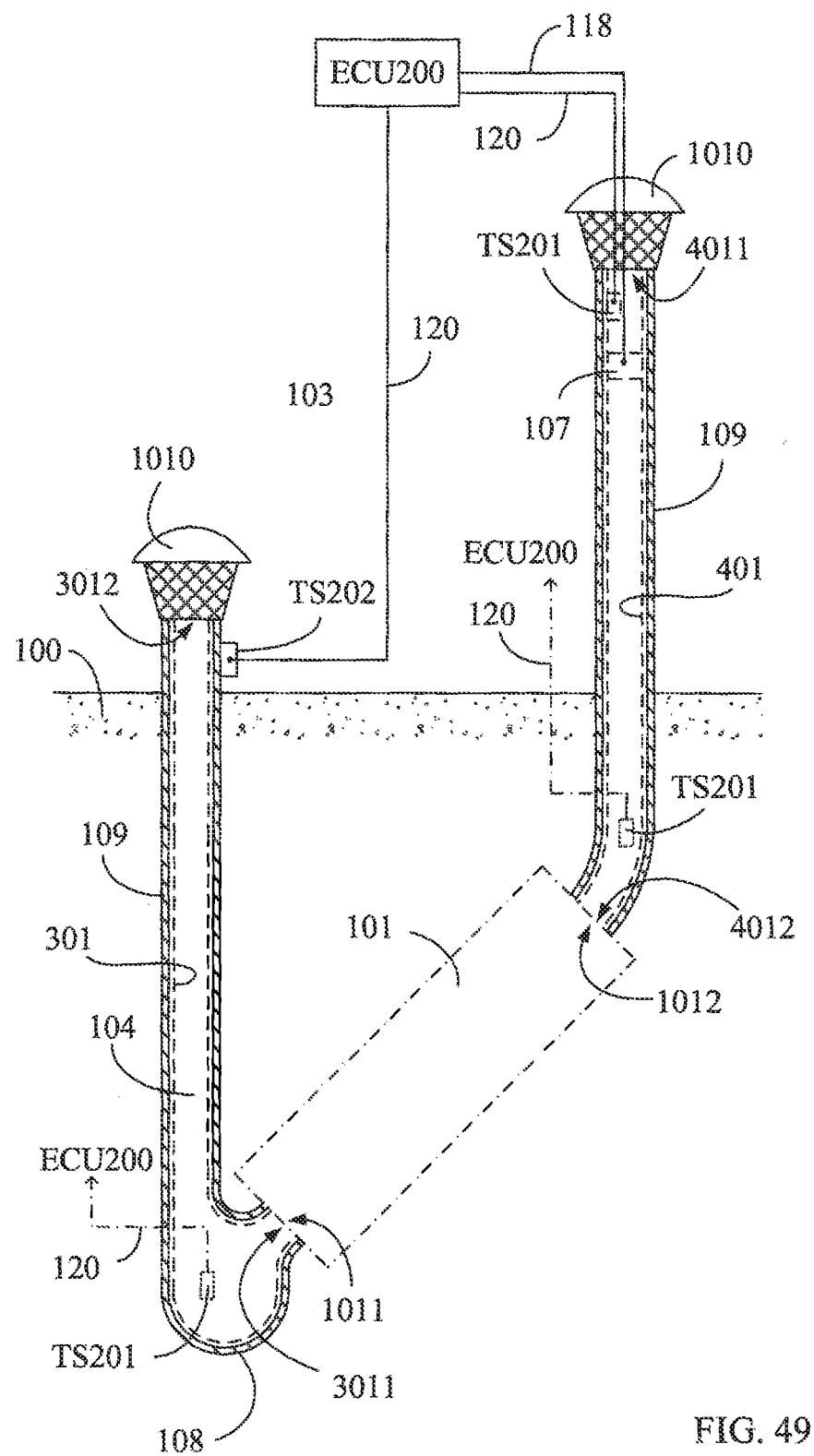
FIG. 49 is a schematic view showing an embodiment installed with an electric power control unit (ECU200), a heat exchange fluid temperature sensing device (TS201), and an environment temperature sensing device (TS202) for controlling an auxiliary fluid pump (107).

FIG. 49 is a schematic view showing an embodiment of the present invention installed with an electric power control unit (ECU200), a heat exchange fluid temperature sensing device (TS201), and an environment temperature sensing device (TS202) for controlling the auxiliary fluid pump (107), according to one embodiment of the present invention.

As shown in FIG. 49, by installing one or more than one of the heat exchange fluid temperature sensing device (TS201) in the open-loop flowpath, utilizing a signal transmission wire (120) to transmit the detected temperature value of the heat exchange fluid to the electric power control unit (ECU200), installing the environment temperature sensing device (TS202), and utilizing the signal transmission wire (120) to feed back the detected temperature value to the electric power control unit (ECU200), timing for supplying power for operation and the amount of flow pumping and pumping direction of the auxiliary fluid pump (107) can be controlled by the electric power control unit (ECU200) with respect to internal setting and feedback signals of the heat exchange fluid temperature sensing device (TS201) and the environment temperature sensing device (TS202), as follows:

Electric power control unit (ECU200) is constituted by electromechanical components, electric circuit components, micro processors, and/or related software, and is equipped with an operation parameter setting with respect to the signals sent by the heat exchange fluid temperature sensing device (TS201) and the environment temperature sensing device (TS202) for controlling the timing of supplying power for operation and the amount of flow pumping and pumping direction of the auxiliary fluid pump (107).

Heat exchange fluid temperature sensing device (TS201) and environment temperature sensing device (TS202) are constituted by one or more than one temperature sensing device capable of converting the temperature variation into an analog or digital electric power signal, and installed at temperature sensing points or environment temperature sensing points selectively set in the open-type flowpath for transmitting the temperature signal to the electric power control unit (ECU200) through the signal transmission wire (120).

The environment temperature sensing device (TS202) can be optionally installed according to actual needs.

Figure 50:
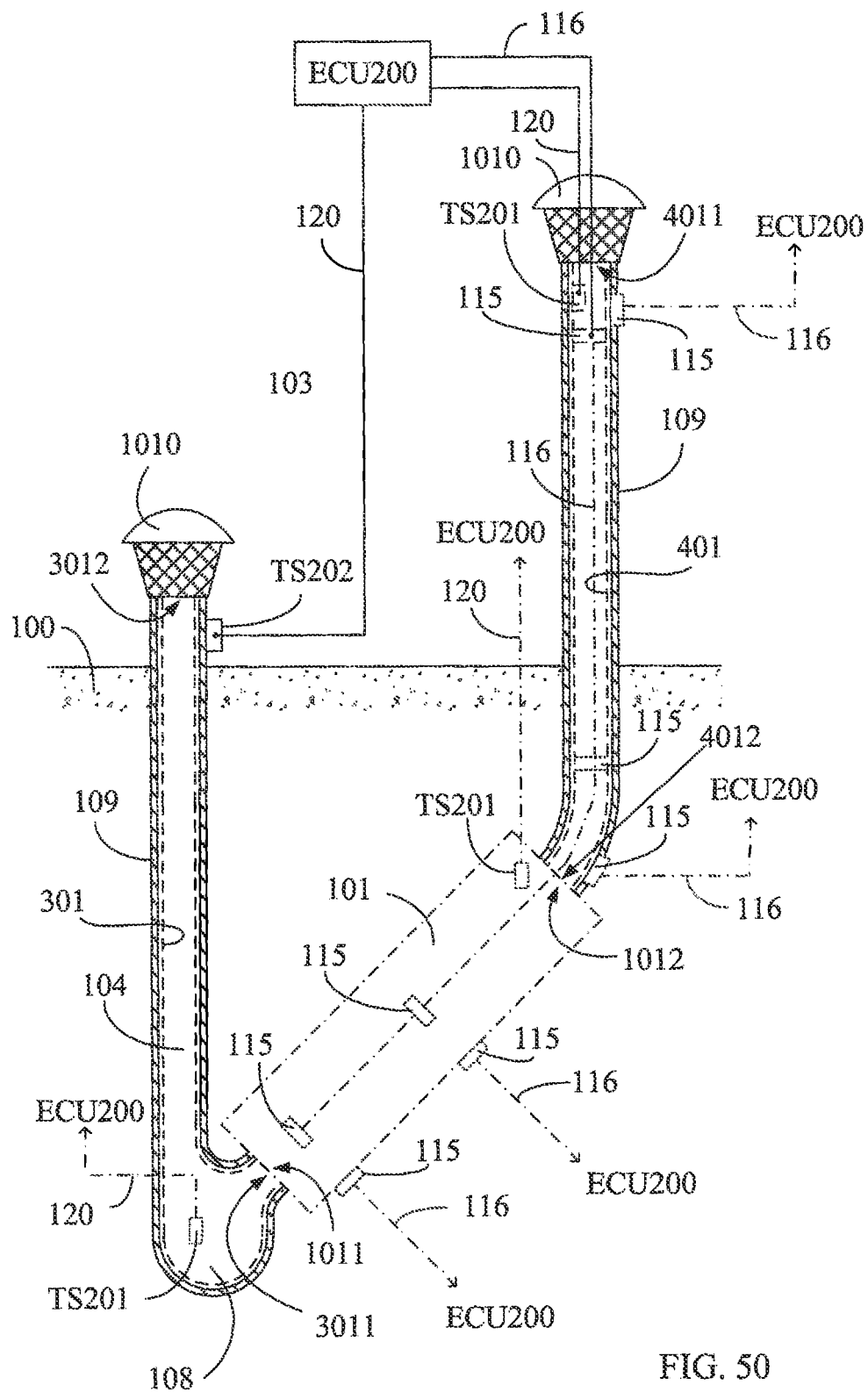
FIG. 50 is a schematic view showing an embodiment installed with an electric power control unit (ECU200), a heat exchange fluid temperature sensing device (TS201), and an environment temperature sensing device (TS202) for controlling the auxiliary heating/cooling device (115).

FIG. 50 is a schematic view showing an embodiment of the present invention installed with the electric power control unit (ECU200), the heat exchange fluid temperature sensing device (TS201) and the environment temperature sensing device (TS202) for controlling the auxiliary heating/cooling device (115), according to one embodiment of the present invention.

As shown in FIG. 50, by installing one or more than one heat exchange fluid temperature sensing device (TS201) in the open-loop flowpath, utilizing a signal transmission wire (120) to transmit the detected temperature value of the heat exchange fluid to the electric power control unit (ECU200), installing the environment temperature sensing device (TS202), and utilizing the signal transmission wire (120) to feed back the detected temperature value to the electric power control unit (ECU200), the timing for supplying power for heating and heating values of the auxiliary heating/cooling device (115) can be controlled by the electric power control unit (ECU200) with respect to an internal setting and the feedback signals from the heat exchange fluid temperature sensing device (TS201) and the environment temperature sensing device (TS202), as follows:

Electric power control unit (ECU200) is constituted by electromechanical components, electric circuit components, micro processors, and/or related software, and is equipped with an operation parameter setting with respect to the signals sent by the heat exchange fluid temperature sensing device (TS201) and the environment temperature sensing device (TS202) for controlling the timing for supplying power for heating and heating values of the auxiliary heating/cooling device (115).

Heat exchange fluid temperature sensing device (TS201) and environment temperature sensing device (TS202) are constituted by one or more than one temperature sensing device capable of converting the temperature variation into an analog or digital electric power signal, and are installed at temperature sensing points or environment temperature sensing points selectively set in the open-type flowpath for transmitting the signal to the electric power control unit (ECU200) through the signal transmission wire (120).

The environment temperature sensing device (TS202) can be optionally installed according to actual needs.

Figure 51:
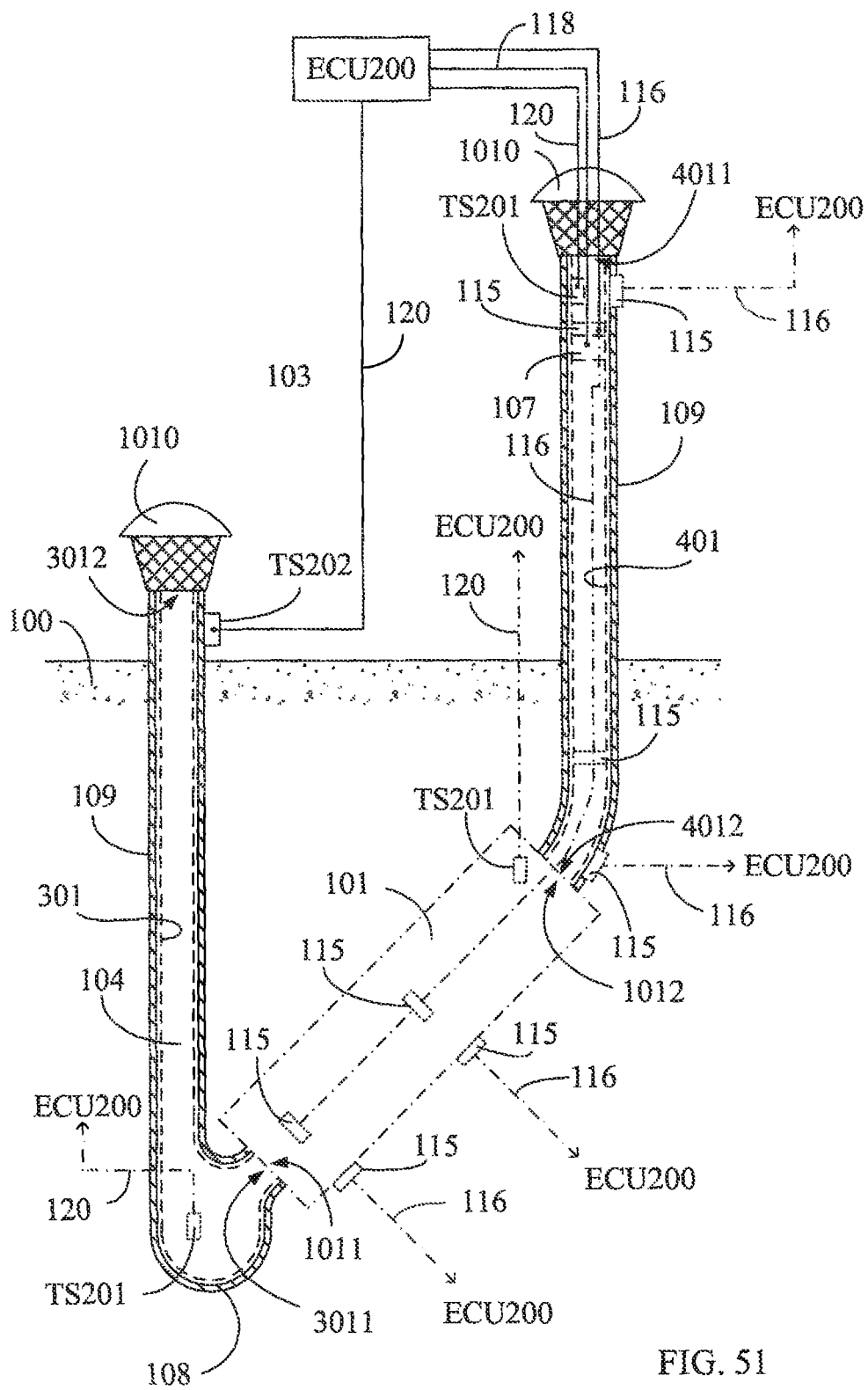
FIG. 51 is a schematic view showing an embodiment installed with an electric power control unit (ECU200), a heat exchange fluid temperature sensing device (TS201), and an environment temperature sensing device (TS202) for controlling an auxiliary fluid pump (107) and an auxiliary heating/cooling device (115).

FIG. 51 is a schematic view showing an embodiment of the present invention installed with the electric power control unit (ECU200), the heat exchange fluid temperature sensing device (TS201) and the environment temperature sensing device (TS202) for controlling the auxiliary fluid pump (107) and the auxiliary heating/cooling device (115), according to one embodiment of the present invention.

As shown in FIG. 51, by installing one or more than one of the heat exchange fluid temperature sensing device (TS201) in the open-loop flowpath, utilizing a signal transmission wire (120) to transmit the detected temperature value of the heat exchange fluid to the electric power control unit (ECU200), installing the environment temperature sensing device (TS202), and utilizing the signal transmission wire (120) to feed back the detected temperature value to the electric power control unit (ECU200), the timing for supplying power for operation and the amount of flow pumping and pumping direction of the auxiliary fluid pump (107), and the timing for supplying power for heating and heating values of the auxiliary heating/cooling device (115), can be controlled by the electric power control unit (ECU200) with respect to an internal setting and the feedback signals of the heat exchange fluid temperature sensing device (TS201) and the environment temperature sensing device (TS202), as follows:

Electric power control unit (ECU200) is constituted by electromechanical components, electric circuit components, micro processors, and/or related software, and is equipped with an operation parameter setting with respect to the signals sent by the heat exchange fluid temperature sensing device (TS201) and the environment temperature sensing device (TS202) for controlling the timing for supplying power for operation and the amount of flow pumping and pumping direction of the auxiliary fluid pump (107) and the timing for supplying power for heating and heating values of the auxiliary heating/cooling device (115).

Heat exchange fluid temperature sensing device (TS201) and environment temperature sensing device (TS202) are constituted by one or more than one temperature sensing device capable of converting the temperature variation into an analog or digital electric power signal, and installed at temperature sensing points or environment temperature sensing points selectively set in the open-type flowpath for transmitting the signal to the electric power control unit (ECU200) through the signal transmission wire (120).

The environment temperature sensing device (TS202) can be optionally installed according to actual needs.

According to various embodiments of the present invention described above, the open-loop natural thermal energy releasing system can be applied to release energy to a gaseous or solid or liquid object in the form of a temperature differentiation body (103) enclosed by a closed-type space limiting and flow direction guiding structure (211), a semi-closed type space limiting and flow direction guiding structure (212), or a space limiting and flow direction guiding structure (213) capable of controlling door opening or closing (213). The temperature differentiation body of these embodiments may include a solid temperature differentiation body (103) such as a road surface, roof, wall, or floor of a building, a gaseous temperature differentiation body (103) such as air inside a green house, or air inside a house, a liquid temperature differentiation body (103) such as water in a lake, equipment, or a structural body desired to be heated to prevent freezing.

I claim:

1. An open-loop natural thermal energy releasing system comprising:
    a heat gaining device (101) arranged to transfer thermal energy from a natural thermal energy storage body (100) to a gaseous or liquid heat exchange fluid (104) as the heat exchange fluid (104) passes through at least one flowpath inside the heat gaining device (101);
    a first pipeline structure (301) comprising an arc-shaped fluid chamber (108), a first fluid inlet/outlet port (3011) and a second fluid inlet/outlet port (3012), wherein the first fluid inlet/outlet port (3011) connects the arc-shaped fluid chamber (108) to the heat gaining device (101), and wherein the second fluid inlet/outlet port (3012) connects the first pipeline structure (301) to a temperature differentiation body (103) to enable the heat exchange fluid (104) to pass between the first pipeline structure (301) and the temperature differentiation body (103) and release the thermal energy to the temperature differentiation body (103); and
    a second pipeline structure (401) comprising a third fluid inlet/outlet port (4011) and a fourth fluid inlet/outlet port (4012), wherein the third fluid inlet/outlet port (4011) connects the second pipeline structure (401) to the temperature differentiation body (103), wherein the fourth fluid inlet/outlet port (4012) connects the second pipeline structure (401) to the heat gaining device (101), and wherein the second pipeline structure (401) is arranged to limit a flow speed of the heat exchange fluid (104);
    wherein a combined volume of the arc-shaped fluid chamber (108) and the first pipeline structure (301) through which the heat exchange fluid (104) can flow is relatively larger than a volume of the second pipeline structure (401) through which the heat exchange fluid (104) can flow, and therefore a total heat capacity of the first pipeline structure (301) is larger than a total heat capacity of the second pipeline structure (401),
    wherein the flowpath inside the heat gaining device (101) is upwardly inclined and extends from a fifth fluid inlet/outlet port (1011) of the heat gaining device (101) to a sixth inlet/outlet port (1012), wherein the fifth inlet/outlet port (1011) is connected to the first fluid inlet/outlet port of the first pipeline structure (301) at a lower position to allow a portion of the heat exchange fluid (104) having a relatively lower temperature to flow into the heat gaining device (101), and the sixth fluid inlet/outlet port (1012) of the heat gaining device (101) is connected to the fourth fluid inlet/outlet port (4012) of the second pipeline structure (401) at a higher position to allow a portion of the heat exchange fluid (104) having a relatively higher temperature to flow out, generating a convection effect; and wherein the open-loop natural thermal energy releasing system further comprises at least one auxiliary heating/cooling device (115) installed between the fifth fluid inlet/outlet port (1011) of the heat gaining device (101) and the third fluid inlet/outlet port (4011) of the second pipeline structure (401), whereby when the heat gaining device (101) gains thermal energy from the natural thermal energy storage body (100) and transfers the thermal energy to the heat exchange fluid (104), the heat exchange fluid (104) in the first pipeline structure (301) experiences a smaller temperature differential than the heat exchange fluid in the second pipeline structure (401), thereby forming a temperature differential between the first inlet/outlet port (3011) and the fourth inlet/outlet port (4012) that causes the heat exchange fluid (104) to flow through the system.

2. The open-loop natural thermal energy releasing system as claimed in claim 1, further comprising a first protection net and protection cover device (1010) connected to the second fluid inlet/outlet port (3012), and a second protection net and protection cover device (1010) connected to the third fluid inlet/outlet port (4011);

wherein the first pipeline structure (301) is (1) made of a heat conductive material, or (2) made of a heat conductive material at least partially covered by a heat insulator;

wherein the second pipeline structure (401) is (1) made of a heat conductive material, or (2) made of a heat conductive material at least partially covered by a heat insulator; and wherein connections between the heat gaining device (101), the first pipeline structure (301) and the second pipeline structure (401) are continuous to reduce damping of the flowing heat exchange fluid (104), thereby aiding circulation of the heat exchange fluid (104).

3. The open-loop natural thermal energy releasing system as claimed in claim 1, wherein the upwardly-inclined heat gaining device (101) extends vertically.

4. The open-loop natural thermal energy releasing system as claimed in claim 3, comprising:

at least two said first pipeline structures (301), each having a radially-expanded root part, a bottom of each root part being connected to the arc-shaped fluid chamber (108), wherein the first fluid inlet/outlet port (3011) of the arc-shaped fluid chamber (108) is connected to the fifth fluid inlet/outlet port (1011) of a the vertically extending heat gaining device (101), wherein the sixth fluid inlet/outlet port (1012) of the heat gaining device (101) is connected to the fourth fluid inlet/outlet port (4012) of the second pipeline structure (401), and wherein the bottom of each root part of the radially-expanded pipeline structure (301) is connected to the arc-shaped fluid chamber (108), connected upwardly from the arc-shaped fluid chamber (108) to the heat gaining device (101), and further upwardly to the third fluid inlet/outlet port (4011) through the second pipeline structure (401).

5. The open-loop natural thermal energy releasing system as claimed in claim 4, further comprising:

at least two radially-expanded shunt manifolds formed at the bottom of the first pipeline structure (301), which are individually connected to the arc-shaped fluid chamber (108), wherein the first fluid inlet/outlet port (3011) of the arc-shaped fluid chamber (108) is connected to the fifth fluid inlet/outlet port (1011) of the vertical heat gaining device (101), and the sixth fluid inlet/outlet port (1012) of the heat gaining device (101) is connected to the fourth fluid inlet/outlet port (4012) of the second pipeline structure (401), and wherein a bottom of the first pipeline structure (301) is installed with the radially-expanded shunt manifolds each being individually connected to the arc-shaped fluid chamber (108), wherein the individual arc-shaped fluid chamber (108) is connected to the vertical heat gaining device (101), and wherein the vertical heat gaining device (101) is connected to the third fluid inlet/outlet port (4011) through the second pipeline structure (401).

6. The open-loop natural thermal energy releasing system as claimed in claim 5, further comprising: 1) a closed structure (211) encompassing the third fluid inlet/outlet port (4011) of the second pipeline structure (401) and the second fluid inlet/outlet port (3012) of the first pipeline structure (301); 2) a semi-closed structure (212) encompassing the third fluid inlet/outlet port (4011) of the second pipeline structure (401) and the second fluid inlet/outlet port (3012) of the first pipeline structure (301); or 3) a structure (213) comprising a door arranged to be controlled to open or close the structure (213) comprising the door encompassing the third fluid inlet/outlet port (4011) of the second pipeline structure (401) and the second fluid inlet/outlet port (3012) of the first pipeline structure (301), wherein the structure (213) comprising the door is configured to enable control of the door to function as a closed or semi-closed structure.

7. The open-loop natural thermal energy releasing system as claimed in claim 3, further comprising: 1) a closed structure (211) encompassing the third fluid inlet/outlet port (4011) of the second pipeline structure (401) and the second fluid inlet/outlet port (3012) of the first pipeline structure (301); 2) a semi-closed structure (212) encompassing the third fluid inlet/outlet port (4011) of the second pipeline structure (401) and the second fluid inlet/outlet port (3012) of the first pipeline structure (301); or 3) a structure (213) comprising a door arranged to be controlled to open or close the structure (213) comprising the door encompassing the third fluid inlet/outlet port (4011) of the second pipeline structure (401) and the second fluid inlet/outlet port (3012) of the first pipeline structure (301), wherein the structure (213) comprising the door is configured to enable control of the door to function as a closed or semi-closed structure.

8. The open-loop natural thermal energy releasing system as claimed in claim 4, further comprising: 1) a closed structure (211) encompassing the third fluid inlet/outlet port (4011) of the second pipeline structure (401) and the second fluid inlet/outlet port (3012) of the first pipeline structure (301);_2) a semi-closed structure (212) encompassing the third fluid inlet/outlet port (4011) of the second pipeline structure (401) and the second fluid inlet/outlet port (3012) of the first pipeline structure (301); or 3) a structure (213) comprising a door arranged to be controlled to open or close the structure (213) comprising the door encompassing the third fluid inlet/outlet port (4011) of the second pipeline structure (401) and the second fluid inlet/outlet port (3012) of the first pipeline structure (301), wherein the structure (213) comprising the door is configured to enable control of the door to function as a closed or semi-closed structure.

9. The open-loop natural thermal energy releasing system as claimed in claim 1, wherein the first pipeline structure (301) is arc-shaped and the second pipeline structure (401) is arc-shaped.

10. The open-loop natural thermal energy releasing system as claimed in claim 9, further comprising: 1) a closed structure (211) encompassing the third fluid inlet/outlet port (4011) of the second pipeline structure (401) and the second fluid inlet/outlet port (3012) of the first pipeline structure (301); 2) a semi-closed structure (212) encompassing the third fluid inlet/outlet port (4011) of the second pipeline structure (401) and the second fluid inlet/outlet port (3012) of the first pipeline structure (301); or 3) a structure (213) comprising a door arranged to be controlled to open or close the structure (213) comprising the door encompassing the third fluid inlet/outlet port (4011) of the second pipeline structure (401) and the second fluid inlet/outlet port (3012) of the first pipeline structure (301), wherein the structure (213) comprising the door is configured to enable control of the door to function as a closed or semi-closed structure.

11. The open-loop natural thermal energy releasing system as claimed in claim 1, wherein the temperature differentiation body (103) is situated in: 1) a closed structure (211); 2) a semi-closed structure (212) that includes an opening for exchanging part of the heat exchange fluid (104) with exterior of the semi-closed structure (212); or 3) a structure (213) comprising a door configured to be controlled to open or close to allow the structure (213) to function as a closed or semi-closed structure.

12. The open-loop natural thermal energy releasing system as claimed in claim 11, wherein at least two said second pipeline structures (401) are staggeringly disposed in the natural thermal energy storage body (100), wherein a bottom of each of the at least two second pipeline structures (401) comprises an arc-shaped fluid chamber (108) connected to the upwardly-inclined heat gaining device (101) disposed in the natural thermal energy storage device (100).

13. The open-loop natural thermal energy releasing system as claimed in claim 1, comprising:
at least two said first pipeline structures (301), each having a radially-expanded root part, a bottom of each radially-expanding root part connected to a respective said arc-shaped fluid chamber (108) of each first pipeline structure (301), wherein the first fluid inlet/outlet port (3011) of each arc-shaped fluid chamber (108) is connected to the fifth fluid inlet/outlet port (1011) of the upwardly-inclined heat gaining device (101), and the sixth fluid inlet/outlet port (1012) of the heat gaining device (101) is connected to the fourth fluid inlet/outlet port (4012) of a shared second pipeline structure (401),
wherein the at least two said first pipeline structures (301) are individually distributed radially and vertically at a periphery of the second pipeline structure (401), the first fluid inlet/outlet port (3011) of each respective said arc-shaped fluid chamber (108) is connected to the fifth fluid inlet/outlet port (1011) of the upward-inclined heat gaining device (101), and through a shunt manifold, the sixth fluid inlet/outlet port (1012) of the heat gaining device (101) is connected to the third fluid inlet/outlet port (4011) via the shared second pipeline structure (401).

14. The open-loop natural thermal energy releasing system as claimed in claim 13, further comprising: 1) a closed structure (211) encompassing the third fluid inlet/outlet port (4011) of the second pipeline structure (401) and the second fluid inlet/outlet port (3012) of the first pipeline structure (301); 2) a semi-closed structure (212) encompassing the third fluid inlet/outlet port (4011) of the second pipeline structure (401) and the second fluid inlet/outlet port (3012) of the first pipeline structure (301); or 3) a structure (213) comprising a door arranged to be controlled to open or close the structure (213) comprising the door encompassing the third fluid inlet/outlet port (4011) of the second pipeline structure (401) and the second fluid inlet/outlet port (3012) of the first pipeline structure (301), wherein the structure (213) comprising the door is configured to enable control of the door to function as a closed or semi-closed structure.

15. The open-loop natural thermal energy releasing system as claimed in claim 1, comprising:
a radially-expanded root part installed with the arc-shaped fluid chamber (108),
wherein the first fluid inlet/outlet port (3011) of the arc-shaped fluid chamber (108) is connected to the fifth fluid inlet/outlet port (1011) of the upwardly-inclined heat gaining device (101), and the sixth fluid inlet/outlet port (1012) of the heat gaining device (101) is connected to the fourth fluid inlet/outlet port (4012) of at least two said second pipeline structures (401) forming the radially-expanded root part, wherein each first fluid inlet/outlet port (3011) is connected to the arc-shaped fluid chamber (108) installed at the bottom of the first pipeline structure (301) and to the fifth fluid inlet/outlet port (1011) of an individual heat gaining device (101) through an individual manifold which is radially extended, and wherein the sixth fluid inlet/outlet port (1012) of each heat gaining device (101) is connected to a respective said second fluid inlet/outlet port (3012) through the first pipeline structure (301).

16. The open-loop natural thermal energy releasing system as claimed in claim 15, further comprising: 1) a closed structure (211) encompassing the third fluid inlet/outlet port (4011) of the second pipeline structure (401) and the second fluid inlet/outlet port (3012) of the first pipeline structure (301); 2) a semi-closed structure (212) encompassing the third fluid inlet/outlet port (4011) of the second pipeline structure (401) and the second fluid inlet/outlet port (3012) of the first pipeline structure (301); or 3) a structure (213) comprising a door arranged to be controlled to open or close the structure (213) comprising the door encompassing the third fluid inlet/outlet port (4011) of the second pipeline structure (401) and the second fluid inlet/outlet port (3012) of the first pipeline structure (301), wherein the structure (213) comprising the door is configured to enable control of the door to function as a closed or semi-closed structure.

17. The open-loop natural thermal energy releasing system as claimed in claim 1, wherein an interior of a flowpath segment formed by the heat gaining device (101) and the second pipeline structure (401) is installed with an auxiliary fluid pump (107) wherein:
wherein the auxiliary fluid pump (107) is connected in series with the flowpath to pump the heat exchange fluid (104) to provide a fixed single-direction or direction-selectable pumping operation, and is controllable to turn ON and OFF, change speed or change the amount of flow pumping;
wherein operation modes of the system include: (1) a mode in which the auxiliary fluid pump (107) is not operated, and the heat exchange fluid (104) circulates due to the convection effect; (2) a mode in which the auxiliary fluid pump (107) operates to perform auxiliary pumping in a same direction as the convection-caused flow direction of the heat exchange fluid (104), and (3) a mode in which the auxiliary fluid pump (107) operates to perform reverse pumping in a direction opposite to the convection-caused flow direction of the heat exchange fluid (104), and further comprising an auxiliary heating/cooling device (115), which is driven by the electric power provided from a power wire (116), and includes: an electrothermal device, temperature regulation device, or semiconductor chip configured to convert electric energy into thermal energy; wherein the auxiliary heating/cooling device (115) is installed in the flowpath at a location in which the auxiliary heating/cooling device assists the heat exchange fluid (104) to cause a convection effect without affecting the flow of heat exchange fluid (104).

18. The open-loop natural thermal energy releasing system as claimed in claim 1, further comprising at least one of an auxiliary fluid pump (107) and an auxiliary heating/cooling device (115), and at least one of a heat exchange fluid temperature sensing device (TS201) and an environment temperature sensing device (TS202);

wherein the auxiliary fluid pump (107), the auxiliary heating/cooling device (115), the heat exchange fluid temperature sensing device (TS201) and the environment temperature sensing device (TS202) are configured to be controlled manually or by an electric power control unit (ECU200), and wherein:

when at least one said heat exchange fluid temperature sensing device (TS201) is installed in the flowpath, a signal transmission wire (120) is utilized to transmit detected temperature values of the heat exchange fluid (104) to an electric power control unit (ECU200), and an environment temperature sensing device (TS202) is installed which utilizes the signal transmission wire (120) to feedback the detected temperature values to the electric power control unit (ECU200), wherein a timing of supplying power to the auxiliary fluid pump (107) and amount of flow pumping and pumping direction of the auxiliary fluid pump (107) are controlled by the electric power control unit (ECU200) based on the feedback signals of the heat exchange fluid temperature sensing device (TS201) and the environment temperature sensing device (TS202);

the electric power control unit (ECU200) stores operation parameter settings for controlling the timing of supplying power and the amount of flow pumping and pumping direction of the auxiliary fluid pump (107); and the heat exchange fluid temperature sensing device (TS201) and the environment temperature sensing device (TS202) comprise at least one temperature sensing device arranged to convert temperature variation into an analog or digital electric power signal, and installed at temperature sensing points or environment temperature sensing points in the flowpath for transmitting a signal to the electric power control unit (ECU200) through the signal transmission wire (120).

19. The open-loop natural thermal energy releasing system as claimed in claim 1, further comprising an auxiliary heating/cooling device (115), which is driven by the electric power provided from a power wire (116), and includes: an electrothermal device, temperature regulation device, or semiconductor chip configured to convert electric energy into thermal energy; wherein the auxiliary heating/cooling device (115) is installed in the flowpath at a location in which the auxiliary heating/cooling device assists the heat exchange fluid (104) to cause convection without affecting the flow of heat exchange fluid (104), wherein the auxiliary heating/cooling device (115) is: 1) fixedly installed in the flowpath; 2) disposed in the second pipeline structure (401) or the heat gaining device (101); or 3) surrounds or is partially installed around flowpath, to indirectly heat or cool the heat exchange fluid (104) in the flowpath.

* * * * *